(12) United States Patent
Henkel et al.

(10) Patent No.: US 12,034,652 B2
(45) Date of Patent: Jul. 9, 2024

(54) VIRTUAL NETWORK ROUTERS FOR CLOUD NATIVE SOFTWARE-DEFINED NETWORK ARCHITECTURES

(71) Applicant: Juniper Networks, Inc., Sunnyvale, CA (US)

(72) Inventors: Michael Henkel, Saratoga, CA (US); Prasad Miriyala, San Jose, CA (US); Édouard Thuleau, La Possonniere (FR); Nagendra Prasath Maynattamai Prem Chandran, Fremont, CA (US); Atul S Moghe, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 17/809,659

(22) Filed: Jun. 29, 2022

(65) Prior Publication Data
US 2023/0106531 A1    Apr. 6, 2023

Related U.S. Application Data

(60) Provisional application No. 63/364,283, filed on May 6, 2022.

(30) Foreign Application Priority Data

Oct. 4, 2021 (IN) .............................. 202141044924

(51) Int. Cl.
*H04L 49/00* (2022.01)
*H04L 41/40* (2022.01)

(52) U.S. Cl.
CPC .............. *H04L 49/70* (2013.01); *H04L 41/40* (2022.05)

(58) Field of Classification Search
CPC ....... H04L 49/70; H04L 41/40; G06F 9/5077; G06F 9/5072
See application file for complete search history.

(56) References Cited

U.S. PATENT DOCUMENTS

| | | | |
|---|---|---|---|
| 7,724,670 B2 * | 5/2010 | Nilakantan | H04L 45/04 370/235 |
| 7,940,784 B2 * | 5/2011 | Elias | H04L 45/32 370/396 |

(Continued)

FOREIGN PATENT DOCUMENTS

| | | |
|---|---|---|
| CN | 110875844 A | 3/2020 |
| CN | 111756785 A | 10/2020 |

(Continued)

OTHER PUBLICATIONS

Song et al., "Day One: Building Containers With Kubernetes and Contrail," Juniper Networks, Version History: v1, Nov. 2019, 283 pp.

(Continued)

*Primary Examiner* — Sm A Rahman
(74) *Attorney, Agent, or Firm* — Shumaker & Sieffert, P.A.

(57) ABSTRACT

In general, techniques are described for a creating a virtual network router within a software defined network (SDN) architecture. A network controller for the SDN architecture system may include processing circuitry that is configured to execute a configuration node and a control node. The configuration node may process a request by which to create a virtual network router (VNR), where the virtual network router may cause the network controller to interconnect a first virtual network (VN) and a second VN. The VNR may represent a logical abstraction of one or more policies that cause import and/or export of routing information between the first VN and the second VN. The control node configures (Continued)

the first VN and the second VN according to the one or more policies to enable the import and/or the export of routing information between the first VN and the second VN via the VNR.

16 Claims, 23 Drawing Sheets

(56) References Cited

U.S. PATENT DOCUMENTS

| | | | |
|---|---|---|---|
| 9,571,394 | B1 | 2/2017 | Sivaramakrishnan et al. |
| 10,027,768 | B2 * | 7/2018 | Rao ................. H04L 41/5051 |
| 10,200,274 | B1 | 2/2019 | Suryanarayana et al. |
| 10,728,121 | B1 * | 7/2020 | Chitalia ............. H04L 41/0894 |
| 10,728,145 | B2 | 7/2020 | Rao et al. |
| 10,841,226 | B2 | 11/2020 | Mariappan et al. |
| 10,944,691 | B1 | 3/2021 | Raut et al. |
| 2015/0281067 | A1 | 10/2015 | Wu |
| 2018/0288002 | A1 | 10/2018 | Petrick et al. |

FOREIGN PATENT DOCUMENTS

| | | |
|---|---|---|
| EP | 3629533 A1 | 4/2020 |
| EP | 3672169 A1 | 6/2020 |
| EP | 3675423 A1 | 7/2020 |
| WO | 2013/184846 A1 | 12/2013 |

OTHER PUBLICATIONS

U.S. Appl. No. 17/937,267, filed Sep. 30, 2022, naming inventors Miriyala et al.

Extended Search Report from counterpart European Application No. 22199266.2 dated Feb. 8, 2023, 10 pp.

KN et al., "Day One: Contrail DPDK vRouter," Juniper Networks, Retrieved from: https://www.juniper.net/documentation/en_US/day-one-books/contrail-DPDK.pdf, Jan. 21, 2021, 194 pp.

U.S. Appl. No. 17/649,632, filed Feb. 1, 2022, naming inventors Akkipeddi et al.

Response to Extended Search Report dated Feb. 28, 2023, from counterpart European Application No. 22199266.2 filed Oct. 5, 2023, 44 pp.

First Office Action and Search Report, and translation thereof, from counterpart Chinese Application No. 202211213578.6 dated Apr. 9, 2024, 31 pp.

* cited by examiner

VIRTUAL NETWORK ROUTERS FOR CLOUD NATIVE SOFTWARE-DEFINED NETWORK ARCHITECTURES

This application claims the benefit of U.S. Provisional Application No. 63/364,283, filed May 6, 2022, and India provisional application 202141044924, filed Oct. 4, 2021, each of which is incorporated by reference herein in its entirety.

TECHNICAL FIELD

The disclosure relates to virtualized computing infrastructure and, more specifically, to cloud native networking.

BACKGROUND

In a typical cloud data center environment, there is a large collection of interconnected servers that provide computing and/or storage capacity to run various applications. For example, a data center may comprise a facility that hosts applications and services for subscribers, i.e., customers of data center. The data center may, for example, host all of the infrastructure equipment, such as networking and storage systems, redundant power supplies, and environmental controls. In a typical data center, clusters of storage systems and application servers are interconnected via high-speed switch fabric provided by one or more tiers of physical network switches and routers. More sophisticated data centers provide infrastructure spread throughout the world with subscriber support equipment located in various physical hosting facilities.

Virtualized data centers are becoming a core foundation of the modern information technology (IT) infrastructure. In particular, modern data centers have extensively utilized virtualized environments in which virtual hosts, also referred to herein as virtual execution elements, such as virtual machines or containers, are deployed and executed on an underlying compute platform of physical computing devices.

Virtualization within a data center or any environment that includes one or more servers can provide several advantages. One advantage is that virtualization can provide significant improvements to efficiency. As the underlying physical computing devices (i.e., servers) have become increasingly powerful with the advent of multicore microprocessor architectures with a large number of cores per physical CPU, virtualization becomes easier and more efficient. A second advantage is that virtualization provides significant control over the computing infrastructure. As physical computing resources become fungible resources, such as in a cloud-based computing environment, provisioning and management of the computing infrastructure becomes easier. Thus, enterprise IT staff often prefer virtualized compute clusters in data centers for their management advantages in addition to the efficiency and increased return on investment (ROI) that virtualization provides.

Containerization is a virtualization scheme based on operation system-level virtualization. Containers are lightweight and portable execution elements for applications that are isolated from one another and from the host. Because containers are not tightly-coupled to the host hardware computing environment, an application can be tied to a container image and executed as a single light-weight package on any host or virtual host that supports the underlying container architecture. As such, containers address the problem of how to make software work in different computing environments. Containers offer the promise of running consistently from one computing environment to another, virtual or physical.

With containers' inherently lightweight nature, a single host can often support many more container instances than traditional virtual machines (VMs). Often short-lived (compared to most VMs), containers can be created and moved more efficiently than VMs, and they can also be managed as groups of logically-related elements (sometimes referred to as "pods" for some orchestration platforms, e.g., Kubernetes). These container characteristics impact the requirements for container networking solutions: the network should be agile and scalable. VMs, containers, and bare metal servers may need to coexist in the same computing environment, with communication enabled among the diverse deployments of applications. The container network should also be agnostic to work with the multiple types of orchestration platforms that are used to deploy containerized applications.

A computing infrastructure that manages deployment and infrastructure for application execution may involve two main roles: (1) orchestration—for automating deployment, scaling, and operations of applications across clusters of hosts and providing computing infrastructure, which may include container-centric computing infrastructure; and (2) network management—for creating virtual networks in the network infrastructure to enable packetized communication among applications running on virtual execution environments, such as containers or VMs, as well as among applications running on legacy (e.g., physical) environments. Software-defined networking contributes to network management.

SUMMARY

In general, techniques are described for a cloud-native software-defined network (SDN) architecture. In some examples, the SDN architecture may include data plane elements implemented in compute nodes, and network devices such as routers or switches, and the SDN architecture may also include a network controller for creating and managing virtual networks. The SDN architecture configuration and control planes are designed as scale-out cloud-native software with a container-based microservices architecture that supports in-service upgrades. The configuration nodes for the configuration plane may be implemented to expose custom resources. These custom resources for SDN architecture configuration may include configuration elements conventionally exposed by a network controller, but the configuration elements may be consolidated along with Kubernetes native/built-in resources to support a unified intent model, exposed by an aggregated API layer, that is realized by Kubernetes controllers and by custom resource controller(s) that work to reconcile the actual state of the SDN architecture with the intended state.

The custom resources for SDN architecture configuration include Virtual Network Router, which represents a logical abstraction for interconnecting and enabling communications among virtual networks implemented by the SDN architecture. Instances of the Virtual Network Router custom resource facilitate the exchange (referring to asymmetric or symmetric import and export) of routing information using import and export route targets that are configured within routing instances for respective virtual networks. In effect then, the Virtual Network Router enables route leaking among Virtual Network resources defined for the SDN architecture. Because the Virtual Network Router resource conceals the complex details of virtual routing and forwarding instance (VRF or "routing instance") configuration among VRFs used to implement the various Virtual Network resources, the techniques provide an intuitive intent-based model for defining interconnectivity among the Virtual Network resources and the respective virtual networks configured in the SDN architecture and improves usability even to those who may be unfamiliar with Border Gateway Protocol and VRF configuration.

The techniques may provide additional one or more technical advantages. For example, a cloud-native SDN architecture may address limitations in conventional SDN architectures relating to complexity in life cycle management, mandatory high resource analytics components, scale limitations in configuration management, and the lack of command-line interface (CLI)-based interfaces. For example, the network controller for the SDN architecture is a cloud-native, lightweight distributed application with a simplified installation footprint. This also facilitates easier and modular upgrade of the various component microservices for configuration node(s) and control node(s) for the configuration and control planes.

The techniques may further enable optional cloud-native monitoring (telemetry) and user interfaces, a high-performance data plane for containers using a data plane develop development kit-based (DPDK-based) virtual router connecting to DPDK-enabled pods, and cloud-native configuration management that in some cases leverages a configuration framework for existing orchestration platforms, such as Kubernetes or Openstack. As a cloud-native architecture, the network controller is a scalable and elastic to address and support multiple clusters. The network controller may in some cases may also support scalability and performance requirements for key performance indicators (KPIs).

In one example, various aspects of the techniques are directed to a network controller for a software-defined networking (SDN) architecture system, the network controller comprising: processing circuitry; a configuration node configured for execution by the processing circuitry; and a control node configured for execution by the processing circuitry, wherein the configuration node is executable to process a request by which to create a virtual network router, wherein the virtual network router is configured to cause the network controller to interconnect a first virtual network and a second virtual network operating within the SDN architecture system, the virtual network router representing a logical abstraction of one or more policies that cause one or more of import and export of routing information between the first virtual network and the second virtual network, and wherein the control node configures the first virtual network and the second virtual network according to the one or more policies to enable one or more of the import and the export of routing information between the first virtual network and the second virtual network via the virtual network router.

In another example, various aspects of the techniques are directed to a method comprising: processing, by a network controller, a request by which to create a virtual network router, wherein the virtual network router is configured to cause the network controller to interconnect a first virtual network and a second virtual network operating within the SDN architecture system, the virtual network router representing a logical abstraction of one or more policies that cause one or more of import and export of routing information between the first virtual network and the second virtual network; and configuring, by the network controller, the first virtual network and the second virtual network according to the one or more policies to enable one or more of the import and the export of routing information between the first virtual network and the second virtual network via the virtual network router.

In another example, various aspects of the techniques are directed to a non-transitory computer-readable medium comprising instructions for causing processing circuitry of a network controller to: process a request by which to create a virtual network router, wherein the virtual network router is configured to cause the network controller to interconnect a first virtual network and a second virtual network operating within the SDN architecture system, the virtual network router representing a logical abstraction of one or more policies that cause one or more of import and export of routing information between the first virtual network and the second virtual network; and configuring the first virtual network and the second virtual network according to the one or more policies to enable one or more of the import and the export of routing information between the first virtual network and the second virtual network via the virtual network router.

The details of one or more examples of this disclosure are set forth in the accompanying drawings and the description below. Other features, objects, and advantages will be apparent from the description and drawings, and from the claims.

BRIEF DESCRIPTION OF DRAWINGS

Like reference characters denote like elements throughout the description and figures.

DETAILED DESCRIPTION

Figure 1:
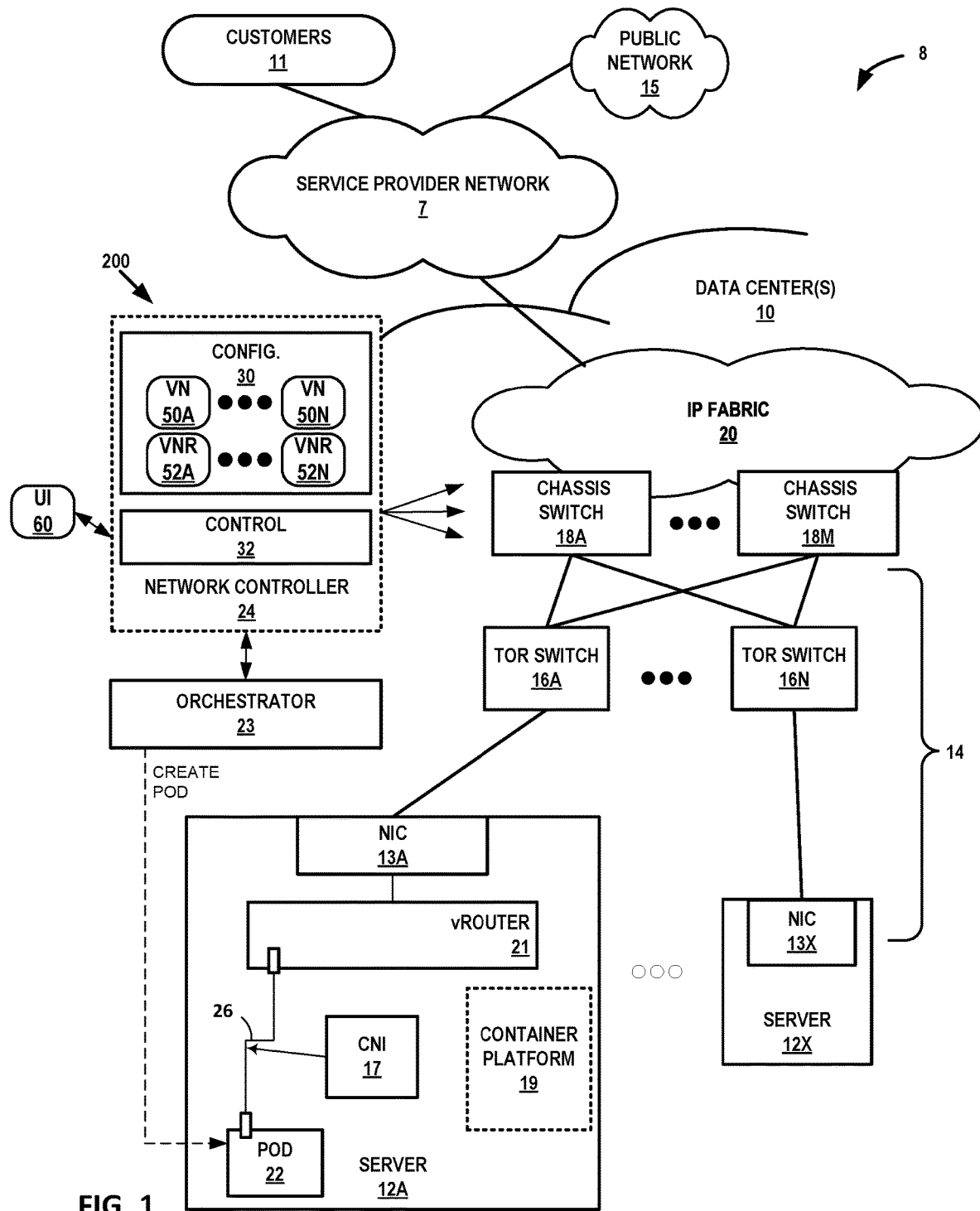
FIG. 1 is a block diagram illustrating an example computing infrastructure in which examples of the techniques described herein may be implemented.

FIG. 1 is a block diagram illustrating an example computing infrastructure 8 in which examples of the techniques described herein may be implemented. Current implementations of software-defined networking (SDN) architectures for virtual networks present challenges for cloud-native adoption due to, e.g., complexity in life cycle management, a mandatory high resource analytics component, scale limitations in configuration modules, and no command-line interface (CLI)-based (kubectl-like) interface. Computing infrastructure 8 includes a cloud-native SDN architecture system, described herein, that addresses these challenges and modernizes for the telco cloud-native era. Example use cases for the cloud-native SDN architecture include 5G mobile networks as well as cloud and enterprise cloud-native use cases. An SDN architecture may include data plane elements implemented in compute nodes (e.g., servers 12) and network devices such as routers or switches, and the SDN architecture may also include an SDN controller (e.g., network controller 24) for creating and managing virtual networks. The SDN architecture configuration and control planes are designed as scale-out cloud-native software with a container-based microservices architecture that supports in-service upgrades.

As a result, the SDN architecture components are microservices and, in contrast to existing network controllers, the SDN architecture assumes a base container orchestration platform to manage the lifecycle of SDN architecture components. A container orchestration platform is used to bring up SDN architecture components; the SDN architecture uses cloud native monitoring tools that can integrate with customer provided cloud native options; the SDN architecture provides declarative way of resources using aggregation APIs for SDN architecture objects (i.e., custom resources). The SDN architecture upgrade may follow cloud native patterns, and the SDN architecture may leverage Kubernetes constructs such as Multus, Authentication & Authorization, Cluster API, KubeFederation, KubeVirt, and Kata containers. The SDN architecture may support data plane development kit (DPDK) pods, and the SDN architecture can extend to support Kubernetes with virtual network policies and global security policies.

For service providers and enterprises, the SDN architecture automates network resource provisioning and orchestration to dynamically create highly scalable virtual networks and to chain virtualized network functions (VNFs) and physical network functions (PNFs) to form differentiated service chains on demand. The SDN architecture may be integrated with orchestration platforms (e.g., orchestrator 23) such as Kubernetes, OpenShift, Mesos, OpenStack, VMware vSphere, and with service provider operations support systems/business support systems (OSS/BSS).

In general, one or more data center(s) 10 provide an operating environment for applications and services for customer sites 11 (illustrated as "customers 11") having one or more customer networks coupled to the data center by service provider network 7. Each of data center(s) 10 may, for example, host infrastructure equipment, such as networking and storage systems, redundant power supplies, and environmental controls. Service provider network 7 is coupled to public network 15, which may represent one or more networks administered by other providers, and may thus form part of a large-scale public network infrastructure, e.g., the Internet. Public network 15 may represent, for instance, a local area network (LAN), a wide area network (WAN), the Internet, a virtual LAN (VLAN), an enterprise LAN, a layer 3 virtual private network (VPN), an Internet Protocol (IP) intranet operated by the service provider that operates service provider network 7, an enterprise IP network, or some combination thereof.

Although customer sites 11 and public network 15 are illustrated and described primarily as edge networks of service provider network 7, in some examples, one or more of customer sites 11 and public network 15 may be tenant networks within any of data center(s) 10. For example, data center(s) 10 may host multiple tenants (customers) each associated with one or more virtual private networks (VPNs), each of which may implement one of customer sites 11.

Service provider network 7 offers packet-based connectivity to attached customer sites 11, data center(s) 10, and public network 15. Service provider network 7 may represent a network that is owned and operated by a service provider to interconnect a plurality of networks. Service provider network 7 may implement Multi-Protocol Label Switching (MPLS) forwarding and in such instances may be referred to as an MPLS network or MPLS backbone. In some instances, service provider network 7 represents a plurality of interconnected autonomous systems, such as the Internet, that offers services from one or more service providers.

In some examples, each of data center(s) 10 may represent one of many geographically distributed network data centers, which may be connected to one another via service provider network 7, dedicated network links, dark fiber, or other connections. As illustrated in the example of FIG. 1, data center(s) 10 may include facilities that provide network services for customers. A customer of the service provider may be a collective entity such as enterprises and governments or individuals. For example, a network data center may host web services for several enterprises and end users. Other exemplary services may include data storage, virtual private networks, traffic engineering, file service, data mining, scientific- or super-computing, and so on. Although illustrated as a separate edge network of service provider network 7, elements of data center(s) 10 such as one or more physical network functions (PNFs) or virtualized network functions (VNFs) may be included within the service provider network 7 core.

In this example, data center(s) 10 includes storage and/or compute servers (or "nodes") interconnected via switch fabric 14 provided by one or more tiers of physical network switches and routers, with servers 12A-12X (herein, "servers 12") depicted as coupled to top-of-rack switches 16A-16N. Servers 12 are computing devices and may also be referred to herein as "compute nodes," "hosts," or "host devices." Although only server 12A coupled to TOR switch 16A is shown in detail in FIG. 1, data center 10 may include many additional servers coupled to other TOR switches 16 of data center 10.

Switch fabric 14 in the illustrated example includes interconnected top-of-rack (TOR) (or other "leaf") switches 16A-16N (collectively, "TOR switches 16") coupled to a distribution layer of chassis (or "spine" or "core") switches 18A-18M (collectively, "chassis switches 18"). Although not shown, data center 10 may also include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. Data center(s) 10 may also include one or more physical network functions (PNFs) such as physical firewalls, load balancers, routers, route reflectors, broadband network gateways (BNGs), mobile core network elements, and other PNFs.

In this example, TOR switches 16 and chassis switches 18 provide servers 12 with redundant (multi-homed) connectivity to IP fabric 20 and service provider network 7. Chassis switches 18 aggregate traffic flows and provides connectivity between TOR switches 16. TOR switches 16 may be network devices that provide layer 2 (MAC) and/or layer 3 (e.g., IP) routing and/or switching functionality. TOR switches 16 and chassis switches 18 may each include one or more processors and a memory and can execute one or more software processes. Chassis switches 18 are coupled to IP fabric 20, which may perform layer 3 routing to route network traffic between data center 10 and customer sites 11 by service provider network 7. The switching architecture of data center(s) 10 is merely an example. Other switching architectures may have more or fewer switching layers, for instance. IP fabric 20 may include one or more gateway routers.

The term "packet flow," "traffic flow," or simply "flow" refers to a set of packets originating from a particular source device or endpoint and sent to a particular destination device or endpoint. A single flow of packets may be identified by the 5-tuple: <source network address, destination network address, source port, destination port, protocol>, for example. This 5-tuple generally identifies a packet flow to which a received packet corresponds. An n-tuple refers to any n items drawn from the 5-tuple. For example, a 2-tuple for a packet may refer to the combination of <source network address, destination network address> or <source network address, source port> for the packet.

Servers 12 may each represent a compute server or storage server. For example, each of servers 12 may represent a computing device, such as an x86 processor-based server, configured to operate according to techniques described herein. Servers 12 may provide Network Function Virtualization Infrastructure (NFVI) for an NFV architecture.

Any server of servers 12 may be configured with virtual execution elements, such as pods or virtual machines, by virtualizing resources of the server to provide some measure of isolation among one or more processes (applications) executing on the server. "Hypervisor-based" or "hardware-level" or "platform" virtualization refers to the creation of virtual machines that each includes a guest operating system for executing one or more processes. In general, a virtual machine provides a virtualized/guest operating system for executing applications in an isolated virtual environment. Because a virtual machine is virtualized from physical hardware of the host server, executing applications are isolated from both the hardware of the host and other virtual machines. Each virtual machine may be configured with one or more virtual network interfaces for communicating on corresponding virtual networks.

Virtual networks are logical constructs implemented on top of the physical networks. Virtual networks may be used to replace VLAN-based isolation and provide multi-tenancy in a virtualized data center, e.g., an of data center(s) 10. Each tenant or an application can have one or more virtual networks. Each virtual network may be isolated from all the other virtual networks unless explicitly allowed by security policy.

Virtual networks can be connected to and extended across physical Multi-Protocol Label Switching (MPLS) Layer 3 Virtual Private Networks (L3VPNs) and Ethernet Virtual Private Networks (EVPNs) networks using a datacenter 10 gateway router (not shown in FIG. 1). Virtual networks may also be used to implement Network Function Virtualization (NFV) and service chaining.

Virtual networks can be implemented using a variety of mechanisms. For example, each virtual network could be implemented as a Virtual Local Area Network (VLAN), Virtual Private Networks (VPN), etc. A virtual network can also be implemented using two networks—the physical underlay network made up of IP fabric 20 and switching fabric 14 and a virtual overlay network. The role of the physical underlay network is to provide an "IP fabric," which provides unicast IP connectivity from any physical device (server, storage device, router, or switch) to any other physical device. The underlay network may provide uniform low-latency, non-blocking, high-bandwidth connectivity from any point in the network to any other point in the network.

As described further below with respect to virtual router 21 (illustrated as and also referred to herein as "vRouter 21"), virtual routers running in servers 12 create a virtual overlay network on top of the physical underlay network using a mesh of dynamic "tunnels" amongst themselves. These overlay tunnels can be MPLS over GRE/UDP tunnels, or VXLAN tunnels, or NVGRE tunnels, for instance. The underlay physical routers and switches may not store any per-tenant state for virtual machines or other virtual execution elements, such as any Media Access Control (MAC) addresses, IP address, or policies. The forwarding tables of the underlay physical routers and switches may, for example, only contain the IP prefixes or MAC addresses of the physical servers 12. (Gateway routers or switches that connect a virtual network to a physical network are an exception and may contain tenant MAC or IP addresses.)

Virtual routers 21 of servers 12 often contain per-tenant state. For example, they may contain a separate forwarding table (a routing-instance) per virtual network. That forwarding table contains the IP prefixes (in the case of a layer 3 overlays) or the MAC addresses (in the case of layer 2 overlays) of the virtual machines or other virtual execution elements (e.g., pods of containers). No single virtual router 21 needs to contain all IP prefixes or all MAC addresses for all virtual machines in the entire data center. A given virtual router 21 only needs to contain those routing instances that are locally present on the server 12 (i.e., which have at least one virtual execution element present on the server 12.)

"Container-based" or "operating system" virtualization refers to the virtualization of an operating system to run multiple isolated systems on a single machine (virtual or physical). Such isolated systems represent containers, such as those provided by the open-source DOCKER Container application or by CoreOS Rkt ("Rocket"). Like a virtual machine, each container is virtualized and may remain isolated from the host machine and other containers. However, unlike a virtual machine, each container may omit an individual operating system and instead provide an application suite and application-specific libraries. In general, a container is executed by the host machine as an isolated user-space instance and may share an operating system and common libraries with other containers executing on the host machine. Thus, containers may require less processing power, storage, and network resources than virtual machines ("VMs"). A group of one or more containers may be configured to share one or more virtual network interfaces for communicating on corresponding virtual networks.

In some examples, containers are managed by their host kernel to allow limitation and prioritization of resources (CPU, memory, block I/O, network, etc.) without the need for starting any virtual machines, in some cases using namespace isolation functionality that allows complete isolation of an application's (e.g., a given container) view of the operating environment, including process trees, networking, user identifiers and mounted file systems. In some examples, containers may be deployed according to Linux Containers (LXC), an operating-system-level virtualization method for running multiple isolated Linux systems (containers) on a control host using a single Linux kernel.

Servers 12 host virtual network endpoints for one or more virtual networks that operate over the physical network represented here by IP fabric 20 and switch fabric 14. Although described primarily with respect to a data center-based switching network, other physical networks, such as service provider network 7, may underlay the one or more virtual networks.

Each of servers 12 may host one or more virtual execution elements each having at least one virtual network endpoint for one or more virtual networks configured in the physical network. A virtual network endpoint for a virtual network may represent one or more virtual execution elements that share a virtual network interface for the virtual network. For example, a virtual network endpoint may be a virtual machine, a set of one or more containers (e.g., a pod), or another virtual execution element(s), such as a layer 3 endpoint for a virtual network. The term "virtual execution element" encompasses virtual machines, containers, and other virtualized computing resources that provide an at least partially independent execution environment for applications. The term "virtual execution element" may also encompass a pod of one or more containers. Virtual execution elements may represent application workloads. As shown in FIG. 1, server 12A hosts one virtual network endpoint in the form of pod 22 having one or more containers. However, a server 12 may execute as many virtual execution elements as is practical given hardware resource limitations of the server 12. Each of the virtual network endpoints may use one or more virtual network interfaces to perform packet I/O or otherwise process a packet. For example, a virtual network endpoint may use one virtual hardware component (e.g., an SR-IOV virtual function) enabled by NIC 13A to perform packet I/O and receive/send packets on one or more communication links with TOR switch 16A. Other examples of virtual network interfaces are described below.

Servers 12 each includes at least one network interface card (NIC) 13, which each includes at least one interface to exchange packets with TOR switches 16 over a communication link. For example, server 12A includes NIC 13A. Any of NICs 13 may provide one or more virtual hardware components 21 for virtualized input/output (I/O). A virtual hardware component for I/O maybe a virtualization of the physical NIC (the "physical function"). For example, in Single Root I/O Virtualization (SR-IOV), which is described in the Peripheral Component Interface Special Interest Group SR-IOV specification, the PCIe Physical Function of the network interface card (or "network adapter") is virtualized to present one or more virtual network interfaces as "virtual functions" for use by respective endpoints executing on the server 12. In this way, the virtual network endpoints may share the same PCIe physical hardware resources and the virtual functions are examples of virtual hardware components 21. As another example, one or more servers 12 may implement Virtio, a para-virtualization framework available, e.g., for the Linux Operating System, that provides emulated NIC functionality as a type of virtual hardware component to provide virtual network interfaces to virtual network endpoints. As another example, one or more servers 12 may implement Open vSwitch to perform distributed virtual multilayer switching between one or more virtual NICs (vNICs) for hosted virtual machines, where such vNICs may also represent a type of virtual hardware component that provide virtual network interfaces to virtual network endpoints. In some instances, the virtual hardware components are virtual I/O (e.g., NIC) components. In some instances, the virtual hardware components are SR-IOV virtual functions. In some examples, any server of servers 12 may implement a Linux bridge that emulates a hardware bridge and forwards packets among virtual network interfaces of the server or between a virtual network interface of the server and a physical network interface of the server. For Docker implementations of containers hosted by a server, a Linux bridge or other operating system bridge, executing on the server, that switches packets among containers may be referred to as a "Docker bridge." The term "virtual router" as used herein may encompass a Contrail or Tungsten Fabric virtual router, Open vSwitch (OVS), an OVS bridge, a Linux bridge, Docker bridge, or other device and/or software that is located on a host device and performs switching, bridging, or routing packets among virtual network endpoints of one or more virtual networks, where the virtual network endpoints are hosted by one or more of servers 12.

Any of NICs 13 may include an internal device switch to switch data between virtual hardware components associated with the NIC. For example, for an SR-IOV-capable NIC, the internal device switch may be a Virtual Ethernet Bridge (VEB) to switch between the SR-IOV virtual functions and, correspondingly, between endpoints configured to use the SR-IOV virtual functions, where each endpoint may include a guest operating system. Internal device switches may be alternatively referred to as NIC switches or, for SR-IOV implementations, SR-IOV NIC switches. Virtual hardware components associated with NIC 13A may be associated with a layer 2 destination address, which may be assigned by the NIC 13A or a software process responsible for configuring NIC 13A. The physical hardware component (or "physical function" for SR-IOV implementations) is also associated with a layer 2 destination address.

One or more of servers 12 may each include a virtual router 21 that executes one or more routing instances for corresponding virtual networks within data center 10 to provide virtual network interfaces and route packets among the virtual network endpoints. Each of the routing instances may be associated with a network forwarding table. Each of the routing instances may represent a virtual routing and forwarding instance (VRF) for an Internet Protocol-Virtual Private Network (IP-VPN). Packets received by virtual router 21 of server 12A, for instance, from the underlying physical network fabric of data center 10 (i.e., IP fabric 20 and switch fabric 14) may include an outer header to allow the physical network fabric to tunnel the payload or "inner packet" to a physical network address for a network interface card 13A of server 12A that executes the virtual router. The outer header may include not only the physical network address of network interface card 13A of the server but also a virtual network identifier such as a VxLAN tag or Multiprotocol Label Switching (MPLS) label that identifies one of the virtual networks as well as the corresponding routing instance executed by virtual router 21. An inner packet includes an inner header having a destination network address that conforms to the virtual network addressing space for the virtual network identified by the virtual network identifier.

Virtual routers 21 terminate virtual network overlay tunnels and determine virtual networks for received packets based on tunnel encapsulation headers for the packets, and forwards packets to the appropriate destination virtual network endpoints for the packets. For server 12A, for example, for each of the packets outbound from virtual network endpoints hosted by server 12A (e.g., pod 22), virtual router 21 attaches a tunnel encapsulation header indicating the virtual network for the packet to generate an encapsulated or "tunnel" packet, and virtual router 21 outputs the encapsulated packet via overlay tunnels for the virtual networks to a physical destination computing device, such as another one of servers 12. As used herein, virtual router 21 may execute the operations of a tunnel endpoint to encapsulate inner packets sourced by virtual network endpoints to generate tunnel packets and decapsulate tunnel packets to obtain inner packets for routing to other virtual network endpoints.

In some examples, virtual router 21 may be kernel-based and execute as part of the kernel of an operating system of server 12A.

In some examples, virtual router 21 may be a Data Plane Development Kit (DPDK)-enabled virtual router. In such examples, virtual router 21 uses DPDK as a data plane. In this mode, virtual router 21 runs as a user space application that is linked to the DPDK library (not shown). This is a performance version of a virtual router and is commonly used by telecommunications companies, where the VNFs are often DPDK-based applications. The performance of virtual router 21 as a DPDK virtual router can achieve ten times higher throughput than a virtual router operating as a kernel-based virtual router. The physical interface is used by DPDK's poll mode drivers (PMDs) instead of Linux kernel's interrupt-based drivers.

A user-I/O (UIO) kernel module, such as vfio or uio_pci_generic, may be used to expose a physical network interface's registers into user space so that they are accessible by the DPDK PMD. When NIC 13A is bound to a UIO driver, it is moved from Linux kernel space to user space and therefore no longer managed nor visible by the Linux OS. Consequently, it is the DPDK application (i.e., virtual router 21A in this example) that fully manages NIC 13. This includes packets polling, packets processing, and packets forwarding. User packet processing steps may be performed by virtual router 21 DPDK data plane with limited or no participation by the kernel (where the kernel not shown in FIG. 1). The nature of this "polling mode" makes the virtual router 21 DPDK data plane packet processing/forwarding much more efficient as compared to the interrupt mode, particularly when the packet rate is high. There are limited or no interrupts and context switching during packet I/O. Additional details of an example of a DPDK vRouter are found in "DAY ONE: CONTRAIL DPDK vROUTER," 2021, Kiran K N et al., Juniper Networks, Inc., which is incorporated by reference herein in its entirety.

Computing infrastructure 8 implements an automation platform for automating deployment, scaling, and operations of virtual execution elements across servers 12 to provide virtualized infrastructure for executing application workloads and services. In some examples, the platform may be a container orchestration system that provides a container-centric infrastructure for automating deployment, scaling, and operations of containers to provide a container-centric infrastructure. "Orchestration," in the context of a virtualized computing infrastructure generally refers to provisioning, scheduling, and managing virtual execution elements and/or applications and services executing on such virtual execution elements to the host servers available to the orchestration platform. Container orchestration may facilitate container coordination and refers to the deployment, management, scaling, and configuration, e.g., of containers to host servers by a container orchestration platform. Example instances of orchestration platforms include Kubernetes (a container orchestration system), Docker swarm, Mesos/Marathon, OpenShift, OpenStack, VMware, and Amazon ECS.

Elements of the automation platform of computing infrastructure 8 include at least servers 12, orchestrator 23, and network controller 24. Containers may be deployed to a virtualization environment using a cluster-based framework in which a cluster master node of a cluster manages the deployment and operation of containers to one or more cluster minion nodes of the cluster. The terms "master node" and "minion node" used herein encompass different orchestration platform terms for analogous devices that distinguish between primarily management elements of a cluster and primarily container hosting devices of a cluster. For example, the Kubernetes platform uses the terms "cluster master" and "minion nodes," while the Docker Swarm platform refers to cluster managers and cluster nodes.

Orchestrator 23 and network controller 24 may execute on separate computing devices, execute on the same computing device. Each of orchestrator 23 and network controller 24 may be a distributed application that executes on one or more computing devices. Orchestrator 23 and network controller 24 may implement respective master nodes for one or more clusters each having one or more minion nodes implemented by respective servers 12 (also referred to as "compute nodes").

In general, network controller 24 controls the network configuration of the data center 10 fabric to, e.g., establish one or more virtual networks for packetized communications among virtual network endpoints. Network controller 24 provides a logically and in some cases physically centralized controller for facilitating operation of one or more virtual networks within data center 10. In some examples, network controller 24 may operate in response to configuration input received from orchestrator 23 and/or an administrator/operator. Additional information regarding example operations of a network controller 24 operating in conjunction with other devices of data center 10 or other software-defined network is found in International Application Number PCT/US2013/044378, filed Jun. 5, 2013, and entitled "PHYSICAL PATH DETERMINATION FOR VIRTUAL NETWORK PACKET FLOWS;" and in U.S. patent application Ser. No. 14/226,509, filed Mar. 26, 2014, and entitled "TUNNELED PACKET AGGREGATION FOR VIRTUAL NETWORKS," each which is incorporated by reference as if fully set forth herein.

In general, orchestrator 23 controls the deployment, scaling, and operations of containers across clusters of servers 12 and providing computing infrastructure, which may include container-centric computing infrastructure. Orchestrator 23 and, in some cases, network controller 24 may implement respective cluster masters for one or more Kubernetes clusters. As an example, Kubernetes is a container management platform that provides portability across public and private clouds, each of which may provide virtualization infrastructure to the container management platform. Example components of a Kubernetes orchestration system are described below with respect to FIG. 3.

In one example, pod 22 is a Kubernetes pod and an example of a virtual network endpoint. A pod is a group of one or more logically-related containers (not shown in FIG. 1), the shared storage for the containers, and options on how to run the containers. Where instantiated for execution, a pod may alternatively be referred to as a "pod replica." Each container of pod 22 is an example of a virtual execution element. Containers of a pod are always co-located on a single server, co-scheduled, and run in a shared context. The shared context of a pod may be a set of Linux namespaces, cgroups, and other facets of isolation.

Within the context of a pod, individual applications might have further sub-isolations applied. Typically, containers within a pod have a common IP address and port space and are able to detect one another via the localhost. Because they have a shared context, containers within a pod may also communicate with one another using inter-process communications (IPC). Examples of IPC include SystemV semaphores or POSIX shared memory. Generally, containers that are members of different pods have different IP addresses and are unable to communicate by IPC in the absence of a configuration for enabling this feature. Containers that are members of different pods instead usually communicate with each other via pod IP addresses.

Server 12A includes a container platform 19 for running containerized applications, such as those of pod 22. Container platform 19 receives requests from orchestrator 23 to obtain and host, in server 12A, containers. Container platform 19 obtains and executes the containers.

Container network interface (CNI) 17 configures virtual network interfaces for virtual network endpoints. The orchestrator 23 and container platform 19 use CNI 17 to manage networking for pods, including pod 22. For example, CNI 17 creates virtual network interfaces to connect pods to virtual router 21 and enables containers of such pods to communicate, via the virtual network interfaces, to other virtual network endpoints over the virtual networks. CNI 17 may, for example, insert a virtual network interface for a virtual network into the network namespace for containers in pod 22 and configure (or request to configure) the virtual network interface for the virtual network in virtual router 21 such that virtual router 21 is configured to send packets received from the virtual network via the virtual network interface to containers of pod 22 and to send packets received via the virtual network interface from containers of pod 22 on the virtual network. CNI 17 may assign a network address (e.g., a virtual IP address for the virtual network) and may set up routes for the virtual network interface.

In Kubernetes, by default all pods can communicate with all other pods without using network address translation (NAT). In some cases, the orchestrator 23 and network controller 24 create a service virtual network and a pod virtual network that are shared by all namespaces, from which service and pod network addresses are allocated, respectively. In some cases, all pods in all namespaces that are spawned in the Kubernetes cluster may be able to communicate with one another, and the network addresses for all of the pods may be allocated from a pod subnet that is specified by the orchestrator 23. When a user creates an isolated namespace for a pod, orchestrator 23 and network controller 24 may create a new pod virtual network and new shared service virtual network for the new isolated namespace. Pods in the isolated namespace that are spawned in the Kubernetes cluster draw network addresses from the new pod virtual network, and corresponding services for such pods draw network addresses from the new service virtual network CNI 17 may represent a library, a plugin, a module, a runtime, or other executable code for server 12A. CNI 17 may conform, at least in part, to the Container Network Interface (CNI) specification or the rkt Networking Proposal. CNI 17 may represent a Contrail, OpenContrail, Multus, Calico, cRPD, or other CNI. CNI 17 may alternatively be referred to as a network plugin or CNI plugin or CNI instance. Separate CNIs may be invoked by, e.g., a Multus CNI to establish different virtual network interfaces for pod 22.

CNI 17 may be invoked by orchestrator 23. For purposes of the CNI specification, a container can be considered synonymous with a Linux network namespace. What unit this corresponds to depends on a particular container runtime implementation: for example, in implementations of the application container specification such as rkt, each pod runs in a unique network namespace. In Docker, however, network namespaces generally exist for each separate Docker container. For purposes of the CNI specification, a network refers to a group of entities that are uniquely addressable and that can communicate amongst each other. This could be either an individual container, a machine/server (real or virtual), or some other network device (e.g. a router). Containers can be conceptually added to or removed from one or more networks. The CNI specification specifies a number of considerations for a conforming plugin ("CNI plugin").

Pod 22 includes one or more containers. In some examples, pod 22 includes a containerized DPDK workload that is designed to use DPDK to accelerate packet processing, e.g., by exchanging data with other components using DPDK libraries. Virtual router 21 may execute as a containerized DPDK workload in some examples.

Pod 22 is configured with virtual network interface 26 for sending and receiving packets with virtual router 21. Virtual network interface 26 may be a default interface for pod 22. Pod 22 may implement virtual network interface 26 as an Ethernet interface (e.g., named "eth0") while virtual router 21 may implement virtual network interface 26 as a tap interface, virtio-user interface, or other type of interface.

Pod 22 and virtual router 21 exchange data packets using virtual network interface 26. Virtual network interface 26 may be a DPDK interface. Pod 22 and virtual router 21 may set up virtual network interface 26 using vhost. Pod 22 may operate according to an aggregation model. Pod 22 may use a virtual device, such as a virtio device with a vhost-user adapter, for user space container inter-process communication for virtual network interface 26.

CNI 17 may configure, for pod 22, in conjunction with one or more other components shown in FIG. 1, virtual network interface 26. Any of the containers of pod 22 may utilize, i.e., share, virtual network interface 26 of pod 22.

Virtual network interface 26 may represent a virtual ethernet ("veth") pair, where each end of the pair is a separate device (e.g., a Linux/Unix device), with one end of the pair assigned to pod 22 and one end of the pair assigned to virtual router 21. The veth pair or an end of a veth pair are sometimes referred to as "ports". A virtual network interface may represent a macvlan network with media access control (MAC) addresses assigned to pod 22 and to virtual router 21 for communications between containers of pod 22 and virtual router 21. Virtual network interfaces may alternatively be referred to as virtual machine interfaces (VMIs), pod interfaces, container network interfaces, tap interfaces, veth interfaces, or simply network interfaces (in specific contexts), for instance.

In the example server 12A of FIG. 1, pod 22 is a virtual network endpoint in one or more virtual networks. Orchestrator 23 may store or otherwise manage configuration data for application deployments that specifies a virtual network and specifies that pod 22 (or the one or more containers therein) is a virtual network endpoint of the virtual network. Orchestrator 23 may receive the configuration data from a user, operator/administrator, or other computing system, for instance.

As part of the process of creating pod 22, orchestrator 23 requests that network controller 24 create respective virtual network interfaces for one or more virtual networks (indicated in the configuration data). Pod 22 may have a different virtual network interface for each virtual network to which it belongs. For example, virtual network interface 26 may be a virtual network interface for a particular virtual network. Additional virtual network interfaces (not shown) may be configured for other virtual networks.

Network controller 24 processes the request to generate interface configuration data for virtual network interfaces for the pod 22. Interface configuration data may include a container or pod unique identifier and a list or other data structure specifying, for each of the virtual network interfaces, network configuration data for configuring the virtual network interface. Network configuration data for a virtual network interface may include a network name, assigned virtual network address, MAC address, and/or domain name server values. An example of interface configuration data in JavaScript Object Notation (JSON) format is below.

Network controller 24 sends interface configuration data to server 12A and, more specifically in some cases, to virtual router 21. To configure a virtual network interface for pod 22, orchestrator 23 may invoke CNI 17. CNI 17 obtains the interface configuration data from virtual router 21 and processes it. CNI 17 creates each virtual network interface specified in the interface configuration data. For example, CNI 17 may attach one end of a veth pair implementing management interface 26 to virtual router 21 and may attach the other end of the same veth pair to pod 22, which may implement it using virtio-user.

The following is example interface configuration data for pod 22 for virtual network interface 26.

```
[{
    // virtual network interface 26
    "id": "fe4bab62-a716-11e8-abd5-0cc47a698428",
    "instance-id": "fe3edca5-a716-11e8-822c-0cc47a698428",
    "ip-address": "10.47.255.250",
    "plen": 12,
    "vn-id": "56dda39c-5e99-4a28-855e-6ce378982888",
    "vm-project-id": "00000000-0000-0000-0000-000000000000",
    "mac-address": "02:fe:4b:ab:62:a7",
    "system-name": "tapeth0fe3edca",
    "rx-vlan-id": 65535,
    "tx-vlan-id": 65535,
    "vhostuser-mode": 0,
    "v6-ip-address": "::",
    "v6-plen":,
    "v6-dns-server": "::",
    "v6-gateway": "::",
    "dns-server": "10.47.255.253",
```
-continued
```
    "gateway": "10.47.255.254",
    "author": "/usr/bin/contrail-vrouter-agent",
    "time": "426404:56:19.863169"
}]
```

A conventional CNI plugin is invoked by a container platform/runtime, receives an Add command from the container platform to add a container to a single virtual network, and such a plugin may subsequently be invoked to receive a Del(ete) command from the container/runtime and remove the container from the virtual network. The term "invoke" may refer to the instantiation, as executable code, of a software component or module in memory for execution by processing circuitry.

In accordance with techniques described in this disclosure, network controller 24 is a cloud-native, distributed network controller for software-defined networking (SDN) that is implemented using one or more configuration nodes 30 and one or more control nodes 32. Each of configuration nodes 30 may itself be implemented using one or more cloud-native, component microservices. Each of control nodes 32 may itself be implemented using one or more cloud-native, component microservices.

In some examples, configuration nodes 30 may be implemented by extending the native orchestration platform to support custom resources for the orchestration platform for software-defined networking and, more specifically, for providing northbound interfaces to orchestration platforms to support intent-driven/declarative creation and managing of virtual networks by, for instance, configuring virtual network interfaces for virtual execution elements, configuring underlay networks connecting servers 12, configuring overlay routing functionality including overlay tunnels for the virtual networks and overlay trees for multicast layer 2 and layer 3.

Network controller 24, as part of the SDN architecture illustrated in FIG. 1, may be multi-tenant aware and support multi-tenancy for orchestration platforms. For example, network controller 24 may support Kubernetes Role Based Access Control (RBAC) constructs, local identity access management (IAM) and external IAM integrations. Network controller 24 may also support Kubernetes-defined networking constructs and advanced networking features like virtual networking, BGPaaS, networking policies, service chaining and other telco features. Network controller 24 may support network isolation using virtual network constructs and support layer 3 networking.

To interconnect multiple virtual networks, network controller 24 may use (and configure in the underlay and/or virtual routers 21) import and export policies that are defined using a Virtual Network Router (VNR) resource. The Virtual Network Router resource may be used to define connectivity among virtual networks by configuring import and export of routing information among respective routing instances used to implement the virtual networks in the SDN architecture. A single network controller 24 may support multiple Kubernetes clusters, and VNR thus allows connecting multiple virtual networks in a namespace, virtual networks in different namespaces, Kubernetes clusters, and across Kubernetes clusters. VNR may also extend to support virtual network connectivity across multiple instances of network controller 24. VNR may alternatively be referred to herein as Virtual Network Policy (VNP) or Virtual Network Topology.

As shown in the example of FIG. 1, network controller 24 may maintain configuration data (e.g., config. 30) representative of virtual networks (VN) 50A-50N ("VNs 50") that represent policies and other configuration data for establishing VNs 50 within data centers 10 over the physical underlay network and/or virtual routers, such as virtual router 21 ("vRouter 21"). Network controller 24 may also maintain configuration data (e.g., config. 30) representative of virtual network routers (VNRs) 52A-52N ("VNRs 52") that may be implemented, at least in part, using policies and other configuration data for establishing interconnectivity between VNs 50.

A user, such as an administrator, may interact with UI 60 of network controller 24 to define VNs 50 and VNRs 52. In some instances, UI 60 represents a graphical user interface (GUI) that facilitate entry of the configuration data that defines VNs 50 and VNR 52. In other instances, UI 60 may represent a command line interface (CLI) or other type of interface. Assuming that UI 60 represents a graphical user interface, the administrator may define VNs 50 by arranging graphical elements representative of different pods, such as pod 22, to associate pods with VNs 50, where any of VNs 50 enables communications among one or more pods assigned to that VN.

In this respect, an administrator may understand Kubernetes or other orchestration platforms but not fully understand the underlying infrastructure that supports VNs 50. Some controller architectures, such as Contrail, may configure VNs 50 based on networking protocols that are similar, if not substantially similar, to routing protocols in traditional physical networks. For example, Contrail may utilize concepts from a border gateway protocol (BGP), which is a routing protocol used for communicating routing information within so-called autonomous systems (ASes) and sometimes between ASes.

There are different versions of BGP, such as internal BGP (iBGP) for communicating routing information within ASes, and external BGP (eBGP) for communicating routing information between ASes. ASes may be related to the concept of projects within Contrail, which is also similar to namespaces in Kubernetes. In each instance of AS, projects, and namespaces, an AS, like projects, and namespaces may represent a collection of one or more networks (e.g., one or more of VNs 50) that may share routing information and thereby facilitate interconnectivity between networks (or, in this instances, VNs 50).

In the simplest form, VNRs 52 represent a logical abstraction of a router set in the context of Kubernetes, where VNRs 52 may be defined as a custom resource to facilitate interconnectivity between VNs 50. Given that Kubernetes administrators may not fully understand intricate dissemination of routing information according to complicated routing protocols, such as BGP, various aspects of the cloud-native networking techniques may facilitate abstraction of the underlying routing protocols (or the complimentary processes of Contrail or other controller architectures) as VNRs 52.

That is, rather that resort to defining how routing is to occur between two or more VNs 50, the administrator may define one or more VNRs 52 to interconnect VNs 50 without having to manually develop and deploy extensive policies and/or routing instance configurations to enable the exchange of routing information between such VNs 50. Instead, the administrator (which may have little understanding of routing protocols) may define a custom resource (e.g., one or more of VNRs 52) using familiar Kubernetes syntax/semantics (or even just by dragging graphical elements and specifying interconnections between this graphical element representative of, as an example, VNR 52A, and graphical elements representative of, again as an example, VNs 50A and 50N).

In this respect, administrators may easily interconnect VNs 50 using the logical abstraction shown in the example of FIG. 1 as VNRs 50, whereupon network controller 24 may translate VNRs 50 into underlying route targets to automatically (meaning with little or possibly without any human intervention) cause routing information for VNs 50A and 50N to be exchanged and enable communication (meaning, exchange of packets or other data) between VNs 50A and 50N.

Given that administrator may employ familiar Kubernetes syntax/semantics to configure VNRs 50 rather the configure complicated configuration data that conforms to routing protocol syntax/semantics, network controller 24 may facilitate a better user experience while also promoting more efficient operation of data center 8 itself. That is, having administrators enter configuration data for which such administrators are unfamiliar may result in misconfiguration that wastes underlying resources of data center 8 (in terms of processing cycles, memory, bus bandwidth, etc. along with associated power) while also delaying proper implementation of the network topologies (which may prevent successful routing of packets and other data between VNs 50). This delay may not only frustrate administrators but also customers associated with VNs 50 that may require prompt operation of VNs 50 to achieve business goals. By enabling administrators to easily facilitate communication between VNs 50 using the logical abstractions shown as VNRs 50, data center 8 may itself experience more efficient operation (in terms of the above computing resources including processor cycles, memory, bus bandwidth and associated power) while providing a better user experience for both administrators and customers.

Figure 3:
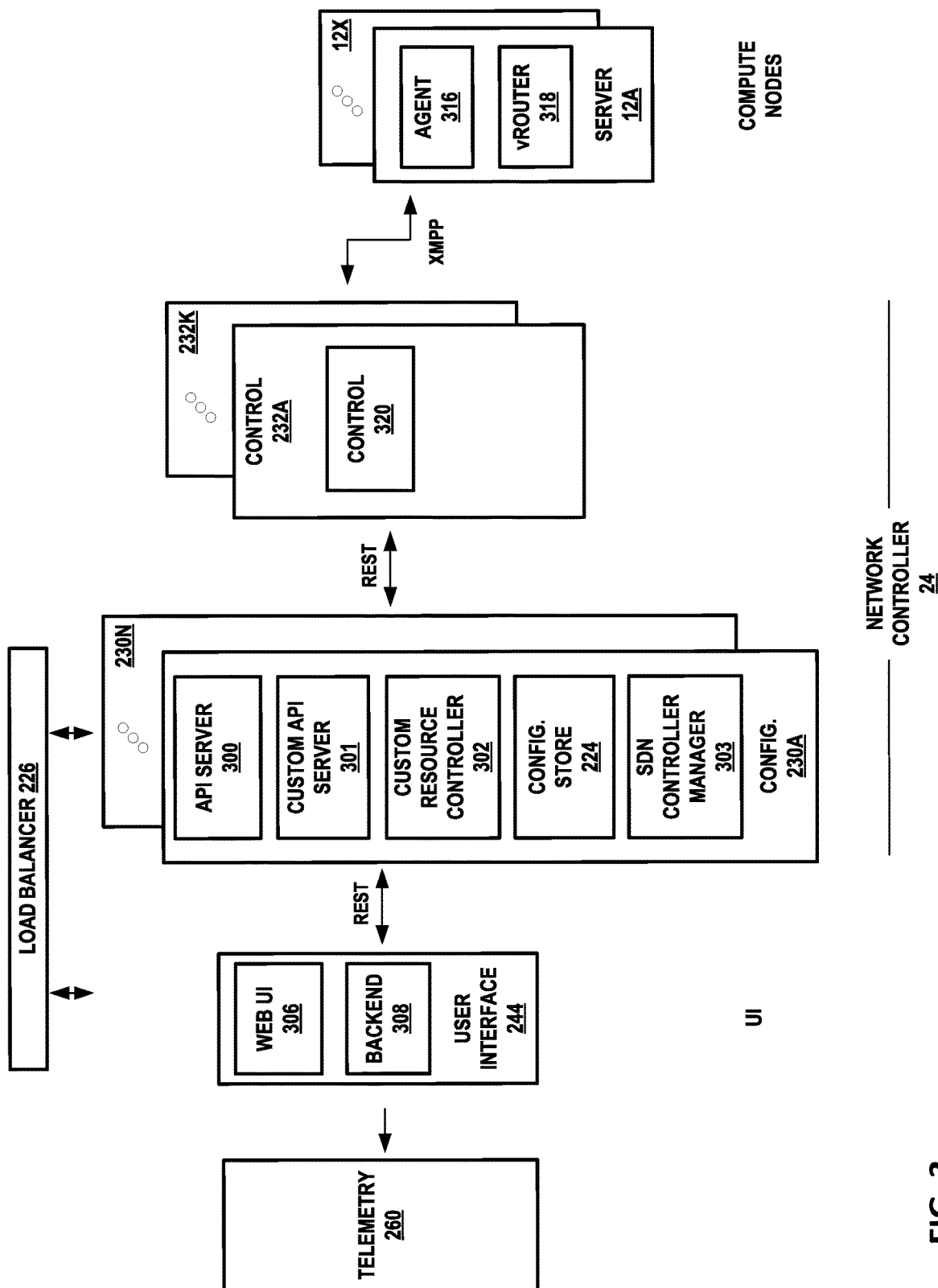
FIG. 3 is a block diagram illustrating another view of components of the SDN architecture and in further detail, in accordance with techniques of this disclosure.

In operation, network controller 24, an SDN architecture system representative of data center 10, includes processing circuitry to implement a configuration node and a control node (as described in more detail with respect to the example of FIG. 3). Network controller 24 may be configured to interconnect a first virtual network (e.g., VN 50A) and a second virtual network (e.g., VN 50N) operating within the SDN architecture system represented by data center 10. Network controller 24 may be configured to define a logical abstraction of one or more policies to perform such interconnection via one or more of VNRs 52, e.g., VNR 52A.

The policies may include import and export policies with respect to routing information maintained by the virtual networks (which, in this example, may refer to VNs 50A and 50N). That is, Kubernetes may be expanded, via a custom resource representative of VNR 52A, to translate VNR 52A into one or more import and export policies that are deployed with respect to VN 50A and VN 50N so as configure intercommunication via routing information distribution between VN 50A and VN 50N. Once configured, VN 50A may export routing information (e.g., representative of routes for VN 50A) to VN 50N and import routing information (e.g., representative of routes for VN 50N) to VN 50A. Likewise, VN 50N may export routing information (e.g., representative of routes for VN 50N) to VN 50A and import routing information (e.g., representative of routes for VN 50A) to VN 50N.

The abstraction may hide underlying routing configuration to enable such routing leaking, such as route targets that define routing information import and export to routing instances used to implement VN 50A and VN 50N. Instead, network controller 24 may translate VNR 52A to a common route target and configure communication of routing information via the common route target for the routing instances used to implement VN 50A and VN 50N (in this example).

To implement mesh connectivity, network controller 24 may configure the import and the export of the routing instance for VN 50A, VN 50N, and VNR 52A with the route target associated with VN 50A, VN 50N, and VNR 52A. To implement hub-and-spoke connectivity, network controller 24 may configure the export for the routing instances associated with VN 50A and VN 50N to export routing information to the routing instances associated with VNR 52A (acting as the hub) and the routing instances for VNR 52A to import routing information to the routing instances associated with VN 50A and VN 50N. In this hub- and spoke connectivity, VN 50A and VN 50N may not communicate directly with one another.

In addition, network controller 24 may enable multi layers of security using network policies. The Kubernetes default behavior is for pods to communicate with one another. In order to apply network security policies, the SDN architecture implemented by network controller 24 and virtual router 21 may operate as a CNI for Kubernetes through CNI 17. For layer 3, isolation occurs at the network level and virtual networks operate at L3. Virtual networks are connected by policy. The Kubernetes native network policy provides security at layer 4. The SDN architecture may support Kubernetes network policies. Kubernetes network policy operates at the Kubernetes namespace boundary. The SDN architecture may add custom resources for enhanced network policies. The SDN architecture may support application-based security. (These security policies can in some cases be based upon metatags to apply granular security policy in an extensible manner.) For layer 4+, the SDN architecture may in some examples support integration with containerized security devices and/or Istio and may provide encryption support.

Network controller 24, as part of the SDN architecture illustrated in FIG. 1, may support multi-cluster deployments, which is important for telco cloud and high-end enterprise use cases. The SDN architecture may support multiple Kubernetes clusters, for instance. A Cluster API can be used to support life cycle management of Kubernetes clusters. KubefedV2 can be used for configuration nodes 32 federation across Kubernetes clusters. Cluster API and KubefedV2 are optional components for supporting a single instance of a network controller 24 supporting multiple Kubernetes clusters.

The SDN architecture may provide insights at infrastructure, cluster, and application using web user interface and telemetry components. Telemetry nodes may be cloud-native and include microservices to support insights.

As a result of the above features and others that will be described elsewhere herein, computing infrastructure 8 implements an SDN architecture that is cloud-native and may present one or more of the following technical advantages. For example, network controller 24 is a cloud-native, lightweight distributed application with a simplified installation footprint. This also facilitates easier and modular upgrade of the various component microservices for configuration node(s) 30 and control node(s) 32 (as well as any other components of other example of a network controller described in this disclosure). The techniques may further enable optional cloud-native monitoring (telemetry) and user interfaces, a high-performance data plane for containers using a DPDK-based virtual router connecting to DPDK-enabled pods, and cloud-native configuration management that in some cases leverages a configuration framework for existing orchestration platforms, such as Kubernetes or Openstack. As a cloud-native architecture, network controller 24 is a scalable and elastic architecture to address and support multiple clusters. Network controller 24 in some cases may also support scalability and performance requirements for key performance indicators (KPIs).

An SDN architecture having features and technical advantages such as those described herein can be used to implement cloud-native telco clouds to support, for instance, 5G mobile networking (and subsequent generations) and edge computing, as well as enterprise Kubernetes platforms including, for instance, high performance cloud-native application hosting. Telco cloud applications are rapidly moving towards containerized, cloud-native approaches. 5G fixed and mobile networks are driving the requirement to deploy workloads as microservices with significant disaggregation, particularly in the 5G Next-Gen RAN (5GNR). The 5G NextGen Core (5GNC) is likely to be deployed as a set of microservices-based applications corresponding to each of the different components described by the 3GPP. When viewed as groups of microservices delivering applications, it 5GNC is likely to be a highly complex combination of pods with complex networking, security, and policy requirements. The cloud-native SDN architecture described herein, having well-defined constructs for networking, security, and policy, can be leveraged for this use case. Network controller 24 may provide the relevant APIs to be able to create these complex constructs.

Likewise, the user plane function (UPF) within the 5GNC will be an ultra-high-performance application. It may be delivered as a highly distributed set of high-performance pods. The SDN architecture described herein may be able to offer very high throughput data plane (both in terms of bits per section (bps) and packets per second (pps)). Integration with a DPDK virtual router with recent performance enhancements, eBPF, and with SmartNIC will be assist with achieving the throughput required. A DPDK-based virtual router is described in further detail in U.S. application Ser. No. 17/649,632, filed Feb. 1, 2022, entitled "CONTAINERIZED ROUTER WITH VIRTUAL NETWORKING", which is incorporated herein by reference in its entirety.

High performance processing is likely to be also relevant in the GiLAN as workloads there are migrated from more traditional virtualized workloads to containerized microservices. In the data plane of both the UPF and the GiLAN services, such as GiLAN firewall, intrusion detection and prevention, virtualized IP multimedia subsystem (vIMS) voice/video, and so forth, the throughput will be high and sustained both in terms of bps and pps. For the control plane of 5GNC functions, such as Access and Mobility Management Function (AMF), Session Management Function (SMF), etc., as well as for some GiLAN services (e.g., IMS), while the absolute volume of traffic in terms of bps may be modest, the predominance of small packets means that pps will remain high. In some examples, the SDN controller and data plane provide multi-million packets per second per virtual router 21, as implemented on servers 12. In the 5G radio access network (RAN), to move away from the proprietary vertically integrated RAN stacks provided by legacy radio vendors, Open RAN decouples the RAN hardware and software in a number of components including non-RT Radio Intelligent Controller (RIC), near-real-time RIC, centralized unit (CU) control plane and user plane (CU-CP and CU-UP), distributed unit (DU), and radio unit (RU). Software components are deployed on commodity server architectures supplemented with programmable accelerators where necessary. The SDN architecture described herein may support the O-RAN specifications.

Edge compute is likely to be primarily targeted at two different use cases. The first will be as a support for containerized telco infrastructure (e.g. 5G RAN, UPF, Security functions) and the second will be for containerized service workloads, both from the telco as well as from third parties such as vendors or enterprise customers. In both cases, edge compute is effectively a special case of the GiLAN, where traffic is broken out for special handling at highly distributed locations. In many cases, these locations will have limited resources (power, cooling, space).

The SDN architecture described herein may be well-suited to support the requirement of a very lightweight footprint, may support compute and storage resources in sites remote from the associated control functions, and may be location-aware in the way in which workloads and storage are deployed. Some sites may have as few as one or two compute nodes delivering a very specific set of services to a highly localized set of users or other services. There is likely to be a hierarchy of sites where the central sites are densely connected with many paths, regional sites are multiply connected with two to four uplink paths and the remote edge sites may have connections to only one or two upstream sites.

This calls for extreme flexibility in the way in which the SDN architecture may be deployed and the way (and location) in which tunneled traffic in the overlay is terminated and bound into the core transport network (SRv6, MPLS, etc.). Likewise, in sites that host telco cloud infrastructure workloads, the SDN architecture described herein may support specialized hardware (GPU, SmartNIC, etc.) required by high-performance workloads. There may also be workloads that require SR-IOV. As such, the SDN architecture may also support the creation of VTEPs at the ToR and linking that back into the overlay as VXLAN.

It is expected that there will be a mix of fully distributed Kubernetes micro clusters where each site runs its own master(s), and the SDN architecture may support Remote Compute-like scenarios.

For use cases involving an enterprise Kubernetes platform, high-performance cloud-native applications power financial services platforms, online gaming services, and hosted application service providers. The cloud platforms that deliver these applications must provide high performance, resilience against failures, with high security and visibility. The applications hosted on these platforms tend to be developed in-house. The application developers and platform owners work with the infrastructure teams to deploy and operate instances of the organization's applications. These applications tend to require high throughput (>20 Gbps per server), and low latency. Some applications may also use multicast for signaling or payload traffic. Additional hardware, and network infrastructure may be leveraged to ensure availability. Applications and microservices will leverage namespaces within the cluster for partitioning. Isolation between namespaces is critical in high-security environments. While default deny policies are the standard posture in zero-trust application deployment environments, additional network segmentation using virtual routing and forwarding instances (VRFs) adds an additional layer of security and allows for the use of overlapping network ranges. Overlapping network ranges are a key requirement for managed application hosting environments, which tend to standardize on a set of reachable endpoints for all managed customers.

Complex microservice-based applications tend to leverage complex network filters. The SDN architecture described herein may deliver high performance firewall filtering at scale. Such filtering can exhibit consistent forwarding performance, with less latency degradation regardless of rule-set length or sequence. Some customers may also have some of the same regulatory pressures as telcos with respect to the separation of applications, not just at the network layer, but also in the kernel. Financials, but also others have the requirement for data plane encryption, particularly when running on the public cloud. In some examples, the SDN architecture described herein may include features for satisfying these requirements.

In some examples, the SDN architecture may provide GitOps-friendly UX for strict change management controls, auditing and reliability of making changes in production several times per day, even hundreds of times per day when the SDN architecture is automated through an application dev/test/stage/prod continuous integration/continuous development (CI/CD) pipeline.

Figure 2:
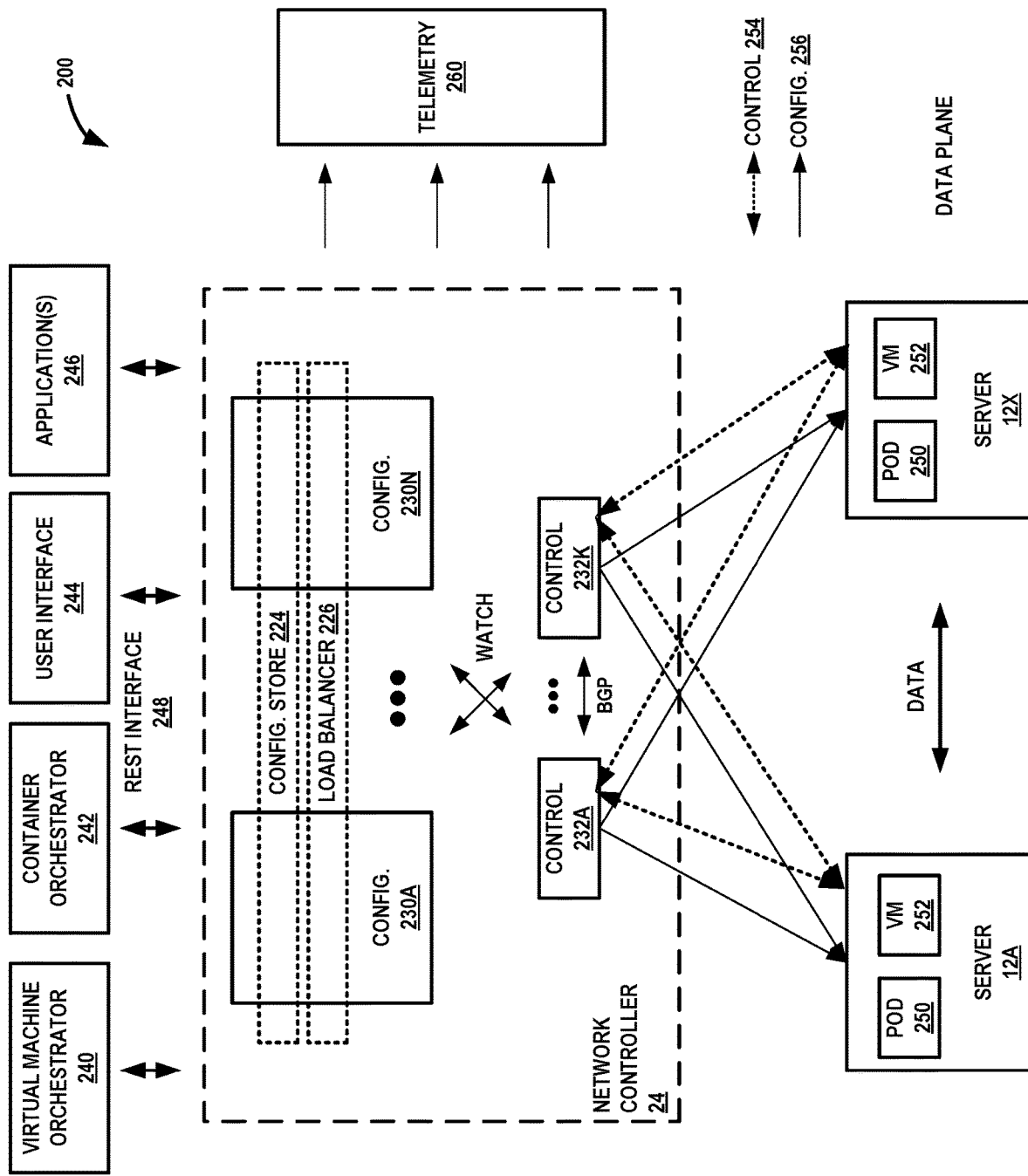
FIG. 2 is a block diagram illustrating an example of a cloud-native SDN architecture for cloud native networking, in accordance with techniques of this disclosure.

FIG. 2 is a block diagram illustrating an example of a cloud-native SDN architecture for cloud native networking, in accordance with techniques of this disclosure. SDN architecture 200 is illustrated in a manner that abstracts underlying connectivity among the various components. In this example, network controller 24 of SDN architecture 200 includes configuration nodes 230A-230N ("configuration nodes" or "config nodes" and collectively, "configuration nodes 230") and control nodes 232A-232K (collectively, "control nodes 232"). Configuration nodes 230 and control nodes 232 may represent examples implementations of configuration nodes 30 and control nodes 32 of FIG. 1, respectively. Configuration nodes 230 and control nodes 232, although illustrated as separate from servers 12, may be executed as one or more workloads on servers 12.

Configuration nodes 230 offer northbound, REpresentational State Transfer (REST) interfaces to support intent-driven configuration of SDN architecture 200. Example platforms and applications that may be used to push intents to configuration nodes 230 include virtual machine orchestrator 240 (e.g., Openstack), container orchestrator 242 (e.g., Kubernetes), user interface 242, or other one or more application(s) 246. In some examples, SDN architecture 200 has Kubernetes as its base platform.

SDN architecture 200 is divided into a configuration plane, control plane, and data plane, along with an optional telemetry (or analytics) plane. The configuration plane is implemented with horizontally scalable configuration nodes 230, the control plane is implemented with horizontally scalable control nodes 232, and the data plane is implemented with compute nodes.

At a high level, configuration nodes 230 uses configuration store 224 to manage the state of configuration resources of SDN architecture 200. In general, a configuration resource (or more simply "resource") is a named object schema that includes data and/or methods that describe the custom resource, and an application programming interface (API) is defined for creating and manipulating the data through an API server. A kind is the name of an object schema. Configuration resources may include Kubernetes native resources, such as Pod, Ingress, Configmap, Service, Role, Namespace, Node, Networkpolicy, or LoadBalancer.

In accordance with techniques of this disclosure, configuration resources also include custom resources, which are used to extend the Kubernetes platform by defining an application program interface (API) that may not be available in a default installation of the Kubernetes platform. In the example of SDN architecture 200, custom resources may describe physical infrastructure, virtual infrastructure (e.g., VNs 50 and/or VNRs 52), configurations, and/or other resources of SDN architecture 200. As part of the configuration and operation SDN architecture 200, various custom resources may be instantiated (e.g., VNRs 52 within vRouter 21). Instantiated resources (whether native or custom) may be referred to as objects or as instances of the resource, which are persistent entities in SDN architecture 200 that represent an intent (desired state) and the status (actual state) of the SDN architecture 200.

Configuration nodes 230 provide an aggregated API for performing operations on (i.e., creating, reading, updating, and deleting) configuration resources of SDN architecture 200 in configuration store 224. Load balancer 226 represents one or more load balancer objects that load balance configuration requests among configuration nodes 230. Configuration store 224 may represent one or more etcd databases. Configuration nodes 230 may be implemented using Nginx.

SDN architecture 200 may provide networking for both Openstack and Kubernetes. Openstack uses a plugin architecture to support networking. With virtual machine orchestrator 240 that is Openstack, the Openstack networking plugin driver converts Openstack configuration objects to SDN architecture 200 configuration objects (resources). Compute nodes run Openstack nova to bring up virtual machines.

With container orchestrator 242 that is Kubernetes, SDN architecture 200 functions as a Kubernetes CNI. As noted above, Kubernetes native resources (pod, services, ingress, external load balancer, etc.) may be supported, and SDN architecture 200 may support custom resources for Kubernetes for advanced networking and security for SDN architecture 200.

Configuration nodes 230 offer REST watch to control nodes 232 to watch for configuration resource changes, which control nodes 232 effect within the computing infrastructure. Control nodes 232 receive configuration resource data from configuration nodes 230, by watching resources, and build a full configuration graph. A given one of control nodes 232 consumes configuration resource data relevant for the control nodes and distributes required configurations to the compute nodes (servers 12) via control interfaces 254 to the control plane aspect of virtual router 21 (i.e., the virtual router agent—not shown in FIG. 1). Any of compute nodes 232 may receive only a partial graph, as is required for processing. Control interfaces 254 may be XMPP. The number of configuration nodes 230 and control nodes 232 that are deployed may be a function of the number of clusters supported. To support high availability, the configuration plane may include 2N+1 configuration nodes 230 and 2N control nodes 232.

Control nodes 232 distributes routes among the compute nodes. Control node 232 uses iBGP to exchange routes among control nodes 232, and control nodes 232 may peer with any external BGP supported gateways or other routers. Control nodes 232 may use a route reflector.

Pods 250 and virtual machines 252 are examples of workloads that may be deployed to the compute nodes by virtual machine orchestrator 240 or container orchestrator 242 and interconnected by SDN architecture 200 using one or more virtual networks.

FIG. 3 is a block diagram illustrating another view of components of SDN architecture 200 and in further detail, in accordance with techniques of this disclosure. Configuration nodes 230, control nodes, 232, and user interface 244 are illustrated with their respective component microservices for implementing network controller 24 and SDN architecture 200 as a cloud-native SDN architecture. Each of the component microservices may be deployed to compute nodes.

FIG. 3 illustrates a single cluster divided into network controller 24, user interface 244, compute (servers 12), and telemetry 260 features. Configuration nodes 230 and control nodes 230 together form network controller 24.

Configuration nodes 230 may include component microservices API server 300 (or "Kubernetes API server 300"—corresponding controller 406 not shown in FIG. 3), custom API server 301, custom resource controller 302, and SDN controller manager 303 (sometimes termed "kube-manager" or "SDN kube-manager" where the orchestration platform for network controller 24 is Kubernetes). Contrail-kube-manager is an example of SDN controller manager 303. Configuration nodes 230 extend the API server 300 interface with a custom API server 301 to form an aggregation layer to support a data model for SDN architecture 200. SDN architecture 200 configuration intents may be custom resources, as described above.

Control nodes 232 may include component microservices control 320 and coreDNS 322. Control 320 performs configuration distribution and route learning and distribution, as described above with respect to FIG. 2.

Compute nodes are represented by servers 12. Each compute node includes a virtual router agent 316 and virtual router forwarding component (vRouter) 318. Either or both of virtual router agent 316 and vRouter 318 may be component microservices. In general, virtual router agent 316 performs control related functions. Virtual router agent 316 receives configuration data from control nodes 232 and converts the configuration data to forwarding information for vRouter 318. Virtual router agent 316 may also performs firewall rule processing, set up flows for vRouter 318, and interface with orchestration plugins (CNI for Kubernetes and Nova plugin for Openstack). Virtual router agent 316 generates routes as workloads (Pods or VMs) are brought up on the compute node, and virtual router 316 exchanges such routes with control nodes 232 for distribution to other compute nodes (control nodes 232 distribute the routes among control nodes 232 using BGP). Virtual router agent 316 also withdraws routes as workloads are terminated. vRouter 318 may support one or more forwarding modes, such as kernel mode, DPDK, SmartNIC offload, and so forth. In some examples of container architectures or virtual machine workloads, compute nodes may be either Kubernetes worker/minion nodes or Openstack nova-compute nodes, depending on the particular orchestrator in use.

One or more optional telemetry node(s) 260 provide metrics, alarms, logging, and flow analysis. SDN architecture 200 telemetry leverages cloud native monitoring services, such as Prometheus, Elastic, Fluentd, Kinaba stack (EFK) and Influx TSDB. The SDN architecture component microservices of configuration nodes 230, control nodes 232, compute nodes, user interface 244, and analytics nodes (not shown) may produce telemetry data. This telemetry data may be consumed by services of telemetry node(s) 260. Telemetry node(s) 260 may expose REST endpoints for users and may support insights and event correlation.

Optional user interface 244 includes web user interface (UI) 306 and UI backend 308 services. In general, user interface 244 provides configuration, monitoring, visualization, security, and troubleshooting for the SDN architecture components.

Each of telemetry 260, user interface 244, configuration nodes 230, control nodes 232, and servers 12/compute nodes may be considered SDN architecture 200 nodes, in that each of these nodes is an entity to implement functionality of the configuration, control, or data planes, or of the UI and telemetry nodes. Node scale is configured during "bring up," and SDN architecture 200 supports automatic scaling of SDN architecture 200 nodes using orchestration system operators, such as Kubernetes operators.

As noted above, SDN architecture 200 configuration intents may be custom resources. One such custom resource may include VNRs 52 (shown in the example of FIG. 1) by which to establish communication between two or more VNs 50 in the manner described above. VNRs 52 may, as noted above, represent a logical abstraction of policies used to configure import and export of routing information between VNs 50, whereby VNRs 52 may facilitate the exchange (referring to asymmetric or symmetric import and export) of routing information using a common route target established for each of VNRs 52. The common route target may be defined and associated with routing instances used to implement VNs 50.

An administrator, such as a Kubernetes administrator, may interface with user interface 244 (e.g., web UI 306) to define VNRs 52, possibly via a graphical user interface having graphical elements that represent pods, VNs 50, etc. To define VNRs 52, the administrator may associate VNRs 52 with one or more labels assigned to VNs 50. Using these labels, VNRs 52 may establish the import and export policies to and from the common route target created when instantiating VNRs 52. Web UI 306 may interface with configuration controllers 230 to create the common route target, installing the common route target via control nodes 232 into one or more virtual routers 318. Web UI 306 may also, via configuration controllers 230 and control nodes 232, define a routing instance for the common route target (to distinguish the common route target from other common route targets), utilizing this routing domain to facilitate interconnection between VNs 50 as will be described in greater detail below with respect to a number of different networking schemes.

Figure 4:
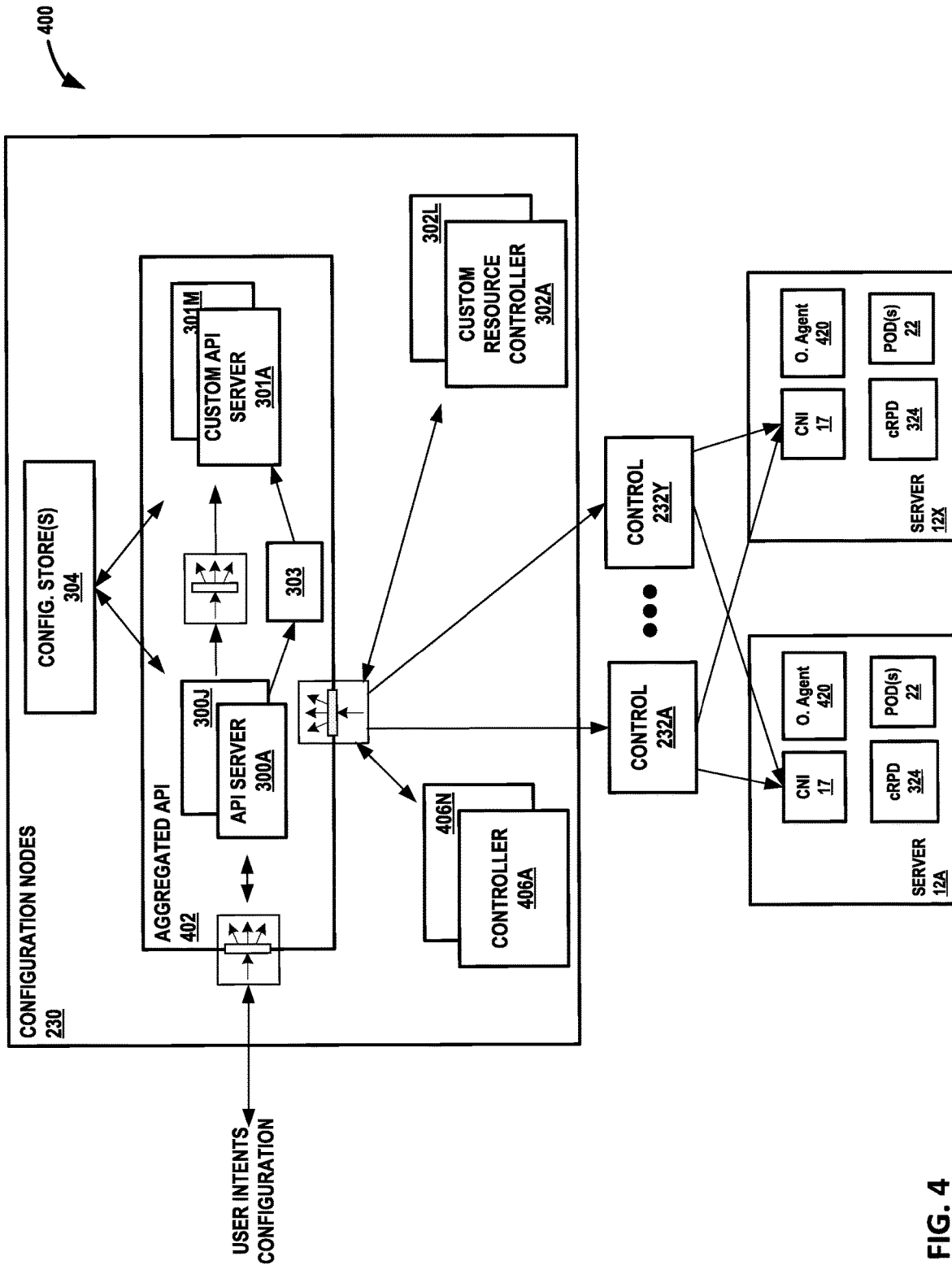
FIG. 4 is a block diagram illustrating example components of an SDN architecture, in accordance with techniques of this disclosure.

FIG. 4 is a block diagram illustrating example components of an SDN architecture, in accordance with techniques of this disclosure. In this example, SDN architecture 400 extends and uses Kubernetes API server for network configuration objects that realize user intents for the network configuration. Such configuration objects, in Kubernetes terminology, are referred to as custom resources and when persisted in SDN architecture are referred to simply as objects. Configuration objects are mainly user intents (e.g., Virtual Networks—such as VNs 50, VNRs 52, BGPaaS, Network Policy, Service Chaining, etc.).

SDN architecture 400 configuration nodes 230 may uses Kubernetes API server for configuration objects. In kubernetes terminology, these are called custom resources.

Kubernetes provides two ways to add custom resources to a cluster:
  Custom Resource Definitions (CRDs) are simple and can be created without any programming.
  API Aggregation requires programming but allows more control over API behaviors, such as how data is stored and conversion between API versions.

Aggregated APIs are subordinate API servers that sit behind the primary API server, which acts as a proxy. This arrangement is called API Aggregation (AA). To users, it simply appears that the Kubernetes API is extended. CRDs allow users to create new types of resources without adding another API server. Regardless of how they are installed, the new resources are referred to as Custom Resources (CR) to distinguish them from native Kubernetes resources (e.g., Pods). CRDs were used in the initial Config prototypes. The architecture may use the API Server Builder Alpha library to implement an aggregated API. API Server Builder is a collection of libraries and tools to build native Kubernetes aggregation extensions.

Usually, each resource in the Kubernetes API requires code that handles REST requests and manages persistent storage of objects. The main Kubernetes API server 300 (implemented with API server microservices 300A-300J) handles native resources and can also generically handle custom resources through CRDs. Aggregated API 402 represents an aggregation layer that extends the Kubernetes API server 300 to allow for provide specialized implementations for custom resources by writing and deploying custom API server 301 (using custom API server microservices 301A-301M). The main API server 300 delegates requests for the custom resources to custom API server 301, thereby making such resources available to all of its clients.

In this way, API server 300 (e.g., kube-apiserver) receives the Kubernetes configuration objects, native objects (pods, services) and custom resources. Custom resources for SDN architecture 400 may include configuration objects that, when an intended state of the configuration object in SDN architecture 400 is realized, implements an intended network configuration of SDN architecture 400, including implementation of each of VNRs 52 as one or more import policies and/or one or more export policies along with the common route target (and routing instance). Realizing VNRs 52 within SDN architecture 400 may, as described above, result in the import and/or export policies that interconnect two or more VNs 50 as described in more detail below.

In this respect, custom resources may correspond to configuration schemas traditionally defined for network configuration but that, according to techniques of this disclosure, are extended to be manipulable through aggregated API 402. Such custom resources may be alternately termed and referred to herein as "custom resources for SDN architecture configuration." These may include VNs, VNRs, bgp-as-a-service (BGPaaS), subnet, virtual router, service instance, project, physical interface, logical interface, node, network ipam, floating ip, alarm, alias ip, access control list, firewall policy, firewall rule, network policy, route target, routing instance. Custom resources for SDN architecture configuration may correspond to configuration objects conventionally exposed by an SDN controller, but in accordance with techniques described herein, the configuration objects are exposed as custom resources and consolidated along with Kubernetes native/built-in resources to support a unified intent model, exposed by aggregated API 402, that is realized by Kubernetes controllers 406A-406N and by custom resource controller 302 (shown in FIG. 4 with component microservices 302A-302L) that works to reconcile the actual state of the computing infrastructure including network elements with the intended state.

Given the unified nature in terms of exposing custom resources consolidated along with Kubernetes native/built-in resources, a Kubernetes administrator (or other Kubernetes user) may define VNRs, such as VNRs 52, using common Kubernetes semantics that may then be translated into complex policies detailing the import and export of routing information to facilitate interconnection of VNs 50 without requiring much if any understanding of BGP and other routing protocols typically required to interconnect VNs 50. As such, various aspects of the techniques may promote a more unified user experience that potentially results in less misconfiguration and trial-and-error, which may improve the execution of SDN architecture 400 itself (in terms of utilizing less processing cycles, memory, bandwidth, etc., and associated power).

API server 300 aggregation layer sends API custom resources to their corresponding, registered custom API server 300. There may be multiple custom API servers/custom resource controllers to support different kinds of custom resources. Custom API server 300 handles custom resources for SDN architecture configuration and writes to configuration store(s) 304, which may be etcd. Custom API server 300 may be host and expose an SDN controller identifier allocation service that may be required by custom resource controller 302.

Figure 8:
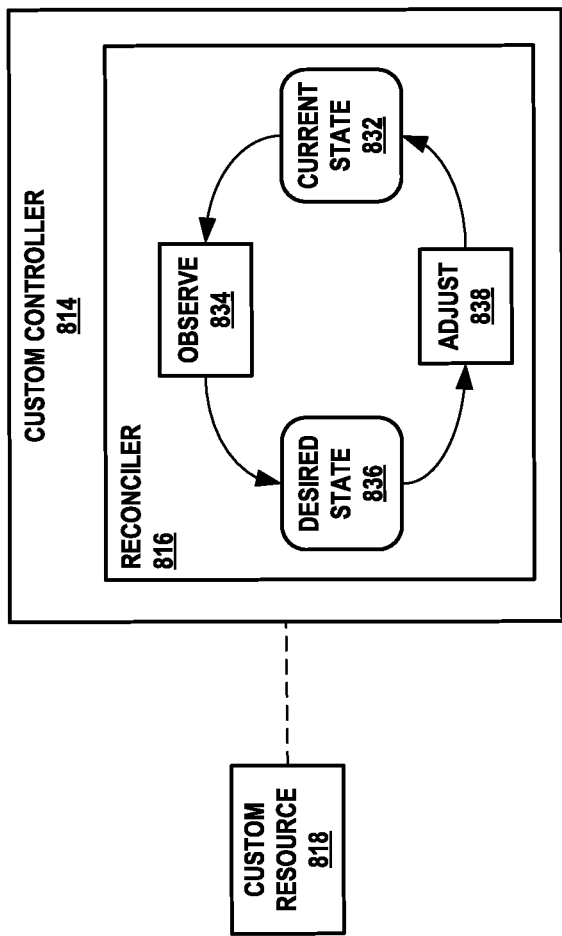
FIG. 8 is a block diagram illustrating an example of a custom controller for custom resource(s) for SDN architecture configuration, according to techniques of this disclosure.

Custom resource controller(s) 302 start to apply business logic to reach the user's intention provided with user intents configuration. The business logic is implemented as a reconciliation loop. FIG. 8 is a block diagram illustrating an example of a custom controller for custom resource(s) for SDN architecture configuration, according to techniques of this disclosure. Customer controller 814 may represent an example instance of custom resource controller 301. In the example illustrated in FIG. 8, custom controller 814 can be associated with custom resource 818. Custom resource 818 can be any custom resource for SDN architecture configuration. Custom controller 814 can include reconciler 816 that includes logic to execute a reconciliation loop in which custom controller 814 observes 834 (e.g., monitors) a current state 832 of custom resource 818. In response to determining that a desired state 836 does not match a current state 832, reconciler 816 can perform actions to adjust 838 the state of the custom resource such that the current state 832 matches the desired state 836. A request may be received by API server 300 and relayed to custom API server 301 to change the current state 832 of custom resource 818 to desired state 836.

In the case that API request 301 is a create request for a custom resource, reconciler 816 can act on the create event for the instance data for the custom resource. Reconciler 816 may create instance data for custom resources that the requested custom resource depends on. As an example, an edge node custom resource may depend on a virtual network custom resource, a virtual interface custom resource, and an IP address custom resource. In this example, when reconciler 816 receives a create event on an edge node custom resource, reconciler 816 can also create the custom resources that the edge node custom resource depends upon, e.g., a virtual network custom resource, a virtual interface custom resource, and an IP address custom resource.

By default, custom resource controllers 302 are running an active-passive mode and consistency is achieved using master election. When a controller pod starts it tries to create a ConfigMap resource in Kubernetes using a specified key. If creation succeeds, that pod becomes master and starts processing reconciliation requests; otherwise it blocks trying to create ConfigMap in an endless loop.

Figure 9:
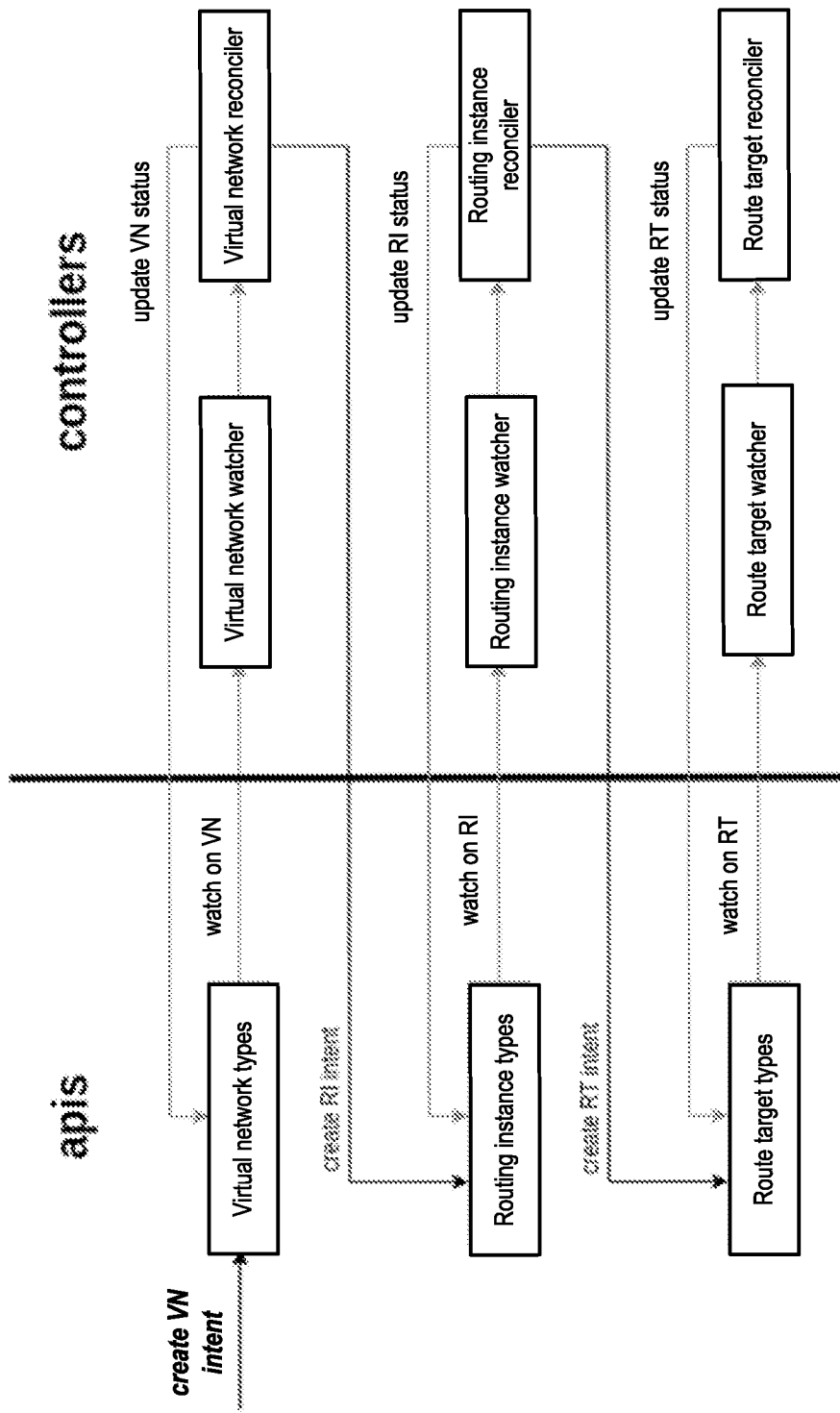
FIG. 9 is a block diagram illustrating an example flow of creation, watch, and reconciliation among custom resource types that have dependencies on different custom resource types.

Custom resource controller 302 may track the status of custom resources it creates. For example, a Virtual Network (VN) creates a Routing Instance (RI) which creates a Route Target (RT). If the creation of a route target fails, the routing instance status is degraded, and because of this the virtual network status is also degraded. Custom resource controller 302 may therefore output a custom message indicating the status(es) of these custom resources, for troubleshooting. Likewise, a VNR creates an RI which creates a RT in a similar manner as to that discussed above with respect to the VN, which is also described in more detail with respect to the examples of FIGS. 17A-17D. An example flow of creation, watch, and reconciliation among custom resource types that have dependencies on different custom resource types is illustrated in FIG. 9.

The configuration plane as implemented by configuration nodes 230 have high availability. Configuration nodes 230 may be based on Kubernetes, including the kube-apiserver service (e.g., API server 300) and the storage backend etcd (e.g., configuration store(s) 304). Effectively, aggregated API 402 implemented by configuration nodes 230 operates as the front end for the control plane implemented by control nodes 232. The main implementation of API server 300 is kube-apiserver, which is designed to scale horizontally by deploying more instances. As shown, several instances of API server 300 can be run to load balance API requests and processing.

Configuration store(s) 304 may be implemented as etcd. Etcd is a consistent and highly-available key value store used as the Kubernetes backing store for cluster data.

In the example of FIG. 4, servers 12 of SDN architecture 400 each include an orchestration agent 420 and a containerized (or "cloud-native") routing protocol daemon 324. These components of SDN architecture 400 are described in further detail below.

SDN controller manager 303 may operate as an interface between Kubernetes core resources (Service, Namespace, Pod, Network Policy, Network Attachment Definition) and the extended SDN architecture resources (VirtualNetwork, RoutingInstance etc.). SDN controller manager 303 watches the Kubernetes API for changes on both Kubernetes core and the custom resources for SDN architecture configuration and, as a result, can perform CRUD operations on the relevant resources.

In some examples, SDN controller manager 303 is a collection of one or more Kubernetes custom controllers. In some examples, in single or multi-cluster deployments, SDN controller manager 303 may run on the Kubernetes cluster(s) it manages SDN controller manager 303 listens to the following Kubernetes objects for Create, Delete, and Update events:
Pod
Service
NodePort
Ingress
Endpoint
Namespace
Deployment
Network Policy When these events are generated, SDN controller manager 303 creates appropriate SDN architecture objects, which are in turn defined as custom resources for SDN architecture configuration. In response to detecting an event on an instance of a custom resource, whether instantiated by SDN controller manager 303 and/or through custom API server 301, control node 232 obtains configuration data for the instance for the custom resource and configures a corresponding instance of a configuration object in SDN architecture 400.

For example, SDN controller manager 303 watches for the Pod creation event and, in response, may create the following SDN architecture objects: VirtualMachine (a workload/pod), VirtualMachineInterface (a virtual network interface), and an InstanceIP (IP address). Control nodes 232 may then instantiate the SDN architecture objects, in this case, in a selected compute node.

As an example, based on a watch, control node 232A may detect an event on an instance of first custom resource exposed by customer API server 301A, where the first custom resource is for configuring some aspect of SDN architecture system 400 and corresponds to a type of configuration object of SDN architecture system 400. For instance, the type of configuration object may be a firewall rule corresponding to the first custom resource. In response to the event, control node 232A may obtain configuration data for the firewall rule instance (e.g., the firewall rule specification) and provision the firewall rule in a virtual router for server 12A. Configuration nodes 230 and control nodes 232 may perform similar operations for other custom resource with corresponding types of configuration objects for the SDN architecture, such as virtual network, virtual network routers, bgp-as-a-service (BGPaaS), subnet, virtual router, service instance, project, physical interface, logical interface, node, network ipam, floating ip, alarm, alias ip, access control list, firewall policy, firewall rule, network policy, route target, routing instance, etc.

Figure 5:
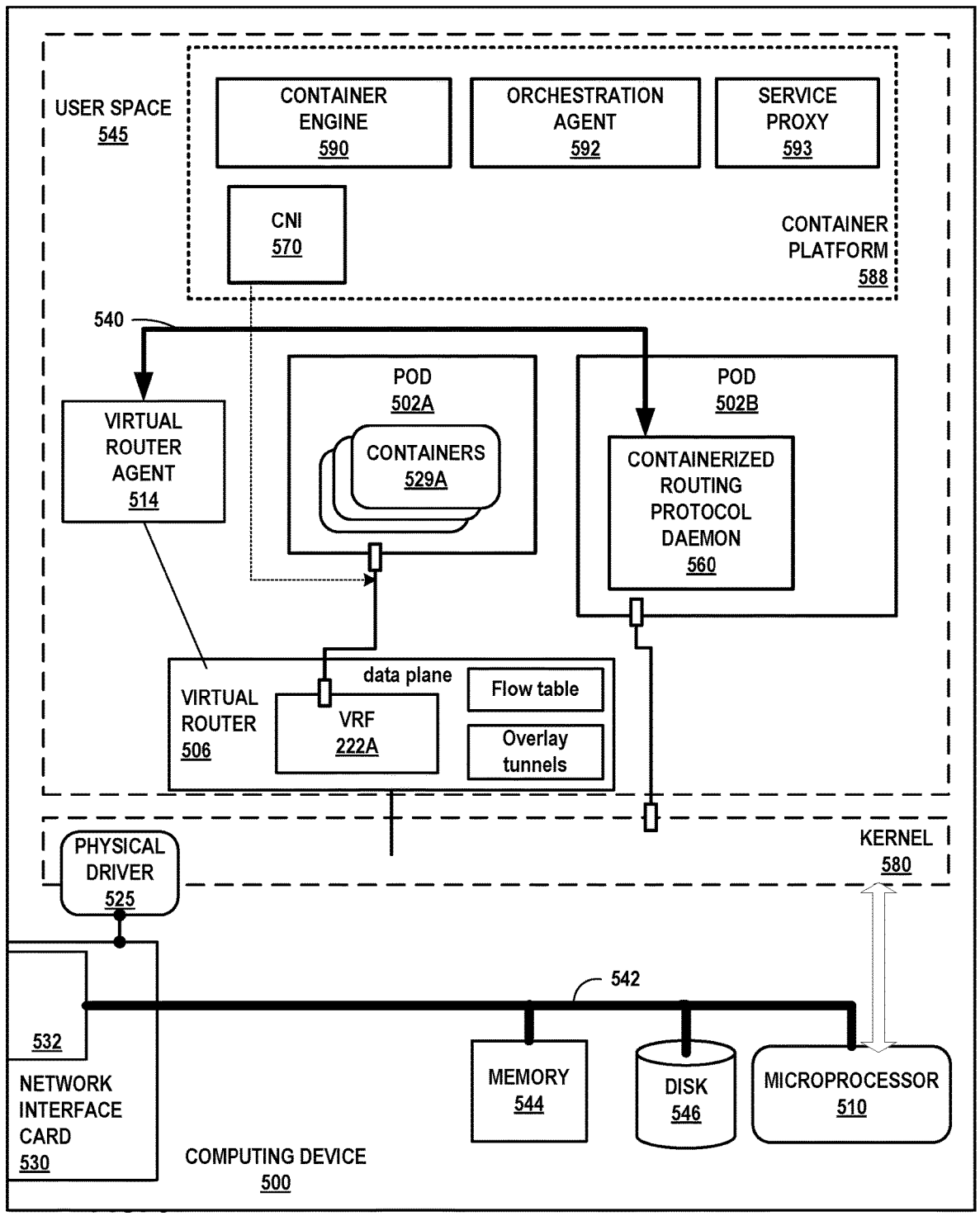
FIG. 5 is a block diagram of an example computing device, according to techniques described in this disclosure.

FIG. 5 is a block diagram of an example computing device, according to techniques described in this disclosure. Computing device 500 of FIG. 2 may represent a real or virtual server and may represent an example instance of any of servers 12 and may be referred to as a compute node, master/minion node, or host. Computing device 500 includes in this example, a bus 542 coupling hardware components of a computing device 500 hardware environment. Bus 542 couples network interface card (NIC) 530, storage disk 546, and one or more microprocessors 210 (hereinafter, "microprocessor 510"). NIC 530 may be SR-IOV-capable. A front-side bus may in some cases couple microprocessor 510 and memory device 524. In some examples, bus 542 may couple memory device 524, microprocessor 510, and NIC 530. Bus 542 may represent a Peripheral Component Interface (PCI) express (PCIe) bus. In some examples, a direct memory access (DMA) controller may control DMA transfers among components coupled to bus 542. In some examples, components coupled to bus 542 control DMA transfers among components coupled to bus 542.

Microprocessor 510 may include one or more processors each including an independent execution unit to perform instructions that conform to an instruction set architecture, the instructions stored to storage media. Execution units may be implemented as separate integrated circuits (ICs) or may be combined within one or more multi-core processors (or "many-core" processors) that are each implemented using a single IC (i.e., a chip multiprocessor).

Disk 546 represents computer readable storage media that includes volatile and/or non-volatile, removable and/or non-removable media implemented in any method or technology for storage of information such as processor-readable instructions, data structures, program modules, or other data. Computer readable storage media includes, but is not limited to, random access memory (RAM), read-only memory (ROM), EEPROM, Flash memory, CD-ROM, digital versatile discs (DVD) or other optical storage, magnetic cassettes, magnetic tape, magnetic disk storage or other magnetic storage devices, or any other medium that can be used to store the desired information and that can be accessed by microprocessor 510.

Main memory 524 includes one or more computer-readable storage media, which may include random-access memory (RAM) such as various forms of dynamic RAM (DRAM), e.g., DDR2/DDR3 SDRAM, or static RAM (SRAM), flash memory, or any other form of fixed or removable storage medium that can be used to carry or store desired program code and program data in the form of instructions or data structures and that can be accessed by a computer. Main memory 524 provides a physical address space composed of addressable memory locations.

Network interface card (NIC) 530 includes one or more interfaces 532 configured to exchange packets using links of an underlying physical network. Interfaces 532 may include a port interface card having one or more network ports. NIC 530 may also include an on-card memory to, e.g., store packet data. Direct memory access transfers between the NIC 530 and other devices coupled to bus 542 may read/write from/to the NIC memory.

Memory 524, NIC 530, storage disk 546, and microprocessor 510 may provide an operating environment for a software stack that includes an operating system kernel 580 executing in kernel space. Kernel 580 may represent, for example, a Linux, Berkeley Software Distribution (BSD), another Unix-variant kernel, or a Windows server operating system kernel, available from Microsoft Corp. In some instances, the operating system may execute a hypervisor and one or more virtual machines managed by hypervisor. Example hypervisors include Kernel-based Virtual Machine (KVM) for the Linux kernel, Xen, ESXi available from VMware, Windows Hyper-V available from Microsoft, and other open-source and proprietary hypervisors. The term hypervisor can encompass a virtual machine manager (VMM). An operating system that includes kernel 580 provides an execution environment for one or more processes in user space 545.

Kernel 580 includes a physical driver 525 to use the network interface card 530. Network interface card 530 may also implement SR-IOV to enable sharing the physical network function (I/O) among one or more virtual execution elements, such as containers 529A or one or more virtual machines (not shown in FIG. 5). Shared virtual devices such as virtual functions may provide dedicated resources such that each of the virtual execution elements may access dedicated resources of NIC 530, which therefore appears to each of the virtual execution elements as a dedicated NIC. Virtual functions may represent lightweight PCIe functions that share physical resources with a physical function used by physical driver 525 and with other virtual functions. For an SR-IOV-capable NIC 530, NIC 530 may have thousands of available virtual functions according to the SR-IOV standard, but for I/O-intensive applications the number of configured virtual functions is typically much smaller.

Computing device 500 may be coupled to a physical network switch fabric that includes an overlay network that extends switch fabric from physical switches to software or "virtual" routers of physical servers coupled to the switch fabric, including virtual router 506. Virtual routers may be processes or threads, or a component thereof, executed by the physical servers, e.g., servers 12 of FIG. 1, that dynamically create and manage one or more virtual networks usable for communication between virtual network endpoints. In one example, virtual routers implement each virtual network using an overlay network, which provides the capability to decouple an endpoint's virtual address from a physical address (e.g., IP address) of the server on which the endpoint is executing.

Each virtual network may use its own addressing and security scheme and may be viewed as orthogonal from the physical network and its addressing scheme. Various techniques may be used to transport packets within and across virtual networks over the physical network. The term "virtual router" as used herein may encompass an Open vSwitch (OVS), an OVS bridge, a Linux bridge, Docker bridge, or other device and/or software that is located on a host device and performs switching, bridging, or routing packets among virtual network endpoints of one or more virtual networks, where the virtual network endpoints are hosted by one or more of servers 12. In the example computing device 500 of FIG. 5, virtual router 506 executes within user space as a DPDK-based virtual router, but virtual router 506 may execute within a hypervisor, a host operating system, a host application, or a virtual machine in various implementations.

Virtual router 506 may replace and subsume the virtual routing/bridging functionality of the Linux bridge/OVS module that is commonly used for Kubernetes deployments of pods 502. Virtual router 506 may perform bridging (e.g., E-VPN) and routing (e.g., L3VPN, IP-VPNs) for virtual networks. Virtual router 506 may perform networking services such as applying security policies, NAT, multicast, mirroring, and load balancing.

Virtual router 506 can be executing as a kernel module or as a user space DPDK process (virtual router 506 is shown here in user space 545). Virtual router agent 514 may also be executing in user space. In the example computing device 500, virtual router 506 executes within user space as a DPDK-based virtual router, but virtual router 506 may execute within a hypervisor, a host operating system, a host application, or a virtual machine in various implementations. Virtual router agent 514 has a connection to network controller 24 using a channel, which is used to download configurations and forwarding information. Virtual router agent 514 programs this forwarding state to the virtual router data (or "forwarding") plane represented by virtual router 506. Virtual router 506 and virtual router agent 514 may be processes. Virtual router 506 and virtual router agent 514 containerized/cloud-native.

Virtual router 506 may replace and subsume the virtual routing/bridging functionality of the Linux bridge/OVS module that is commonly used for Kubernetes deployments of pods 502. Virtual router 506 may perform bridging (e.g., E-VPN) and routing (e.g., L3VPN, IP-VPNs) for virtual networks. Virtual router 506 may perform networking services such as applying security policies, NAT, multicast, mirroring, and load balancing.

Virtual router 506 may be multi-threaded and execute on one or more processor cores. Virtual router 506 may include multiple queues. Virtual router 506 may implement a packet processing pipeline. The pipeline can be stitched by the virtual router agent 514 from the simplest to the most complicated manner depending on the operations to be applied to a packet. Virtual router 506 may maintain multiple instances of forwarding bases. Virtual router 506 may access and update tables using RCU (Read Copy Update) locks.

To send packets to other compute nodes or switches, virtual router 506 uses one or more physical interfaces 532. In general, virtual router 506 exchanges overlay packets with workloads, such as VMs or pods 502. Virtual router 506 has multiple virtual network interfaces (e.g., vifs). These interfaces may include the kernel interface, vhost0, for exchanging packets with the host operating system; an interface with virtual router agent 514, pkt0, to obtain forwarding state from the network controller and to send up exception packets. There may be one or more virtual network interfaces corresponding to the one or more physical network interfaces 532. Other virtual network interfaces of virtual router 506 are for exchanging packets with the workloads.

In a kernel-based deployment of virtual router 506 (not shown), virtual router 506 is installed as a kernel module inside the operating system. Virtual router 506 registers itself with the TCP/IP stack to receive packets from any of the desired operating system interfaces that it wants to. The interfaces can be bond, physical, tap (for VMs), veth (for containers) etc. Virtual router 506 in this mode relies on the operating system to send and receive packets from different interfaces. For example, the operating system may expose a tap interface backed by a vhost-net driver to communicate with VMs. Once virtual router 506 registers for packets from this tap interface, the TCP/IP stack sends all the packets to it. Virtual router 506 sends packets via an operating system interface. In addition, NIC queues (physical or virtual) are handled by the operating system. Packet processing may operate in interrupt mode, which generates interrupts and may lead to frequent context switching. When there is a high packet rate, the overhead attendant with frequent interrupts and context switching may overwhelm the operating system and lead to poor performance.

In a DPDK-based deployment of virtual router 506 (shown in FIG. 5), virtual router 506 is installed as a user space 545 application that is linked to the DPDK library. This may lead to faster performance than a kernel-based deployment, particularly in the presence of high packet rates. The physical interfaces 532 are used by the poll mode drivers (PMDs) of DPDK rather the kernel's interrupt-based drivers. The registers of physical interfaces 532 may be exposed into user space 545 in order to be accessible to the PMDs; a physical interface 532 bound in this way is no longer managed by or visible to the host operating system, and the DPDK-based virtual router 506 manages the physical interface 532. This includes packet polling, packet processing, and packet forwarding. In other words, user packet processing steps are performed by the virtual router 506 DPDK data plane. The nature of this "polling mode" makes the virtual router 506 DPDK data plane packet processing/forwarding much more efficient as compared to the interrupt mode when the packet rate is high. There are comparatively few interrupts and context switching during packet I/O, compared to kernel-mode virtual router 506, and interrupt and context switching during packet I/O may in some cases be avoided altogether.

In general, each of pods 502A-502B may be assigned one or more virtual network addresses for use within respective virtual networks, where each of the virtual networks may be associated with a different virtual subnet provided by virtual router 506. Pod 502B may be assigned its own virtual layer three (L3) IP address, for example, for sending and receiving communications but may be unaware of an IP address of the computing device 500 on which the pod 502B executes. The virtual network address may thus differ from the logical address for the underlying, physical computer system, e.g., computing device 500.

Computing device 500 includes a virtual router agent 514 that controls the overlay of virtual networks for computing device 500 and that coordinates the routing of data packets within computing device 500. In general, virtual router agent 514 communicates with network controller 24 for the virtualization infrastructure, which generates commands to create virtual networks and configure network virtualization endpoints, such as computing device 500 and, more specifically, virtual router 506, as a well as virtual network interface 212. By configuring virtual router 506 based on information received from network controller 24, virtual router agent 514 may support configuring network isolation, policy-based security, a gateway, source network address translation (SNAT), a load-balancer, and service chaining capability for orchestration.

In one example, network packets, e.g., layer three (L3) IP packets or layer two (L2) Ethernet packets generated or consumed by the containers 529A-529B within the virtual network domain may be encapsulated in another packet (e.g., another IP or Ethernet packet) that is transported by the physical network. The packet transported in a virtual network may be referred to herein as an "inner packet" while the physical network packet may be referred to herein as an "outer packet" or a "tunnel packet." Encapsulation and/or de-capsulation of virtual network packets within physical network packets may be performed by virtual router 506. This functionality is referred to herein as tunneling and may be used to create one or more overlay networks. Besides IPinIP, other example tunneling protocols that may be used include IP over Generic Route Encapsulation (GRE), VxLAN, Multiprotocol Label Switching (MPLS) over GRE, MPLS over User Datagram Protocol (UDP), etc. Virtual router 506 performs tunnel encapsulation/decapsulation for packets sourced by/destined to any containers of pods 502, and virtual router 506 exchanges packets with pods 502 via bus 542 and/or a bridge of NIC 530.

As noted above, a network controller 24 may provide a logically centralized controller for facilitating operation of one or more virtual networks. The network controller 24 may, for example, maintain a routing information base, e.g., one or more routing tables that store routing information for the physical network as well as one or more overlay networks. Virtual router 506 implements one or more virtual routing and forwarding instances (VRFs), such as VRF 222A, for respective virtual networks for which virtual router 506 operates as respective tunnel endpoints. In general, each of the VRFs stores forwarding information for the corresponding virtual network and identifies where data packets are to be forwarded and whether the packets are to be encapsulated in a tunneling protocol, such as with a tunnel header that may include one or more headers for different layers of the virtual network protocol stack. Each of the VRFs may include a network forwarding table storing routing and forwarding information for the virtual network.

NIC 530 may receive tunnel packets. Virtual router 506 processes the tunnel packet to determine, from the tunnel encapsulation header, the virtual network of the source and destination endpoints for the inner packet. Virtual router 506 may strip the layer 2 header and the tunnel encapsulation header to internally forward only the inner packet. The tunnel encapsulation header may include a virtual network identifier, such as a VxLAN tag or MPLS label, that indicates a virtual network, e.g., a virtual network corresponding to VRF 222A. VRF 222A may include forwarding information for the inner packet. For instance, VRF 222A may map a destination layer 3 address for the inner packet to virtual network interface 212. VRF 222A forwards the inner packet via virtual network interface 212 to pod 502A in response.

Containers 529A may also source inner packets as source virtual network endpoints. Container 529A, for instance, may generate a layer 3 inner packet destined for a destination virtual network endpoint that is executed by another computing device (i.e., not computing device 500) or for another one of containers. Container 529A may sends the layer 3 inner packet to virtual router 506 via the virtual network interface attached to VRF 222A.

Virtual router 506 receives the inner packet and layer 2 header and determines a virtual network for the inner packet. Virtual router 506 may determine the virtual network using any of the above-described virtual network interface implementation techniques (e.g., macvlan, veth, etc.). Virtual router 506 uses the VRF 222A corresponding to the virtual network for the inner packet to generate an outer header for the inner packet, the outer header including an outer IP header for the overlay tunnel and a tunnel encapsulation header identifying the virtual network. Virtual router 506 encapsulates the inner packet with the outer header. Virtual router 506 may encapsulate the tunnel packet with a new layer 2 header having a destination layer 2 address associated with a device external to the computing device 500, e.g., a TOR switch 16 or one of servers 12. If external to computing device 500, virtual router 506 outputs the tunnel packet with the new layer 2 header to NIC 530 using physical function 221. NIC 530 outputs the packet on an outbound interface. If the destination is another virtual network endpoint executing on computing device 500, virtual router 506 routes the packet to the appropriate one of virtual network interfaces 212, 213.

In some examples, a controller for computing device 500 (e.g., network controller 24 of FIG. 1) configures a default route in each of pods 502 to cause the virtual machines 224 to use virtual router 506 as an initial next hop for outbound packets. In some examples, NIC 530 is configured with one or more forwarding rules to cause all packets received from virtual machines 224 to be switched to virtual router 506.

Pod 502A includes one or more application containers 529A. Pod 502B includes an instance of containerized routing protocol daemon (cRPD) 560. Container platform 588 includes container runtime 590, orchestration agent 592, service proxy 593, and CNI 570.

Container engine 590 includes code executable by microprocessor 510. Container runtime 590 may be one or more computer processes. Container engine 590 runs containerized applications in the form of containers 529A-529B. Container engine 590 may represent a Dockert, rkt, or other container engine for managing containers. In general, container engine 590 receives requests and manages objects such as images, containers, networks, and volumes. An image is a template with instructions for creating a container. A container is an executable instance of an image. Based on directives from controller agent 592, container engine 590 may obtain images and instantiate them as executable containers in pods 502A-502B.

Service proxy 593 includes code executable by microprocessor 510. Service proxy 593 may be one or more computer processes. Service proxy 593 monitors for the addition and removal of service and endpoints objects, and it maintains the network configuration of the computing device 500 to ensure communication among pods and containers, e.g., using services. Service proxy 593 may also manage iptables to capture traffic to a service's virtual IP address and port and redirect the traffic to the proxy port that proxies a backed pod. Service proxy 593 may represent a kube-proxy for a minion node of a Kubernetes cluster. In some examples, container platform 588 does not include a service proxy 593 or the service proxy 593 is disabled in favor of configuration of virtual router 506 and pods 502 by CNI 570.

Orchestration agent 592 includes code executable by microprocessor 510. Orchestration agent 592 may be one or more computer processes. Orchestration agent 592 may represent a kubelet for a minion node of a Kubernetes cluster. Orchestration agent 592 is an agent of an orchestrator, e.g., orchestrator 23 of FIG. 1, that receives container specification data for containers and ensures the containers execute by computing device 500. Container specification data may be in the form of a manifest file sent to orchestration agent 592 from orchestrator 23 or indirectly received via a command line interface, HTTP endpoint, or HTTP server. Container specification data may be a pod specification (e.g., a PodSpec—a YAML (Yet Another Markup Language) or JSON object that describes a pod) for one of pods 502 of containers. Based on the container specification data, orchestration agent 592 directs container engine 590 to obtain and instantiate the container images for containers 529, for execution of containers 529 by computing device 500.

Orchestration agent 592 instantiates or otherwise invokes CNI 570 to configure one or more virtual network interfaces for each of pods 502. For example, orchestration agent 592 receives a container specification data for pod 502A and directs container engine 590 to create the pod 502A with containers 529A based on the container specification data for pod 502A. Orchestration agent 592 also invokes the CNI 570 to configure, for pod 502A, virtual network interface for a virtual network corresponding to VRFs 222A. In this example, pod 502A is a virtual network endpoint for a virtual network corresponding to VRF 222A.

CNI 570 may obtain interface configuration data for configuring virtual network interfaces for pods 502. Virtual router agent 514 operates as a virtual network control plane module for enabling network controller 24 to configure virtual router 506. Unlike the orchestration control plane (including the container platforms 588 for minion nodes and the master node(s), e.g., orchestrator 23), which manages the provisioning, scheduling, and managing virtual execution elements, a virtual network control plane (including network controller 24 and virtual router agent 514 for minion nodes) manages the configuration of virtual networks implemented in the data plane in part by virtual routers 506 of the minion nodes. Virtual router agent 514 communicates, to CNI 570, interface configuration data for virtual network interfaces to enable an orchestration control plane element (i.e., CNI 570) to configure the virtual network interfaces according to the configuration state determined by the network controller 24, thus bridging the gap between the orchestration control plane and virtual network control plane. In addition, this may enable a CNI 570 to obtain interface configuration data for multiple virtual network interfaces for a pod and configure the multiple virtual network interfaces, which may reduce communication and resource overhead inherent with invoking a separate CNI 570 for configuring each virtual network interface.

Containerized routing protocol daemons are described in U.S. application Ser. No. 17/649,632, filed Feb. 1, 2022, which is incorporated by reference herein in its entirety.

In addition, CNI 570, possibly in conjunction with virtual router agent 514, may configure virtual router 506 to implement VNRs 52. VNRs 52 may result in the routing plane being configured via one or more import policies and/or one or more export policies for exchanging routing information with the common route target for VNRs 52. These policies result in routing information maintained for VNs 50 to be exchanged with (or, in other words, leaked between) the VNRs 52 common route targets, which in turn are resolved as forwarding information. CNI 570 may obtain configuration data for installing this forwarding information from network controller 24, interfacing with virtual router agent 514 to install the forwarding information by which to forward packets from VNs 50.

In other words, creating this common route target may enable the import and export of routing information from one of VNs 50, e.g., VN 50A, to the common route target provided by way of one or more of VNRs 52, and from the common route target to another one of VNs 50, e.g., VN 50N. Network controller 24 may resolve this routing information to the above noted forwarding information and installed within virtual router 506 to implement forwarding of packets between VN 50A and VN 50N (in some configurations, such as the above noted mesh configuration). In this way, virtual router 506 may establish ways for import and export of routing information between VNs 50, which VNs 50 may then use to transmit packets between each other one of VNs 50.

Figure 6:
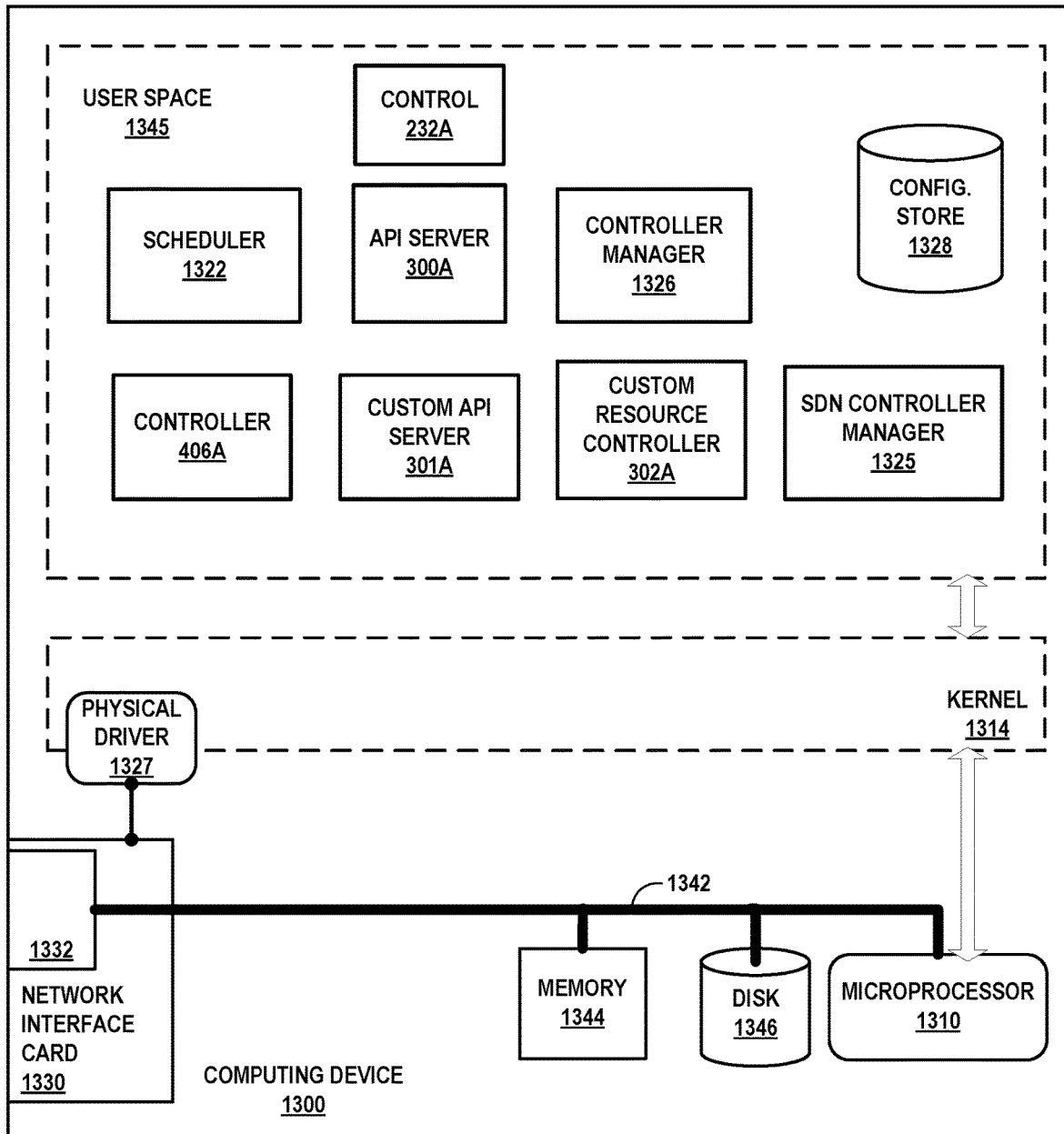
FIG. 6 is a block diagram of an example computing device operating as a compute node for one or more clusters for an SDN architecture system, in accordance with techniques of this disclosure.

FIG. 6 is a block diagram of an example computing device operating as a compute node for one or more clusters for an SDN architecture system, in accordance with techniques of this disclosure. Computing device 1300 may represent one or more real or virtual servers. Computing device 1300 may in some instances implement one or more master nodes for respective clusters, or for multiple clusters.

Scheduler 1322, API server 300A, controller 406A, custom API server 301A, custom resource controller 302A, controller manager 1326, SDN controller manager 1325, control node 232A, and configuration store 1328, although illustrated and described as being executed by a single computing device 1300, may be distributed among multiple computing devices that make up a computing system or hardware/server cluster. Each of the multiple computing devices, in other words, may provide a hardware operating environment for one or more instances of any one or more of scheduler 1322, API server 300A, controller 406A, custom API server 301A, custom resource controller 302A, network controller manager 1326, network controller 1324, SDN controller manager 1325, control node 232A, or configuration store 1328.

Computing device 1300 includes in this example, a bus 1342 coupling hardware components of a computing device 1300 hardware environment. Bus 1342 couples network interface card (NIC) 1330, storage disk 1346, and one or more microprocessors 1310 (hereinafter, "microprocessor 1310"). A front-side bus may in some cases couple microprocessor 1310 and memory device 1344. In some examples, bus 1342 may couple memory device 1344, microprocessor 1310, and NIC 1330. Bus 1342 may represent a Peripheral Component Interface (PCI) express (PCIe) bus. In some examples, a direct memory access (DMA) controller may control DMA transfers among components coupled to bus 242. In some examples, components coupled to bus 1342 control DMA transfers among components coupled to bus 1342.

Microprocessor 1310 may include one or more processors each including an independent execution unit to perform instructions that conform to an instruction set architecture, the instructions stored to storage media. Execution units may be implemented as separate integrated circuits (ICs) or may be combined within one or more multi-core processors (or "many-core" processors) that are each implemented using a single IC (i.e., a chip multiprocessor).

Disk 1346 represents computer readable storage media that includes volatile and/or non-volatile, removable and/or non-removable media implemented in any method or technology for storage of information such as processor-readable instructions, data structures, program modules, or other data. Computer readable storage media includes, but is not limited to, random access memory (RAM), read-only memory (ROM), EEPROM, Flash memory, CD-ROM, digital versatile discs (DVD) or other optical storage, magnetic cassettes, magnetic tape, magnetic disk storage or other magnetic storage devices, or any other medium that can be used to store the desired information and that can be accessed by microprocessor 1310.

Main memory 1344 includes one or more computer-readable storage media, which may include random-access memory (RAM) such as various forms of dynamic RAM (DRAM), e.g., DDR2/DDR3 SDRAM, or static RAM (SRAM), flash memory, or any other form of fixed or removable storage medium that can be used to carry or store desired program code and program data in the form of instructions or data structures and that can be accessed by a computer. Main memory 1344 provides a physical address space composed of addressable memory locations.

Network interface card (NIC) 1330 includes one or more interfaces 3132 configured to exchange packets using links of an underlying physical network. Interfaces 3132 may include a port interface card having one or more network ports. NIC 1330 may also include an on-card memory to, e.g., store packet data. Direct memory access transfers between the NIC 1330 and other devices coupled to bus 1342 may read/write from/to the NIC memory.

Memory 1344, NIC 1330, storage disk 1346, and microprocessor 1310 may provide an operating environment for a software stack that includes an operating system kernel 1314 executing in kernel space. Kernel 1314 may represent, for example, a Linux, Berkeley Software Distribution (BSD), another Unix-variant kernel, or a Windows server operating system kernel, available from Microsoft Corp. In some instances, the operating system may execute a hypervisor and one or more virtual machines managed by hypervisor. Example hypervisors include Kernel-based Virtual Machine (KVM) for the Linux kernel, Xen, ESXi available from VMware, Windows Hyper-V available from Microsoft, and other open-source and proprietary hypervisors. The term hypervisor can encompass a virtual machine manager (VMM). An operating system that includes kernel 1314 provides an execution environment for one or more processes in user space 1345. Kernel 1314 includes a physical driver 1327 to use the network interface card 230.

Computing device 1300 may be coupled to a physical network switch fabric that includes an overlay network that extends switch fabric from physical switches to software or virtual routers of physical servers coupled to the switch fabric, such virtual routers 21. Computing device 1300 may use one or more dedicated virtual networks to configure minion nodes of a cluster.

API server 300A, scheduler 1322, controller 406A, custom API server 301A, custom resource controller 302A, controller manager 1326, and configuration store 1328 may implement a master node for a cluster and be alternatively referred to as "master components." The cluster may be a Kubernetes cluster and the master node a Kubernetes master node, in which case the master components are Kubernetes master components.

Each of API server 300A, controller 406A, custom API server 301A, and custom resource controller 302A includes code executable by microprocessor 1310. Custom API server 301A validates and configures data for custom resources for SDN architecture configuration (such as VNs 50 and VNRs 52). A service may be an abstraction that defines a logical set of pods and the policy used to access the pods. The set of pods implementing a service are selected based on the service definition. A service may be implemented in part as, or otherwise include, a load balancer. API server 300A and custom API server 301A may implement a Representational State Transfer (REST) interface to process REST operations and provide the frontend, as part of the configuration plane for an SDN architecture, to a corresponding cluster's shared state stored to configuration store 1328. API server 300A may represent a Kubernetes API server.

Configuration store 1328 is a backing store for all cluster data. Cluster data may include cluster state and configuration data. Configuration data may also provide a backend for service discovery and/or provide a locking service. Configuration store 1328 may be implemented as a key value store. Configuration store 1328 may be a central database or distributed database. Configuration store 1328 may represent an etcd store. Configuration store 1328 may represent a Kubernetes configuration store.

Scheduler 1322 includes code executable by microprocessor 1310. Scheduler 1322 may be one or more computer processes. Scheduler 1322 monitors for newly created or requested virtual execution elements (e.g., pods of containers) and selects a minion node on which the virtual execution elements are to run. Scheduler 1322 may select a minion node based on resource requirements, hardware constraints, software constraints, policy constraints, locality, etc. Scheduler 1322 may represent a Kubernetes scheduler.

In general, API server 1320 may invoke the scheduler 1322 to schedule a pod. Scheduler 1322 may select a minion node and returns an identifier for the selected minion node to API server 1320, which may write the identifier to the configuration store 1328 in association with the pod. API server 1320 may invoke the orchestration agent 310 for the selected minion node, which may cause the container engine 208 for the selected minion node to obtain the pod from a storage server and create the virtual execution element on the minion node. The orchestration agent 310 for the selected minion node may update the status for the pod to the API server 1320, which persists this new state to the configuration store 1328. In this way, computing device 1300 instantiates new pods in the computing infrastructure 8.

Controller manager 1326 includes code executable by microprocessor 1310. Controller manager 1326 may be one or more computer processes. Controller manager 1326 may embed the core control loops, monitoring a shared state of a cluster by obtaining notifications from API Server 1320. Controller manager 1326 may attempt to move the state of the cluster toward the desired state. Example controller 406A and custom resource controller 302A may be managed by the controller manager 1326. Other controllers may include a replication controller, endpoints controller, namespace controller, and service accounts controller. Controller manager 1326 may perform lifecycle functions such as namespace creation and lifecycle, event garbage collection, terminated pod garbage collection, cascading-deletion garbage collection, node garbage collection, etc. Controller manager 1326 may represent a Kubernetes Controller Manager for a Kubernetes cluster.

A network controller for an SDN architecture described herein may provide cloud networking for a computing architecture operating over a network infrastructure. Cloud networking may include private clouds for enterprise or service providers, infrastructure as a service (IaaS), and virtual private clouds (VPCs) for cloud service providers (CSPs). The private cloud, VPC, and IaaS use cases may involve a multi-tenant virtualized data centers, such as that described with respect to FIG. 1. In such cases, multiple tenants in a data center share the same physical resources (physical servers, physical storage, physical network). Each tenant is assigned its own logical resources (virtual machines, containers, or other form of virtual execution elements; virtual storage; virtual networks). These logical resources are isolated from each other, unless specifically allowed by security policies. The virtual networks in the data center may also be interconnected to a physical IP VPN or L2 VPN.

The network controller (or "SDN controller") may provide network function virtualization (NFV) to networks, such as business edge networks, broadband subscriber management edge networks, and mobile edge networks. NFV involves orchestration and management of networking functions such as a Firewalls, Intrusion Detection or Preventions Systems (IDS/IPS), Deep Packet Inspection (DPI), caching, Wide Area Network (WAN) optimization, etc. in virtual machines, containers, or other virtual execution elements instead of on physical hardware appliances.

SDN controller manager 1325 includes code executable by microprocessor 1310. SDN controller manager 1325 may be one or more computer processes. SDN controller manager 1325 operates as an interface between the orchestration-oriented elements (e.g., scheduler 1322, API server 300A and custom API server 301A, controller manager 1326, and configuration store 1328). In general, SDN controller manager 1325 monitors the cluster for new Kubernetes native objects (e.g., pods and services). SDN controller manager 1325 may isolate pods in virtual networks and connect pods with services as well as interconnect virtual networks using so-called virtual network routers (which are not to be confused with virtual routers that implement the virtual network routers in the form of various import and export policies to the above noted common route target to facilitate interconnection between virtual networks).

SDN controller manager 1325 may be executed as a container of the master node for a cluster. In some cases, using SDN controller manager 1325 enables disabling the service proxies of minion nodes (e.g., the Kubernetes kube-proxy) such that all pod connectivity is implemented using virtual routers, as described herein.

Components of the network controller 24 may operate as a CNI for Kubernetes and may support multiple deployment modes. CNI 17, CNI 750 are the compute node interfaces for this overall CNI framework for managing networking for Kubernetes. The deployment modes can be divided into two categories: (1) an SDN architecture cluster as a CNI integrated into a workload Kubernetes cluster, and (2) an SDN architecture cluster as a CNI that is separate from the workload Kubernetes clusters.

Integrated with Workload Kubernetes Cluster

Components of the network controller 24 (e.g., custom API server 301, custom resource controller 302, SDN controller manager 1325, and control nodes 232) are running in the managed Kubernetes cluster on master nodes, close to the Kubernetes controller components. In this mode, components of network controller 24 are effectively part of the same Kubernetes cluster as the workloads.

Separate from Workload Kubernetes Clusters

Components of the network controller 24 will be executed by a separate Kubernetes cluster from the workload Kubernetes clusters.

SDN controller manager 1325 may use a controller framework for the orchestration platform to listen for (or otherwise monitor for) changes in objects that are defined in the Kubernetes native API and to add annotations to some of these objects. The annotations may be labels or other identifiers specifying properties of the objects (e.g., "Virtual Network Green"). SDN controller manager 1325 is a component of the SDN architecture that listens to Kubernetes core resources (such as Pod, NetworkPolicy, Service, etc.) events and converts those to custom resources for SDN architecture configuration as needed. The CNI plugin (e.g., CNIs 17, 570) is an SDN architecture component supporting the Kubernetes networking plugin standard: container network interface.

SDN controller manager 1325 may create a network solution for the application using the REST interface exposed by aggregated API 402 to define network objects such as virtual networks, virtual network interfaces, and access control policies. Network controller 24 components may implement the network solution in the computing infrastructure by, e.g., configuring the one or more virtual network and virtual network interfaces in the virtual routers. (This is merely one example of an SDN configuration.)

The following example deployment configuration for this application consists of a pod and the virtual network information for the pod:

```
apiVersion: v1
kind: Pod
metadata:
    name: multi-net-pod
    annotations:
        networks: '[
            { "name": "red-network" },
            { "name": "blue-network" },
            { "name": "default/extns-network" }
        ]'
spec:
    containers:
    - image: busybox
      command:
        - sleep
        - "3600"
      imagePullPolicy: IfNotPresent
      name: busybox
      stdin: true
      tty: true
    restartPolicy: Always
```

This metadata information may be copied to each pod replica created by the controller manager 1326. When the SDN controller manager 1325 is notified of these pods, SDN controller manager 1325 may create virtual networks as listed in the annotations ("red-network", "blue-network", and "default/extns-network" in the above example) and create, for each of the virtual networks, a virtual network interface per-pod replica (e.g., pod 202A) with a unique private virtual network address from a cluster-wide address block (e.g. 10.0/16) for the virtual network.

Contrail is an example network controller architecture. Contrail CNI may be a CNI developed for Contrail. A cloud-native Contrail controller may be an example of a network controller described in this disclosure, such as network controller 24.

Figure 7:
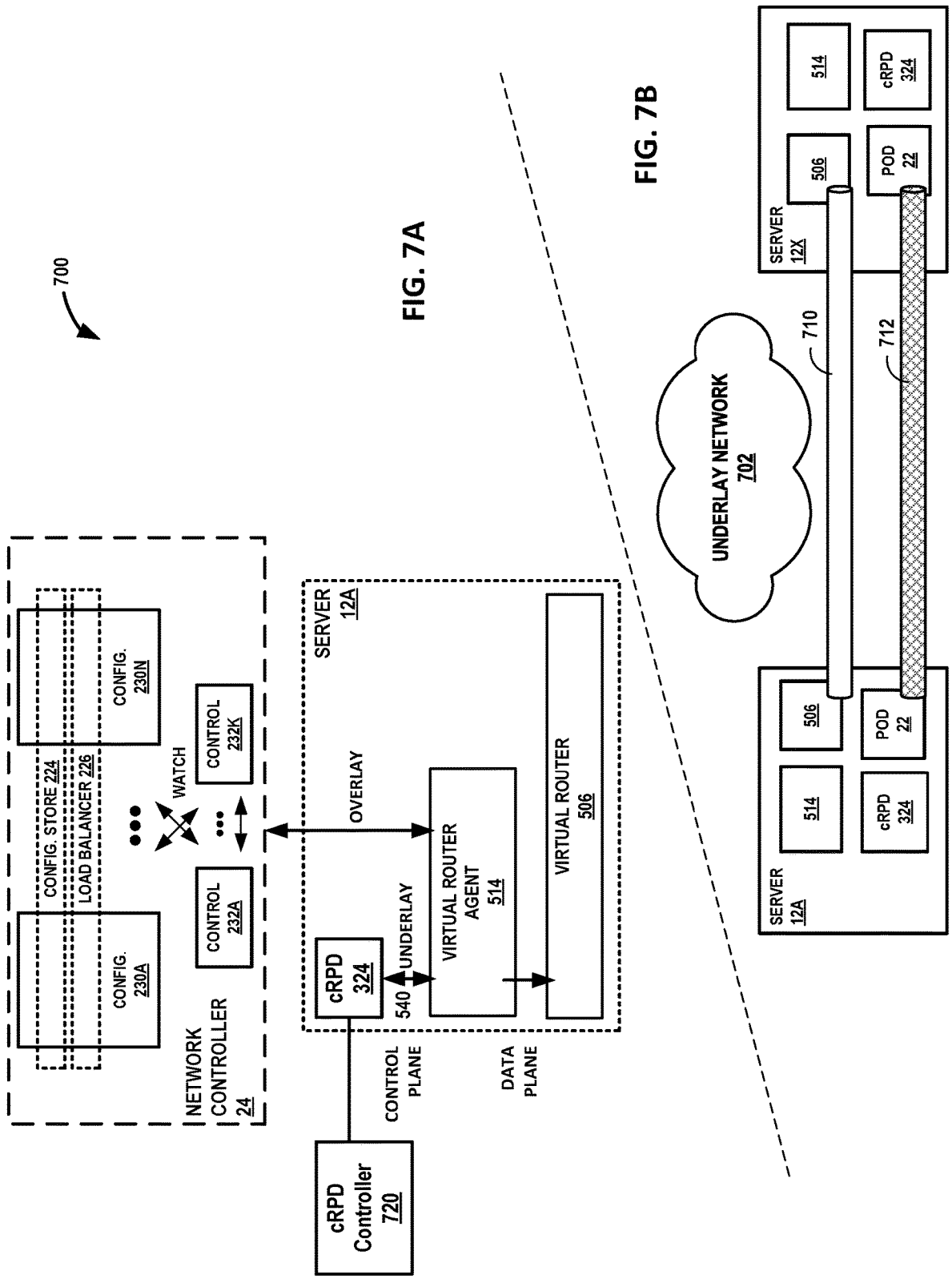
FIG. 7A is a block diagram illustrating control/routing planes for underlay network and overlay network configuration using an SDN architecture, according to techniques of this disclosure.
FIG. 7B is a block diagram illustrating a configured virtual network to connect pods using a tunnel configured in the underlay network, according to techniques of this disclosure.

FIG. 7A is a block diagram illustrating control/routing planes for underlay network and overlay network configuration using an SDN architecture, according to techniques of this disclosure. FIG. 7B is a block diagram illustrating a configured virtual network to connect pods using a tunnel configured in the underlay network, according to techniques of this disclosure.

Network controller 24 for the SDN architecture may use distributed or centralized routing plane architectures. The SDN architecture may use a containerized routing protocol daemon (process).

From the perspective of network signaling, the routing plane can work according to a distributed model, where a cRPD runs on every compute node in the cluster. This essentially means that the intelligence is built into the compute nodes and involves complex configurations at each node. The route reflector (RR) in this model may not make intelligent routing decisions but is used as a relay to reflect routes between the nodes. A distributed container routing protocol daemon (cRPD) is a routing protocol process that may be used wherein each compute node runs its own instance of the routing daemon. At the same time, a centralized cRPD master instance may act as an RR to relay routing information between the compute nodes. The routing and configuration intelligence is distributed across the nodes with an RR at the central location.

The routing plane can alternatively work according to a more centralized model, in which components of network controller runs centrally and absorbs the intelligence needed to process configuration information, construct the network topology, and program the forwarding plane into the virtual routers. The virtual router agent is a local agent to process information being programmed by the network controller. This design leads to facilitates more limited intelligence required at the compute nodes and tends to lead to simpler configuration states.

The centralized control plane provides for the following:
Allows for the agent routing framework to be simpler and lighter. The complexity and limitations of BGP are hidden from the agent. There is no need for the agent to understand concepts like route-distinguishers, route-targets, etc. The agents just exchange prefixes and build its forwarding information accordingly Control nodes can do more than routing. They build on the virtual network concept and can generate new routes using route replication and re-origination (for instance to support features like service chaining and inter-VN routing, among other use cases).

Building the BUM tree for optimal broadcast and multicast forwarding.

Note that the control plane has a distributed nature for certain aspects. As a control plane supporting distributed functionality, it allows each local virtual router agent to publish its local routes and subscribe for configuration on a need-to-know basis.

It makes sense then to think of the control plane design from a tooling POV and use tools at hand appropriately where they fit best. Consider the set of pros and cons of contrail-bgp and cRPD.

The following functionalities may be provided by cRPDs or control nodes of network controller 24.

Routing Daemon/Process

Both control nodes and cRPDs can act as routing daemons implementing different protocols and having the capability to program routing information in the forwarding plane.

cRPD implements routing protocols with a rich routing stack that includes interior gateway protocols (IGPs) (e.g., intermediate system to intermediate system (IS-IS)), BGP-LU, BGP-CT, SR-MPLS/SRv6, bidirectional forwarding detection (BFD), path computation element protocol (PCEP), etc. It can also be deployed to provide control plane only services such as a route-reflector and is popular in internet routing use-cases due to these capabilities.

Control nodes 232 also implement routing protocols but are predominantly BGP-based. Control nodes 232 understands overlay networking. Control nodes 232 provide a rich feature set in overlay virtualization and cater to SDN use cases. Overlay features such as virtualization (using the abstraction of a virtual network) and service chaining are very popular among telco and cloud providers. cRPD may not in some cases include support for such overlay functionality. However, the rich feature set of CRPD provides strong support for the underlay network.

Network Orchestration/Automation

Routing functionality is just one part of the control nodes 232. An integral part of overlay networking is orchestration. Apart from providing overlay routing, control nodes 232 help in modeling the orchestration functionality and provide network automation. Central to orchestration capabilities of control nodes 232 is an ability to use the virtual network (and related objects)-based abstraction, including the above noted VNRs, to model network virtualization. Control nodes 232 interface with the configuration nodes 230 to relay configuration information to both the control plane and the data plane. Control nodes 232 also assist in building overlay trees for multicast layer 2 and layer 3. For example, a control node may build a virtual topology of the cluster it serves to achieve this. cRPD does not typically include such orchestration capabilities.

High Availability and Horizontal Scalability

Control node design is more centralized while cRPD is more distributed. There is a cRPD worker node running on each compute node. Control nodes 232 on the other hand do not run on the compute and can even run on a remote cluster (i.e., separate and in some cases geographically remote from the workload cluster). Control nodes 232 also provide horizontal scalability for HA and run in active-active mode. The compute load is shared among control nodes 232. cRPD on the other hand does not typically provide horizontal scalability. Both control nodes 232 and cRPD may provide HA with graceful restart and may allow for data plane operation in headless mode—wherein the virtual router can run even if the control plane restarts.

The control plane should be more than just a routing daemon. It should support overlay routing and network orchestration/automation, while cRPD does well as a routing protocol in managing underlay routing. cRPD, however, typically lacks network orchestration capabilities and does not provide strong support for overlay routing.

Accordingly, in some examples, the SDN architecture may have cRPD on the compute nodes as shown in FIGS. 7A-7B. FIG. 7A illustrates SDN architecture 700, which may represent an example implementation SDN architecture 200 or 400. In SDN architecture 700, cRPD 324 runs on the compute nodes and provide underlay routing to the forwarding plane while running a centralized (and horizontally scalable) set of control nodes 232 providing orchestration and overlay services. In some examples, instead of running cRPD 324 on the compute nodes, a default gateway may be used.

cRPD 324 on the compute nodes provides rich underlay routing to the forwarding plane by interacting with virtual router agent 514 using interface 540, which may be a gRPC interface. The virtual router agent interface may permit programming routes, configuring virtual network interfaces for the overlay, and otherwise configuring virtual router 506. This is described in further detail in U.S. application Ser. No. 17/649,632. At the same time, one or more control nodes 232 run as separate pods providing overlay services. SDN architecture 700 may thus obtain both a rich overlay and orchestration provided by control nodes 232 and modern underlay routing by cRPD 324 on the compute nodes to complement control nodes 232. A separate cRPD controller 720 may be used to configure the cRPDs 324. cRPD controller 720 may be a device/element management system, network management system, orchestrator, a user interface/CLI, or other controller. cRPDs 324 run routing protocols and exchange routing protocol messages with routers, including other cRPDs 324. Each of cRPDs 324 may be a containerized routing protocol process and effectively operates as a software-only version of a router control plane.

The enhanced underlay routing provided by cRPD 324 may replace the default gateway at the forwarding plane and provide a rich routing stack for use cases that can be supported. In some examples that do not use cRPD 324, virtual router 506 will rely on the default gateway for underlay routing. In some examples, cRPD 324 as the underlay routing process will be restricted to program only the default inet(6).0 fabric with control plane routing information. In such examples, non-default overlay VRFs may be programmed by control nodes 232.

In this context, control nodes 232 may obtain custom resources defining VNRs 52 and instantiate a separate routing instance (with a corresponding common route target). Control nodes 232 may create import and/or export policies for the common route target that results in import and export of routes from various virtual networks (e.g., VNs 50A and 50N) to the common route target. Control nodes 232 may resolve the common route target to obtain forwarding information that can then be pushed down to virtual router 506 via virtual routing agent 514. Using this forwarding information, virtual router 506 may forward packets between VNs 50A and 50N (in some interconnectivity schemes, such as the above noted mesh interconnectivity scheme).

FIGS. 7A-7B illustrate the dual routing/control plane solution described above. In FIG. 7A, cRPD 324 provides underlay routing/forwarding information to virtual router agent 514, similar in some respect to how a router control plane programs a router forwarding/data plane.

As shown in FIG. 7B, cRPDs 324 exchange routing information usable to create tunnels through the underlay network 702 for VRFs. Tunnel 710 is an example and connects virtual routers 506 of server 12A and server 12X. Tunnel 710 may represent an segment routing (SR) or SRv6 tunnel, a Generic Route Encapsulation (GRE) tunnel, and IP-in-IP tunnel, an LSP, or other tunnel. Control nodes 232 leverages tunnel 710 to create virtual network 712 connecting pods 22 of server 12A and server 12X that are attached to the VRF for the virtual network.

As noted above, cRPD 324 and virtual router agent 514 may exchange routing information using a gRPC interface, and virtual router agent 5145 may program virtual router 506 with configuration using the gRPC interface. As also noted, control nodes 232 may be used for overlay and orchestration while cRPD 324 may be used for managing the underlay routing protocols. Virtual router agent 514 may use gRPC interface with cRPD 324 while using XMPP to communicate with the control node and a domain name service (DNS).

The gRPC model works well for cRPD 324 since there may be a worker running on every compute node, and the virtual router agent 314 acts as the gRPC server exposing services for the client (cRPD 324) to use to program routing and configuration information (for underlay). gRPC is thus an attractive as a solution when compared to XMPP. In particular, it transports data as a binary stream and there is no added overhead in encoding/decoding data to be sent over it.

In some examples, control nodes 232 may interface with virtual router agents 514 using XMPP. With virtual router agent 514 acting as the gRPC server, cRPD 324 acts as the gRPC client. This would mean that the client (cRPD) needs to initiate the connection towards the server (vRouter Agent). SDN architecture 700, virtual router agent 514 chooses the set of control nodes 232 it will subscribe to (since there are multiple control nodes). In that aspect, the control node 232 acts as the server and the virtual router agent 514 connects as the client and subscribes for updates.

With gRPC, the control node 232 would need to pick the virtual router agents 514 it needs to connect to and then subscribe as a client. Since the control node 232 does not run on every compute node, this would require implementing an algorithm to choose the virtual router agents 514 it can subscribe to. Further, the control nodes 232 need to synchronize this information amongst each other. This also complicates the case when restarts happen and there is a need for synchronization between the control nodes 232 to pick the agents they serve. Features such as Graceful Restart (GR) and Fast Convergence have already been implemented on top of XMPP. XMPP is already lightweight and effective. Therefore, XMPP may be advantageous over gRPC for control node 232 to virtual router agent 514 communications.

Additional enhancements to control nodes 232 and the use thereof are as follows. HA and horizontal scalability with three control-nodes. Like any routing platform, it should be sufficient to have just two control nodes 232 to satisfy the HA requirements. In many cases, this is advantageous. (However, one or more control nodes 232 may be used.) For example, it provides more deterministic infrastructure and in-line with standard routing best-practices. Each virtual router agent 514 is attached to a unique pair of control nodes 232 to avoid randomness. With two control nodes 232, debugging may be simpler. In addition, edge replication for constructing multicast/broadcast trees may be simplified with only two control notes 232. Currently, since vRouter agents 314 only connect to two of the three control nodes, all the control nodes may not have the complete picture of the tree for some time and rely on BGP to sync states between them. This is exacerbated with three control nodes 232 since virtual router agents 314 may choose two at random. If there were only two control nodes 232, every virtual router agent 314 would connect to the same control nodes. This, in turn, would mean that control nodes 232 need not rely on BGP to sync states and will have the same picture of the multicast tree.

SDN architecture 200 may provide for ingress replication as an alternative to edge-replication and provide users the option. Ingress replication can be viewed as a special degenerate case of general overlay multicast trees. In practice, however, the signaling of ingress replication trees is much simpler than the signaling of general overlay multicast trees. With ingress replication, every virtual router 21 ends up with a tree with itself as the root and every other vrouter as the leaf. A virtual router 21 going down should theoretically not result in rebuilding the tree. Note that the performance of ingress replication deteriorates with larger clusters. However, it works well for smaller clusters. Furthermore, multicast is not a popular and prevalent requirement for many customers. It is mostly limited to transport broadcast BUM traffic, which only happens initially.

Configuration Handling Module Enhancements

In convention SDN architectures, the network controller handles the orchestration for all use cases. The configuration nodes translate intents into configuration objects based on the data model and write them into a database (e.g., Cassandra). In some cases, at the same time, a notification is sent to all clients awaiting the configuration, e.g., via RabbitMQ.

Control nodes not only acts as BGP speakers but also have a configuration handling module that reads configuration objects from the database in the following ways. First, when a control node comes up (or restarts), it connects to and reads all configuration directly from the database. Second, a control node may be also a messaging client. When there are updates to configuration objects, control nodes receive a messaging notification that lists the objects that have been updated. This again causes the configuration handling module to read objects from the database.

The configuration handling module reads configuration objects for both the control plane (BGP related configuration) and the vRouter forwarding plane. The configuration may be stored as a graph with objects as nodes and relationships as links. This graph can then be downloaded to the clients (BGP/cRPD and/or vRouter agent).

In accordance with techniques of this disclosure, the conventional configuration API server and messaging service are in some examples replaced by Kube api-server (API server 300 and custom API server 301) and the previous Cassandra database by etcd in Kubernetes. With this change, clients interested in configuration objects can directly do a watch on the etcd database to get updates rather than rely on RabbitMQ notifications.

Controller Orchestration for CRPD

BGP configuration can be provided to cRPDs 324. In some examples, cRPD controller 720 may be a Kubernetes controller catered to the to develop its own controller catered to the Kubernetes space and implements CRDs required for orchestration and provisioning cRPDs 324.

Distributed Configuration Handling

As mentioned earlier in this section, the configuration handling module may be part of control nodes 232. It reads configuration directly from a database, converts the data into JSON format and stores it in its local IFMAP database as a graph with objects as nodes and the relationship between them as links. This graph then gets downloaded to interested virtual router agents 514 on the compute nodes via XMPP. Virtual router agent 514 constructs the IFMAP based dependency graph locally as well to store these objects.

IFMAP as an intermediate module and the need for storing a dependency graph can be avoided by having the virtual router agents 514 directly do a watch on the etcd server in API server 300. The same model can be used by cRPD 324 running on the compute nodes. This will avoid the need for the IFMAP-XMPP config channel. A Kubernetes configuration client (for control node 232) can be used as part of this config. This client can also be used by the virtual router agents.

This can, however, increase the number of clients reading configuration from the etcd server, especially in clusters with hundreds of compute nodes. Adding more watchers eventually causes the write rate to drop and the event rate to fall short of the ideal. etcd's gRPC proxy rebroadcasts from one server watcher to many client watchers. The gRPC proxy coalesces multiple client watchers (c-watchers) on the same key or range into a single watcher (s-watcher) connected to an etcd server. The proxy broadcasts all events from the s-watcher to its c-watchers. Assuming N clients watch the same key, one gRPC proxy can reduce the watch load on the etcd server from N to 1. Users can deploy multiple gRPC proxies to further distribute server load. These clients share one server watcher; the proxy effectively offloads resource pressure from the core cluster. By adding proxies, etcd can serve one million events per second.

DNS/Named in the SDN Architecture

In previous architectures, DNS services are provided by contrail-dns and contrail-named processes working in conjunction to provide DNS services to VMs in the network. Named acts as the DNS server that provides an implementation of the BIND protocol. contrail-dns receives updates from the vrouter-agent and pushes these records to named.

Four DNS modes are supported in the system, IPAM configuration can select the DNS mode required.
1. None—No DNS support for the VMs.
2. Default DNS server—DNS resolution for the VMs is done based on the name server configuration in the server infrastructure. When a VM gets a DHCP response, the subnet default gateway is configured as the DNS server for the VM. DNS requests that the VM sends to this default gateway are resolved via the (fabric) name servers configured on the respective compute nodes and the responses are sent back to the VM.
3. Tenant DNS server—Tenants can use their own DNS servers using this mode. A list of servers can be configured in the IPAM, which are then sent in the DHCP response to the VM as DNS server(s). DNS requests that the VM sends are routed as any other data packet based on the available routing information.
4. Virtual DNS server—In this mode, the system supports virtual DNS servers, providing DNS servers that resolve the DNS requests from the VMs. We can define multiple virtual domain name servers under each domain in the system. Each virtual domain name server is an authoritative server for the DNS domain configured.

The SDN architecture described herein is efficient in the DNS services it provides. Customers in the cloud native world to be benefited by the varied DNS services. However, with the move to next generation Kubernetes-based architecture, the SDN architecture may instead use coreDNS for any DNS services.

Data Plane

The Data plane consists of two components: virtual router agent 514 (aka Agent) and virtual router forwarding plane 506 (also referred to as DPDK vRouter/Kernel vRouter) Agent 514 in the SDN architecture solution is responsible to manage the data plane component. Agent 514 establishes XMPP neighborships with two control nodes 232, then exchanges the routing information with them. The vRouter agent 514 also dynamically generates flow entries and injects them into the virtual router 506. This gives instructions to virtual router 506 about how to forward packets.

Responsibilities of Agent 514 may include: Interface with control node 232 to obtain the configuration. Translate received configuration into a form that datapath can understand (e.g., translate the data model from IFMap to the data model used by datapath). Interface with control node 232 to manage routes. And collect and export statistics from datapath to a monitoring solution.

Virtual router 506 implements the data-plane functionality that may allow a virtual network interface to be associated with a VRF. Each VRF has its own forwarding and flow tables, while the MPLS and VXLAN tables are global within virtual router 506. The forwarding tables may contain routes for both the IP and MAC addresses of destinations and the IP-to-MAC association is used to provide proxy ARP capability. The values of labels in the MPLS table are selected by virtual router 506 when VM/Container interfaces come up and are only locally significant to that vRouter. The VXLAN Network Identifiers are global across all the VRFs of the same virtual network in different virtual router 506 within a domain.

In some examples, each virtual network has a default gateway address allocated to it, and each VM or container interface receives that address in the DHCP response received when initializing. When a workload sends a packet to an address outside its subnet, it will ARP for the MAC corresponding to the IP address of the gateway, and virtual router 506 responds with its own MAC address. Thus, virtual router 506 may support a fully distributed default gateway function for all the virtual networks.

The following are examples of packet flow forwarding as implemented by virtual routers 506.

Packet Flows Between VMs/Container Interface in the Same Subnet.

The worker node could be VM or Container Interface. In some examples, the packet processing proceeds as follows:
VM1/Container Interface needs to send a packet to VM2, so virtual router 506 first looks up its own DNS cache for the IP address, but since this is the first packet, there is no entry.
VM1 sends a DNS request to the DNS server address that was supplied in the DHCP response when its interface came up.
The virtual router 506 traps the DNS request and forwards it to the DNS server running in the SDN architecture controller.
The DNS server in the controller responds with the IP address of VM2
The virtual router 506 sends the DNS response to VM1
VM1 needs to form an Ethernet frame, so needs the MAC address for VM2. It checks its own ARP cache, but there is no entry, since this is the first packet.
VM1 sends out an ARP request.
The virtual router 506 traps the ARP request and looks up the MAC address for IP-VM2 in its own forwarding tables and finds the association in the L2/L3 routes that the controller sent it for VM2.
The virtual router 506 sends an ARP reply to VM1 with the MAC address of VM2
A TCP timeout occurs in the network stack of VM1
The network stack of VM1 retries sending the packet, and this time finds the MAC address of VM2 in the ARP cache and can form an Ethernet frame and send it out.
The virtual router 506 looks up the MAC address for VM2 and finds an encapsulation route. The virtual router 506 builds the outer header and sends the resulting packet to server S2.
The virtual router 506 on server S2 decapsulates the packet and looks up the MPLS label to identify the virtual interface to send the original Ethernet frame into. The Ethernet frame is sent into the interface and received by VM2.

Packet Flow Between VMs in Different Subnets

In some examples, the sequence when sending packets to destinations in a different subnet is similar except that the virtual router 506 responds as the default gateway. VM1 will send the packet in an Ethernet frame with the MAC address of the default gateway whose IP address was supplied in the DHCP response that the virtual router 506 supplied when VM1 booted. When VM1 does an ARP request for the gateway IP address, the virtual router 506 responds with its own MAC address. When VM1 sends an Ethernet frame using that gateway MAC address, the virtual router 506 uses the destination IP address of the packet inside the frame to look up the forwarding table in the VRF to find a route, which will be via an encapsulation tunnel to the host that the destination is running on.

Figure 10:
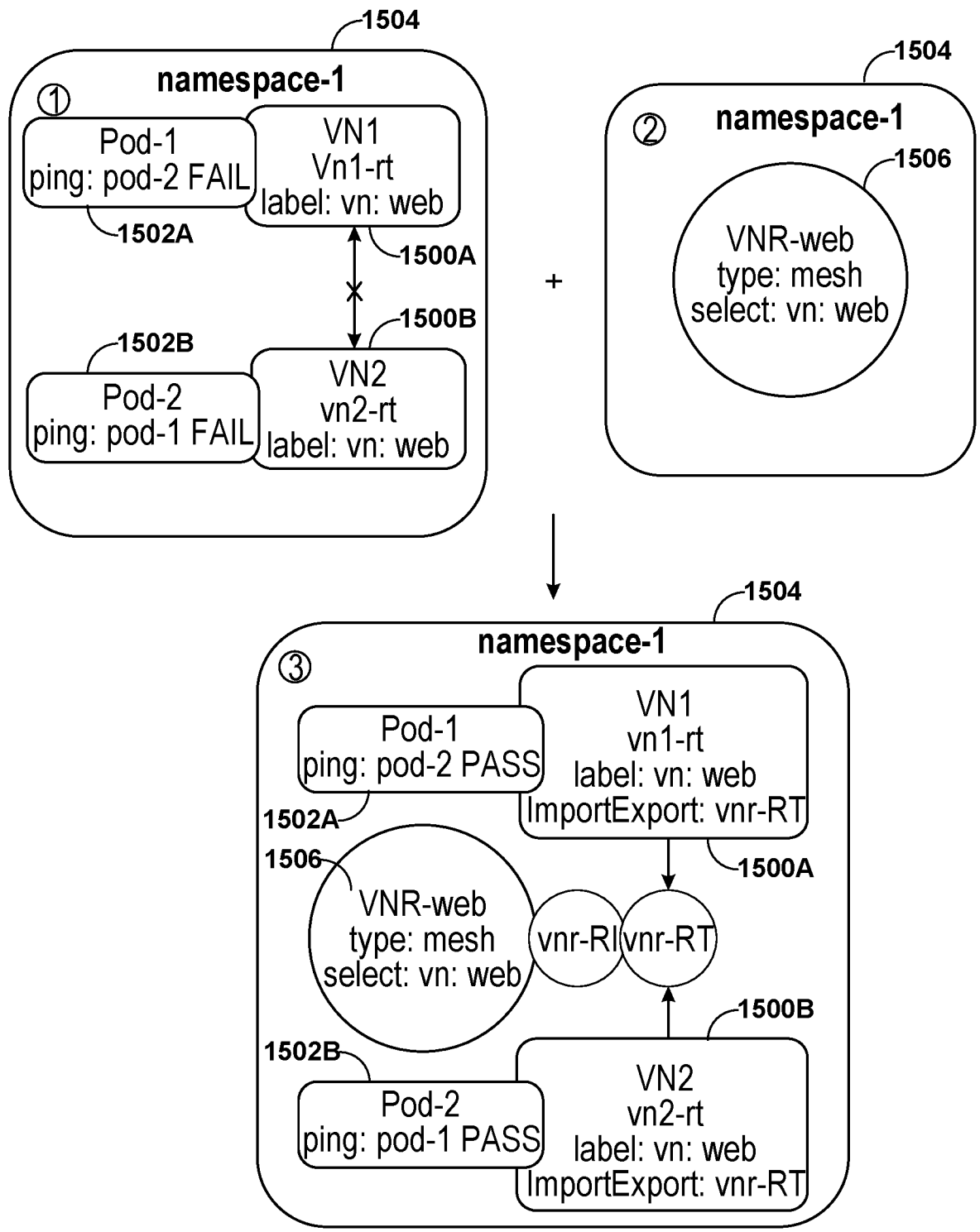
FIGS. 10-16 are diagrams illustrating various instances in which a virtual network router may be configured to enable interconnectivity between virtual networks in accordance with various aspects of the techniques described in this disclosure.

FIG. 10 is a diagram illustrating a first instance in which a virtual network router may be configured to enable mesh interconnectivity between virtual networks in accordance with various aspects of the techniques described in this disclosure. In the example of FIG. 10, a virtual network ("VN") 1500A (also shown as "VN1") and a VN 1500B (also shown as "VN2") are defined and implemented within Kubernetes (or some other orchestration platform) as custom resources, which are then implemented as VNs within an SDN architecture, such as SDN architecture 700. VNs 1500A, 1500B may be instances of custom resources and have a corresponding customer API server 301 and custom resource controller 302.

Network controller 24 may allow an administrator to define VN 1500A as a custom resource to provide network connectivity for pod 1502A (also shown as "Pod-1") and to define VN 1500B as a custom resource to provide network connectivity for pod 1502B (also shown as "Pod-2").

As further shown in the example of FIG. 10, both of VNs 1500A and 1500N ("VNs 1500") are defined within the same namespace 1504 (shown also as "namespace-1"), which indicates that both VNs 1500 exist within a common network namespace (and thus are not isolated from one another). Namespaces, at least in the context of Kubernetes, provide a mechanism for isolating groups of resources, e.g., pods 1502A and 1502B ("pods 1502") and VNs 1500, within a single cluster. As shown on the upper left, VNs 1500 are not interconnected and provide no network connectivity between each other as denoted by the ping status for pod-2 (from pod 1502A) as "FAIL" and the ping status for pod-1 (from pod 1502B) as "FAIL."

An administrator may, to provide network connectivity between pods 1502, interconnect VNs 1500 to one other through instantiating a VNR 1506 within the same namespace 1504 (again, shown as "namespace-1"). VNR 1506 may represent, as noted above, a custom resource that the administrator may instantiate with an example name of "VNR-web" having a network connectivity type of "mesh." To specify which VNs to interconnect, the administrator may assign a label to each VN 1500 as "vn: web" and then specify mesh connectivity between VNs 1500 having a select label of "vn: web."

Network controller 24 (e.g., custom resource controllers 302) may process this custom resource to generate the above noted export and import policies that indicate all routes for VN 1500A are to be exported to VN 1500B and all routes from VN 1500B are to be exported to VN 1500A via VNR 1506, while all routes from VN 1500B are to be imported to VN 1500A and all routes from VN 1500A are to be imported into VN 1500B via VNR 1506. This import/export policy is often referred to as symmetrical because all routes for each VN is exchanged between every other VN, creating a mesh.

VNR 1506 may be "installed" through creation of a common route target (shown as "vnr-RT," where RT denotes route target) within the context of a common routing instance (RI, which is shown as "vnr-RI") in which import/export policies are defined to import and export all routes to vnrRT from each of VNs 1500. Once these policies are defined and installed within the SDN architecture 700 (e.g., in the routing plane) associated with VNs 1500, the routes will be imported and exported into the VRFs for each of vnr-RT and resolved to generate forwarding information. The instances of vnr-RI and vnr-RT may be instances of custom resources for SDN architecture configuration.

Control nodes 232 may generate the forwarding information in the form of configuration data and interface with virtual router agent 514 to provide the configuration data to virtual router agent 514, which may install the forwarding information to virtual router 506 to implement corresponding VRFs for VN 1500 (e.g., VRF 222A shown in the example of FIG. 5). Once installed, the forwarding information causes virtual router 506 and other virtual routers in other compute nodes having Pods for VNs 1500 to correctly for inter-VN traffic. Pings may be correctly forwarded by these virtual routers between pods 1502 using leaked routing information, as shown in the example of FIG. 10 through the indication that pings to pod-2 (from pod 1502A) "PASS" and that pings to pod-1 (from pod 1502B) "PASS."

Figure 11:
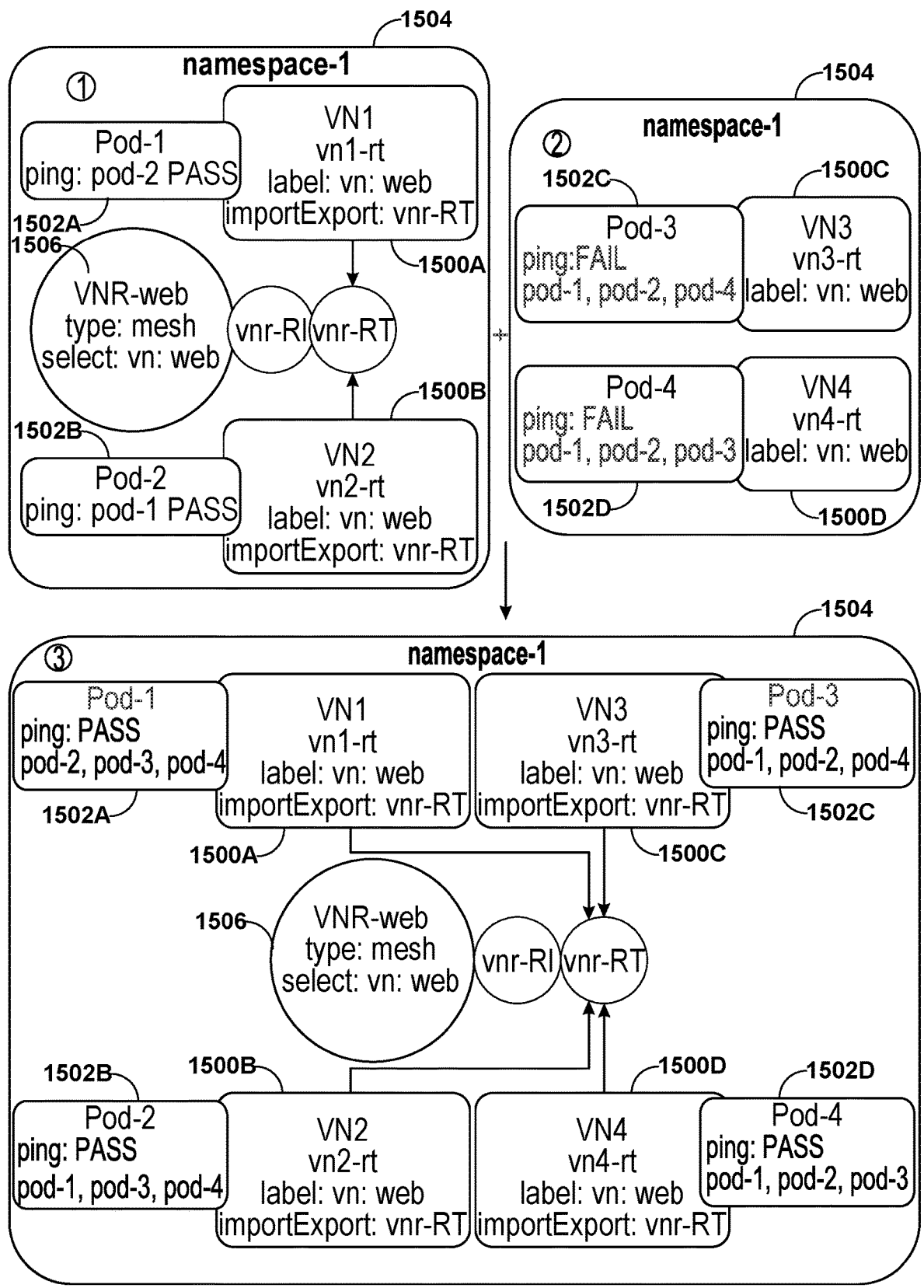

FIG. 11 is a diagram illustrating a second instance in which a virtual network router may be configured to enable mesh interconnectivity between virtual networks in accordance with various aspects of the techniques described in this disclosure. The example shown in FIG. 11 builds from the example shown in FIG. 10 in that VNR 1506 provides mesh interconnectivity between VNs 1500 that allows for pods 1502 in the same namespace 1504 to symmetrically communicate with one another.

In the example of FIG. 11, VNs 1500C and 1500D (which are also shown as "VN3" and "VN4" respectively) are defined within the same namespace 1504 and provide networking connectivity for respective pods 1502C and 1502D (which are also shown as "Pod-3" and "Pod-4"). To add VNs 1500C and 1500D to the mesh provided by VNR 1506, the administrator may add the "vn: web" label to VNs 1500C and 1500D.

After adding the label corresponding to mesh VNR 1506, network controller 24 may add VNs 1500C and 1500D to mesh VNR 1506 by way of generating import and export policies to export and import all routes between VN 1500C and VNs 1500A, 1500B, and 1500D via the VNR common route target ("vnr-RT") and to export and import all routes between VN 1500D and VN 1500A-1500C via again the VNR common route target ("vnr-RT"). That is, control nodes 232 may only need to generate policies that import routes from vnr-RT to VNs 1500C and 1500D and that export routes from VNs 1500C and 1500D to vnr-RT. By using the common route target for VNR 1506, the routes may be automatically exported between all of VNs 1500A-1500D in some cases without having to update any existing policies (such as the import/export policies for existing VNs 1500A and 1500B).

In any event, control nodes 232 may resolve the routes into forwarding information and interface with virtual router agent 514 to install the forwarding information, in a manner similar to that described above with respect to FIG. 10. After installing the forwarding information, each of pods 1502A-1502D may have mesh network connectivity with every other one of pods 1502A-1502D as illustrated by the "PASS" ping status with respect to each other one of pods 1502A-1502D (e.g., pod 1502A, denoted "Pod-1," has a "PASS" ping status for each of pods 1502B-1502D as denoted by "Pod-2, Pod-3, Pod-4" and so on for each other one of pods 1502B-1502D). FIG. 11 in this way illustrates that adding additional VNs to a mesh of VNs interconnected using a VNR can be accomplished by simply adding the appropriate label to the VN instance, here, "vn: web".

Figure 12A:
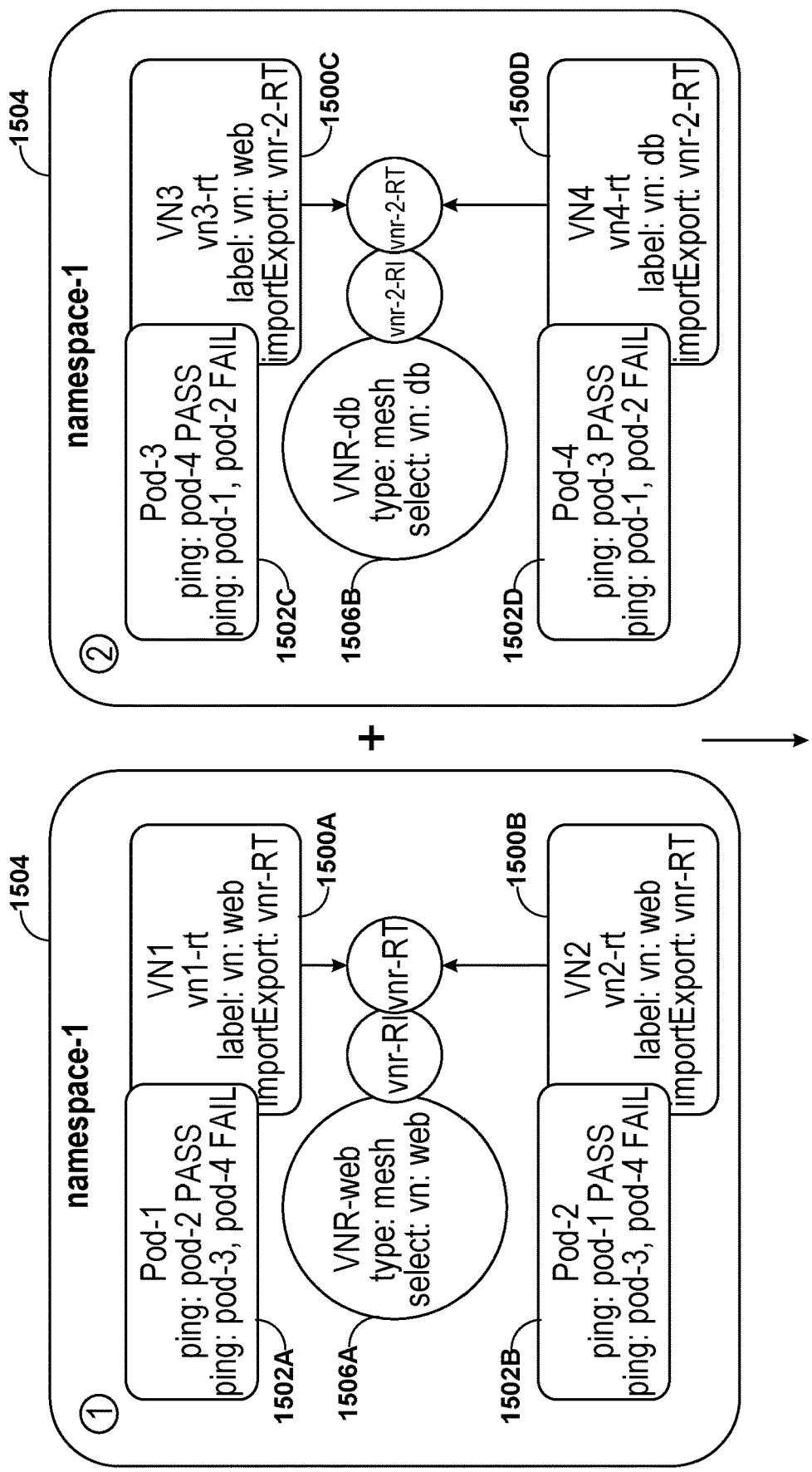
Figure 12B:
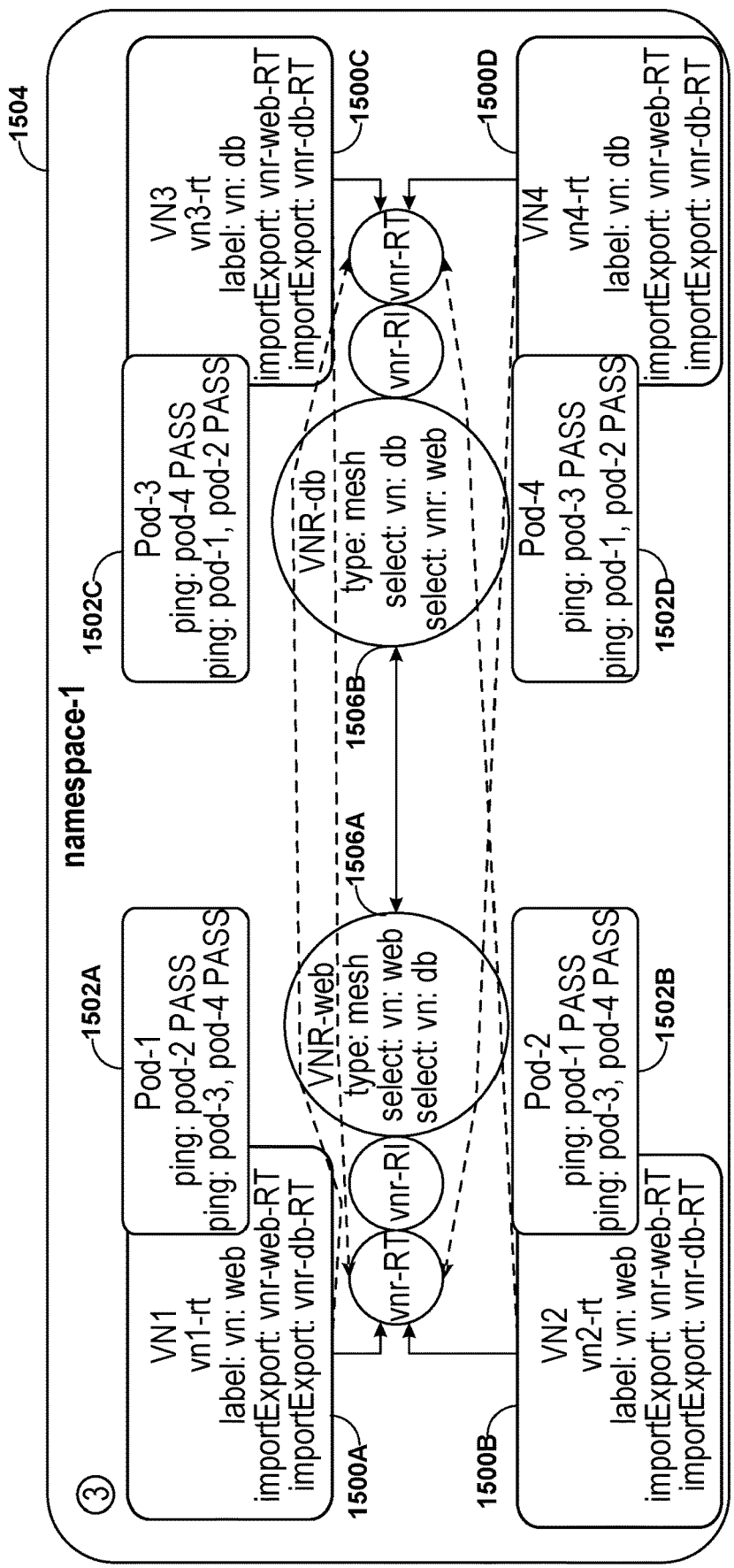

FIGS. 12A and 12B are diagrams illustrating a third instance in which virtual network routers may be configured to enable mesh interconnectivity between virtual networks in accordance with various aspects of the techniques described in this disclosure. In this example, VN 1500C and 1500D are, unlike in the example of FIG. 11, coupled to a VNR 1506B in the example of FIG. 12A to provide mesh network connectivity between VNs 1500C and 1500D (right side), where VNR 1506 in the example of FIG. 11 is replaced with a similar VNR 1506A in the example of FIG. 12A to provide mesh network connectivity between VNs 1500A and 1500B (left side).

VNR 1506A has a unique routing instance ("vnr-RI") within the context of namespace 1504 that is different than the routing instance of VNR 1506B (shown as "vnr-2-RI"). VNR 1506A provide a vnr-RT while VNR 1506B provides a vnr-2-RT (although RTs could be the same given the different/unique routing instances). Further, VNR 1506A has a label select of "vn: web" which selects VNs 1500A and 1500B, while VNR 1506B has a label select of "vn: db," which are the labels assigned to VNs 1500C and 1500D. As such, pods 1502A and 1502DB do not have network connectivity with pods 1502C and 1502D (as represented by the "FAIL" ping status) while pods 1502C and 1502D do not have network connectivity with pods 1502A and 1502B (as represented by the "FAIL" ping status).

To enable pods 1502A-1502D to have mesh network connectivity (as both VNRs 1506A and 1506B are of type "mesh"), the administrator may add a label select statement to select the label of the other VNR 1506A and 1506B. Referring next to the example of FIG. 12B, VNR 1506A now includes a label select statement of "vnr: db," which network controller 24 translates into import and export policies for vnr-db-RT, thereby importing and exporting routes from/to vnr-db-RT of VNR 1506B. Similarly, VNR 1506B now includes a label select statement of "vnr: web," which network controller 24 may translate into importing and exporting routes from/to vnr-web-RT of VNR 1506A. All Pods of VNs connected to both VNR 1506A ("VNR-web") and VNR 1506B ("VNR-db") can, by causing VNR 1506A, 1506B to import/export each others' routes, in this way be enabled to communicate with each other using VNRs and labels.

Again, network controller 24 (e.g., custom resource controllers 302) may deploy these policies within the routing plane, which may then perform the routing information exchange. Control nodes 232 may resolve the exchanged routing information into forwarding information and interface with virtual router agent 512 to install the forwarding information virtual router 506, in a manner similar to that described above with respect to FIG. 10. As such, mesh connectivity between pods 1502A-1502D is established as evidenced by the successful "PASS" ping status with each other one of pods 1502A-1502D.

Figure 13A:
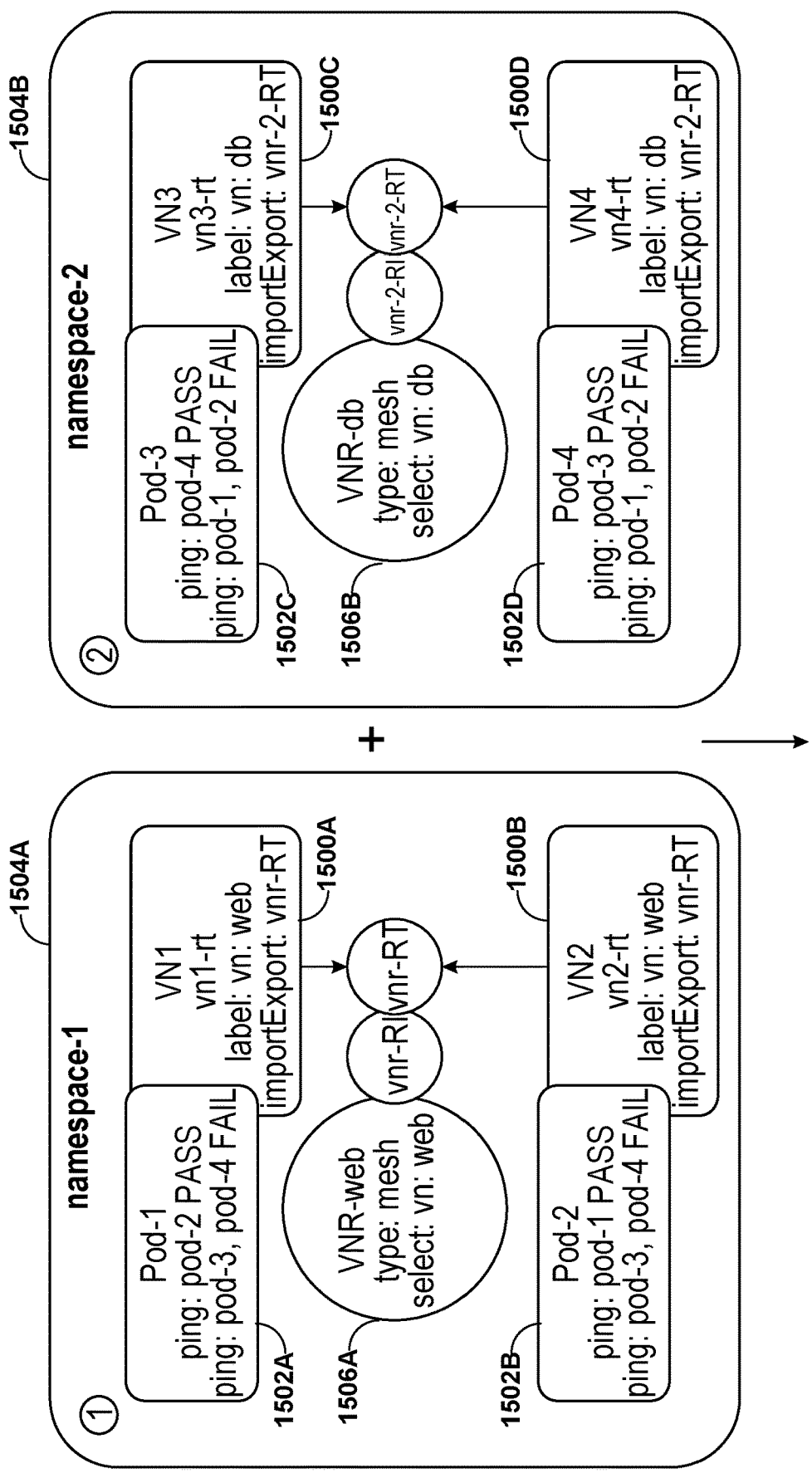
Figure 13B:
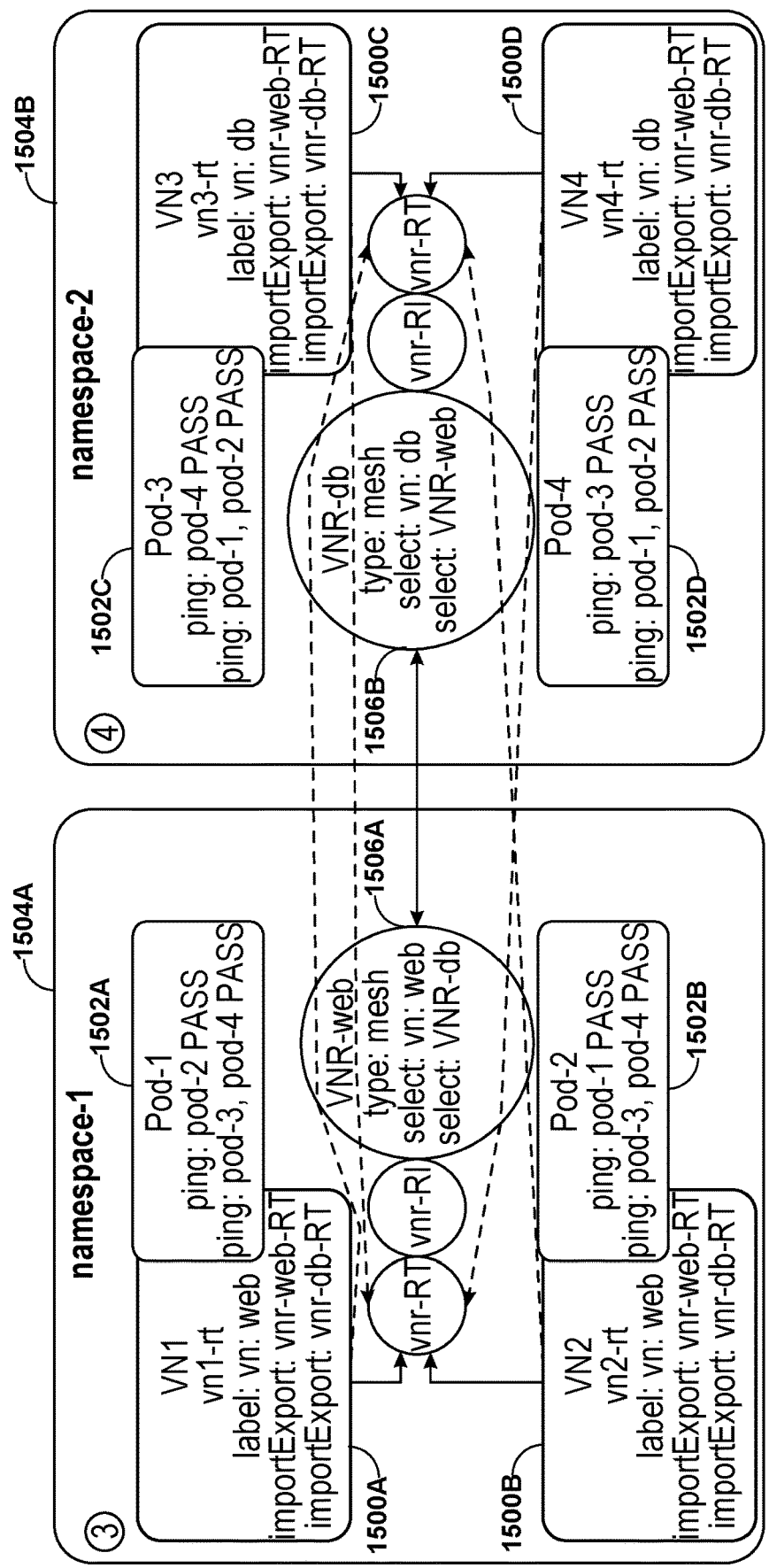

FIGS. 13A and 13B are diagrams illustrating a fourth instance in which virtual network routers may be configured to enable mesh interconnectivity between virtual networks in accordance with various aspects of the techniques described in this disclosure. In the example of FIG. 13A, the general network structure is similar to that shown in the example of FIG. 12A except that VNs 1500A and 1500B, pods 1502A and 1502B, and VNR 1506A are in a first namespace 1504A (shown as "namespace-1") while VNs 1500C and 1500D, pods 1502C and 1502D, and VNR 1506B are in a second, different namespace 1504B (shown as "namespace-2").

Given that namespaces 1504A and 1504B isolate VNs 1500A/1500B, pods 1502A/1502B, and VNR 1506A from VNs 1500C/1500D, pods 1502C/1502D, and VNR 1506B, there must be authorization to import routing information across namespaces 1504A and 1504B, as each namespace 1504A and 1504B may be administered by separate groups without shared administrative rights across both namespaces 1504A and 1504B. As such, a request may be sent to the administrators of both namespaces 1504A and 1504B to confirm that import and export of routing information between VNRs 1506A and 1506B is permitted.

Furthermore, due to the isolation provided by namespaces 1504A and 1504B with respect to the other namespace, only VNRs 1506A and 1506B are permitted to import and export routing information across namespaces 1504A and 1504B. This restriction on inter-namespace routing information enforces the above authorization and avoids misconfiguration that may result in exchange of routing information that permits packets with sensitive or other secure information to be transmitted between namespaces 1504A and 1504B (which may result in data compliance breaches, void contractual obligations or otherwise result in malicious information to breach the isolation provided by namespaces 1504A and 1504B).

Accordingly, assuming authorization is provided by the administrators of both namespaces 1504A and 1504B, control nodes 232 may translate VNRs 1506A and 1506B into the import and export policies described above with respect to the example of FIG. 12B that facilitates the generation of forwarding information to provide mesh connectivity between pods 1502A-1502D. FIG. 13B shows the result of this translation and installation of policies along with resolution of exchanged routing information into forwarding information that can be installed in virtual router 506 to enable this inter-namespace mesh network connectivity.

Figure 14:
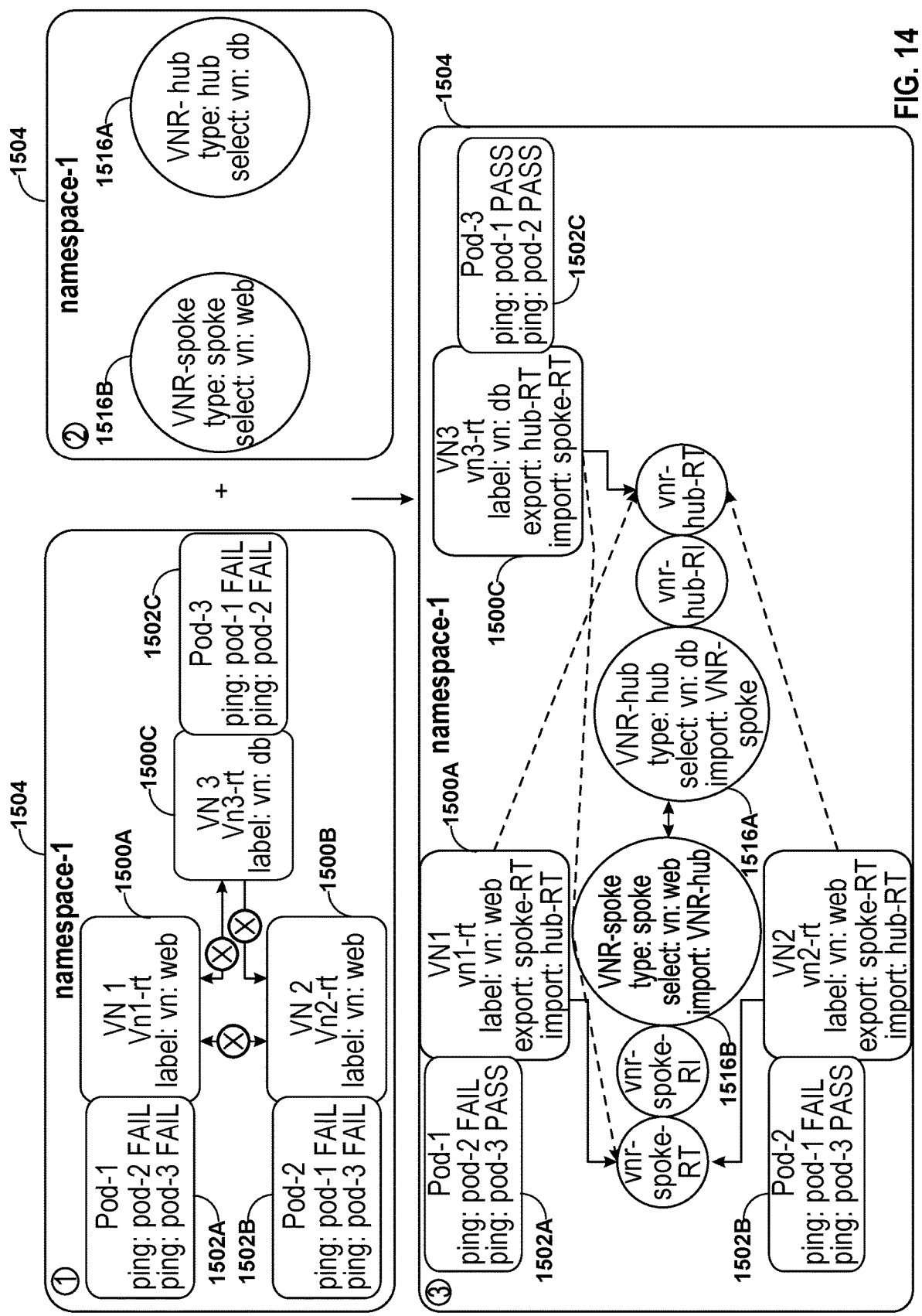

FIG. 14 is a diagram illustrating a fifth instance in which virtual network routers may be configured to enable hub-and-spoke interconnectivity between virtual networks in accordance with various aspects of the techniques described in this disclosure. In the example of FIG. 14, VNs 1500A-1500C are within namespace 1504 and provide network connectivity for respective pods 1502A-1502C. VNs 1500A and 1500B are each assigned a VN label of "vn: web" and VN 1500C is assigned a VN label of "vn: db".

In addition, the administrator may interact with network controller 24 to instantiate custom resources in the form of a VNR 1516A and a VNR 1516B. VNR 1516A is a "hub" type VNR that acts as a hub in a hub-and-spoke network configuration. The hub-and-spoke network configuration is an exchange in which hub VNR 1516A imports all routing information from any spoke VNRs coupled to hub VNR 1516A and spoke VNRs coupled to hub VNR 1516A import routing information from hub VNR 1516A. VNR 1516B is configured as a "spoke" type VNR that acts as a spoke in the hub-and-spoke network configuration. Spoke VNR 1516B may export all routing information to hub VNR 1516A, but imports all routing information from hub VNR 1516A. However, spoke VNs do not receive any routing information from other spoke VNs.

The administrator may define hub VNR 1516A to select label "vn:db" and spoke VNR 1516B to select label "vn: web." As described above, the label selector may indicate which of VNs 1500A-1500C couple to which of hub VNR 1516A and spoke VNR 1516B.

In the example of FIG. 14, control nodes 232 may generate a hub common routing target ("hub-RT" or "vnr-hub-RT") for hub VNR 1516A (along with a spoke-RI or vnr-spoke-RI) and a spoke common routing target ("spoke-RT" or "vnr-spoke-RT") for spoke VNR 1516B (along with a hub-RI or vnr-hub-RI). Control nodes 232 may next generate export policies for hub VNR 1516A that direct any VNs 1500A-1500C labeled with label "vn:db"), which is VN 1500C in this example, to export routing information to vnr-hub-RT.

Control nodes 232 may also generate export policies for spoke VNR 1516B indicating that spoke VNR 1516B should export all routing information to vnr-hub-RT. Control nodes 232 may generate import policies for hub VNR 1516A indicating that hub VNR 1516A should import all routing information from any spoke VNRs, such as vnr-spoke-RT of spoke VNR 1516B. Control nodes 232 may also generate import and export policies indicating that VNs 1500A and 1500B should export all routing information to vnr-spoke-RT.

Once the policies are configured, control nodes 232 may exchange routing information according to the policies, resolving the routing information to generate forwarding information. Control nodes 232 via virtual router agent 512 may install the forwarding information in virtual router 506 to enable hub-and-spoke interconnectivity in which each of pod 1502C can communicate with each pod 1502A and 1502B (as hub connected pods can reach any spoke pod) and pods 1502A and 1502B can communicate with hub pod 1502C, but not between each other as spoke pods 1502A and 1502B cannot communicate with one another per hub-and-spoke network connectivity.

Figure 15:
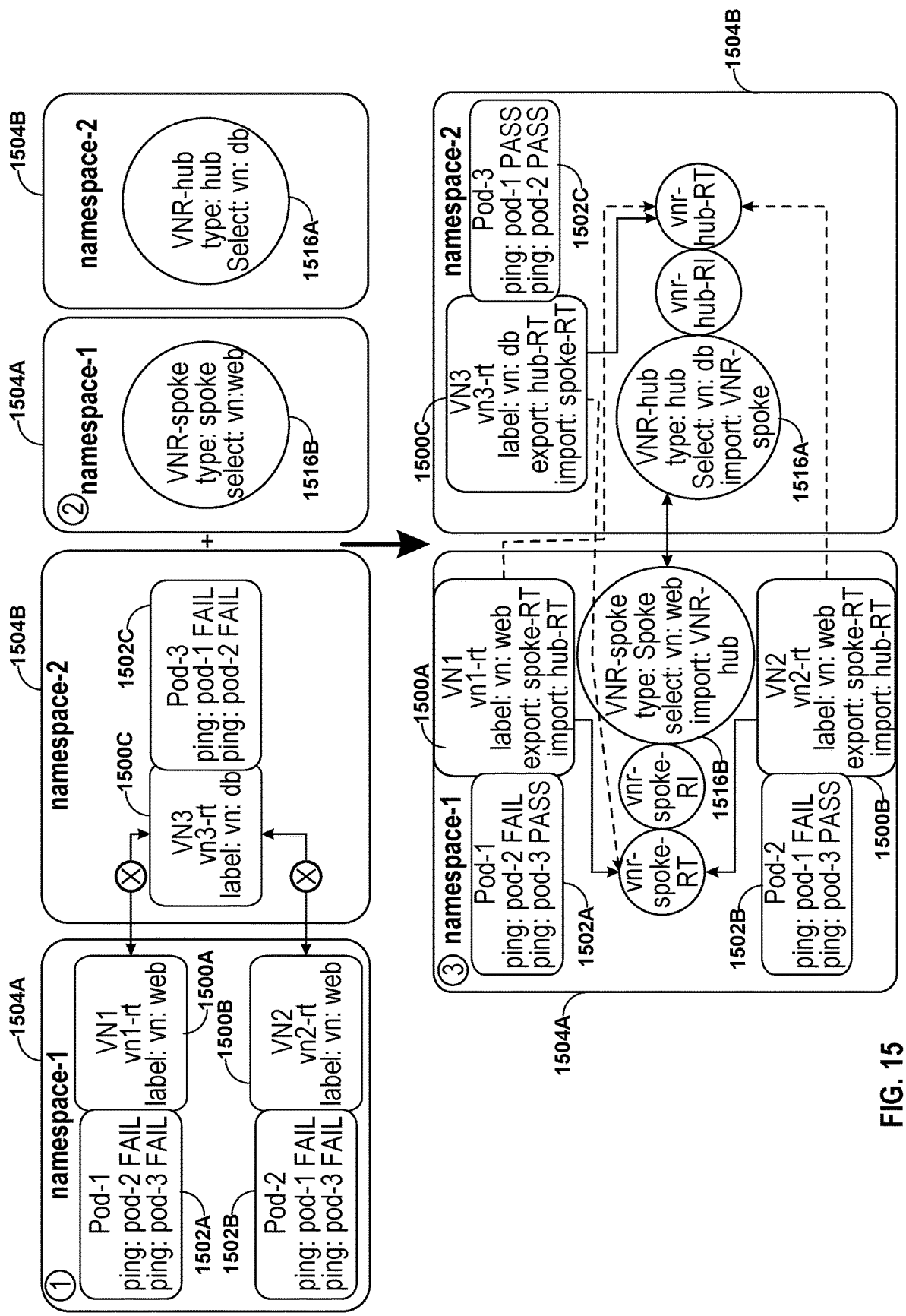

FIG. 15 is a diagram illustrating a sixth instance in which a virtual network router may be configured to enable hub-and-spoke interconnectivity between virtual networks in accordance with various aspects of the techniques described in this disclosure. The example shown in FIG. 15 is similar to the example shown in FIG. 14, except in this instance hub VNR 1516A, VN 1500C, and pod 1502C are in a different namespace 1504B (shown as "namespace-2") while spoke VNR 1516B, VNs 1500A and 1500B along with pods 1502A and 1502B are in a first namespace 1504A (shown as "namespace-1").

In this instance, VNs 1500A-1500C can only interconnect with a VNR 1516A and 1516B in the same namespace, and only spoke VNR 1516B and hub VNR 1516A can communicate across namespaces 1504A and 1504B for the reasons noted above. Assuming authorization is given by the administrators of both namespaces 1504A and 1504B, the hub-and-spoke connectivity shown at the bottom of FIG. 15 may be enabled in a similar if not substantially similar manner to that described above with respect to the example of FIG. 14.

Figure 16:
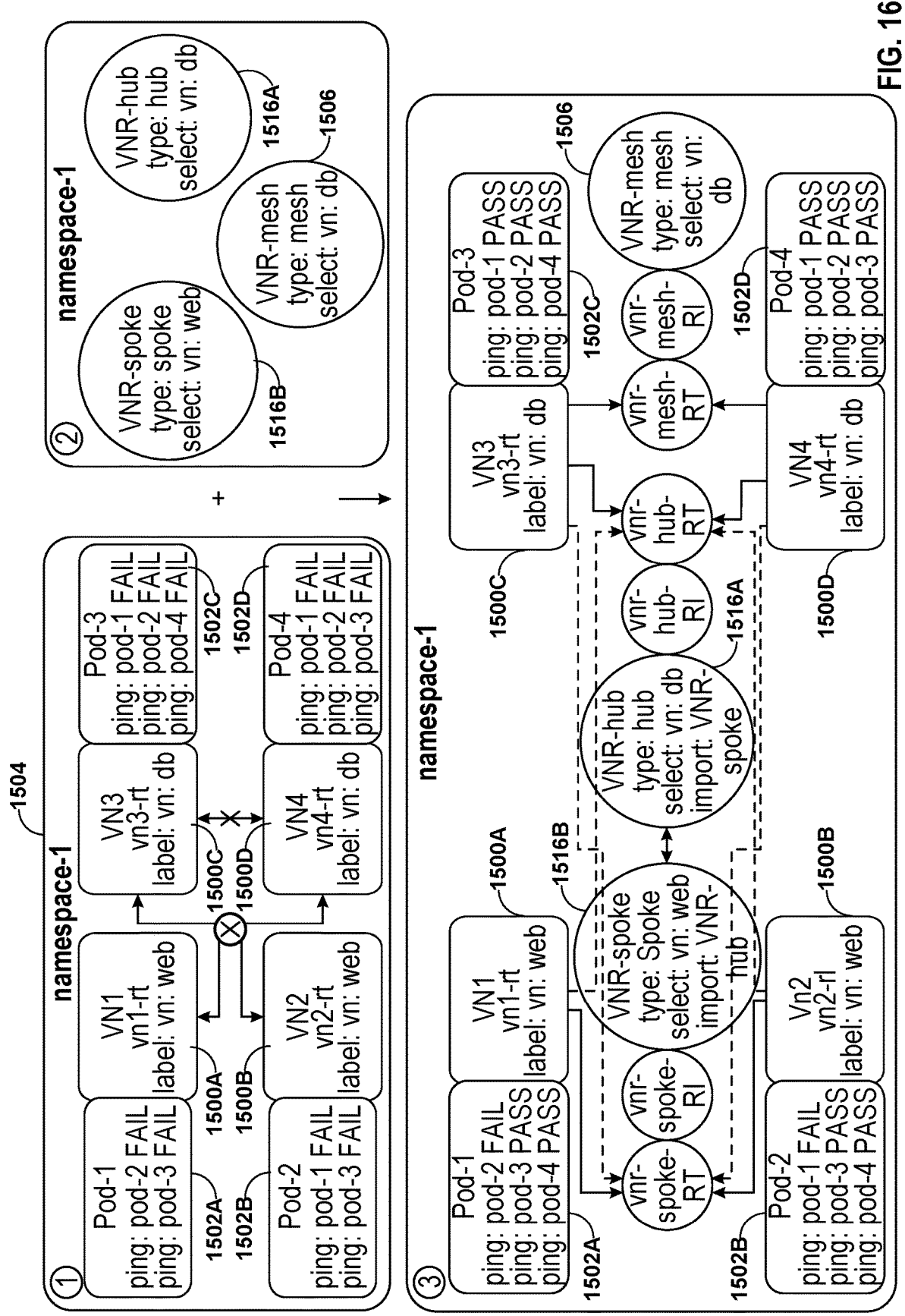

FIG. 16 is a diagram illustrating a seventh instance in which a virtual network router may be configured to enable hub-and-spoke interconnectivity between virtual networks in accordance with various aspects of the techniques described in this disclosure. The example shown in FIG. 16 is similar to the example shown in FIG. 14 except that an additional mesh VNR 1506 is provided that allows for a modified hub-and-spoke interconnectivity between VNs 1500A-1500D.

In the example of FIG. 16, VNs 1500A-1500D cannot initially communicate with one another (per the "FAIL" ping status) until hub VNR 1516A and spoke VNR 1516B are instantiated, deployed as policies, routing information is exchanged and then resolved and forwarding information is installed in virtual router 506 as described above in more detail. This enables VNs 1500C and 1500D to export routing information to common hub-RT ("vnr-hub-RT"), while VNs 1500A and 1500B export routing information to common spoke-RT ("vnr-spoke-RT"). Spoke VNR 1516B may export all routing information to vnr-hub-RT, which enables hub pods 1502C and 1502D to communicate with every other one of spoke pods 1502A and 1502B. Spoke pods 1502A and 1502B can communicate with every other hub pod 1502C and 1502D but not with the other one of spoke pods 1502A and 1502B.

To enable hub pods 1502C and 1502D to communicating directly with one another, the administrator may instantiate mesh VNR 1506 that enables export of routing information to a separate mesh-VNR similar to that described above with respect to the example of FIG. 10. In this way, hub pods 1502C and 1502D may directly communicate with one another as all routing information is exchanged between VNs 1500C and VNs 1500D via mesh-RT.

FIGS. 17A-17D is a flowchart illustrating operations performed when establishing one or more virtual network routers within the SDN architecture according to various aspects of the techniques described in this disclosure. Referring first to the example of FIG. 17A, a VNR controller of network controller 24 (e.g., one of custom resource controllers 302, such as custom resource controller 302A shown in the example of FIG. 6) may initially identify (or, in other words, watch the Ectd database to identify) that a VN 50A with name VN-1 and a label of vn=web along with a VN 50N with a name VN-2 and a label of vn=web were created as custom resources in the Etcd database associated with network controller 24 (e.g., config. store 1328 shown in the example of FIG. 6), where a controller manager of network controller 24 (e.g., controller manager 1326) invokes a scheduler of network controller 24 (e.g., scheduler 1322) to create VNs 50A and 50N (1700, 1702, 1704).

Via a kube-api (which again may refer to API server 300A and/or custom API server 301A shown in the example of FIG. 6) of network controller 24, the administrator may instantiate a VNR 52A to interconnect VNs 50A and 50N, specifying the type as mesh along with labels "vn:web." Kube-API updates Etcd database to store a new custom resource that creates VNR 52A and states that the creation of VNR 52A is pending within the Etcd database (1706, 1708, 1710).

The scheduler of network controller 24 may next receive a notification from Etcd database that a new custom resource has been defined, which then interfaces with the controller manager to notify the controller manager of VNR create request (1712, 1714, 1716). The controller manager may interface with the VNR controller to request VNR reconciliation, which creates a RI for VNR 52A, providing the new RI to the kube-API (1718) so that the kube-API can update the Etcd to reflect the allocation of the new RI to VNR 52A (1720).

The Ectd database may then interface with the scheduler to indicate that there was an VNR-RI create event (1722), which in turn interfaces with the controller manager to notify the controller manager of the VNR-RI create (1724). The controller manager then interface with RI controller of network controller 24 to request VNR-RI reconciliation (1726).

Figure 17A:
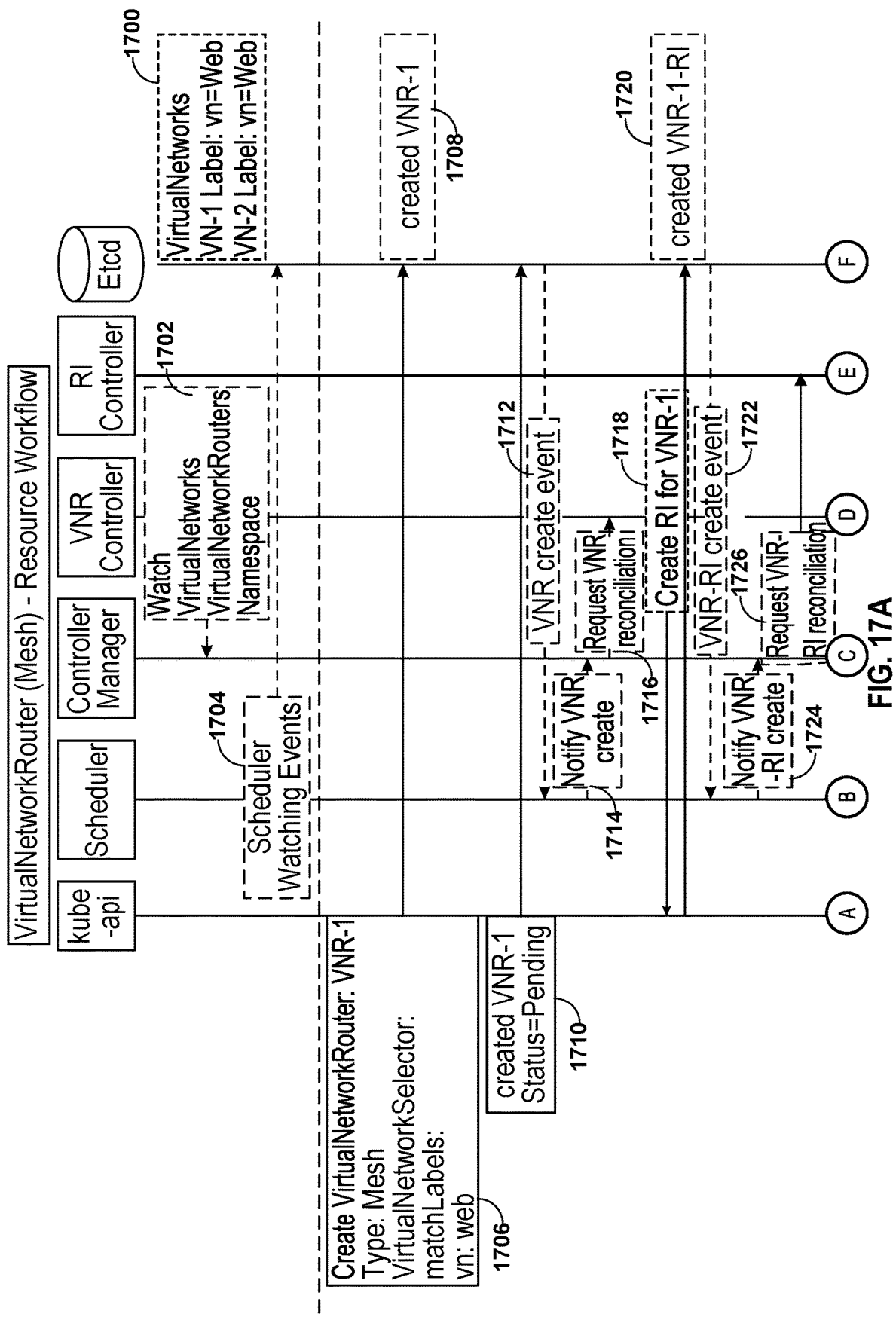
FIGS. 17A-17D is a flowchart illustrating operations performed when establishing one or more virtual network routers within the SDN architecture according to various aspects of the techniques described in this disclosure.
Figure 17B:
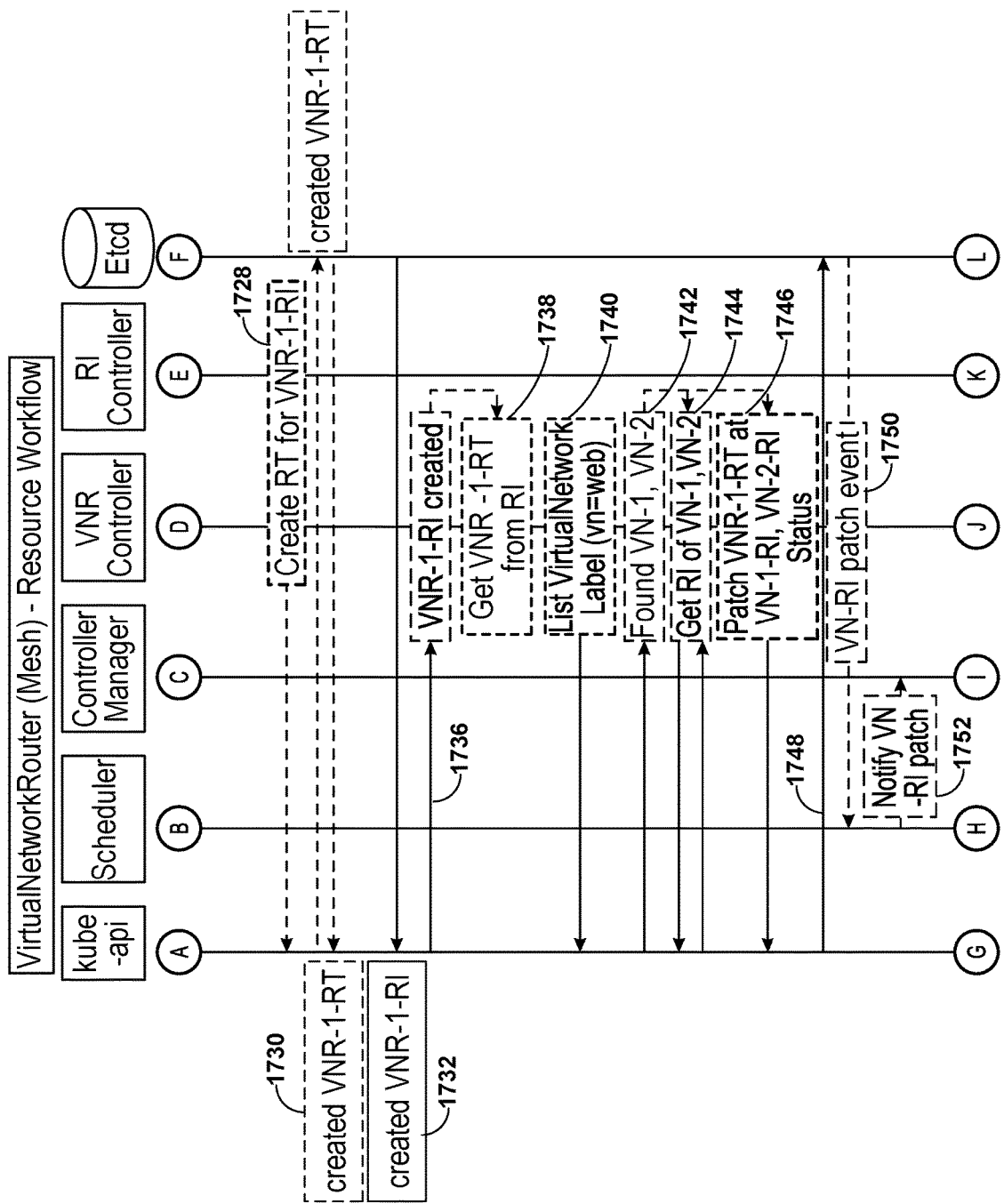

Referring next to the example of FIG. 17B, RI controller of network controller 24 may perform reconciliation of the VNR-RI to create a RT for VNR-1-RI, reporting back the VNR-1-RI to the kube-api (1728). The Kube-api may update the Ectd to note that VNR-1-RT was created, which may report back to the Kube-api that VNR-1-RT was pending and then successful created (1730, 1732). The Kube-api may then interface with the VNR controller to indicate that VNR-1-RI was created, which may in turn get VNR-1-RT from RI (1734, 1736).

The VNR controller may next interface with the Kube-api to identify a list of VNs 50 having label vn=web (1740), where the Kube-api may return VNs 50A and 50N names VN-1 and VN-2 (1742). The VNR controller may again interface with Kube-api to get RI of VN-1 and VN-2 (1744), which proceeds to interface with the Kube-api to patch VNR-1-RT at VN-1-RI, VN-2-RI status (1746). The Kube-api then updates Ectd of the VN-RI patch event (1748). Ectd then notifies the scheduler of the patch event (1750), which notifies the controller manager of the patch event (1752).

Figure 17C:
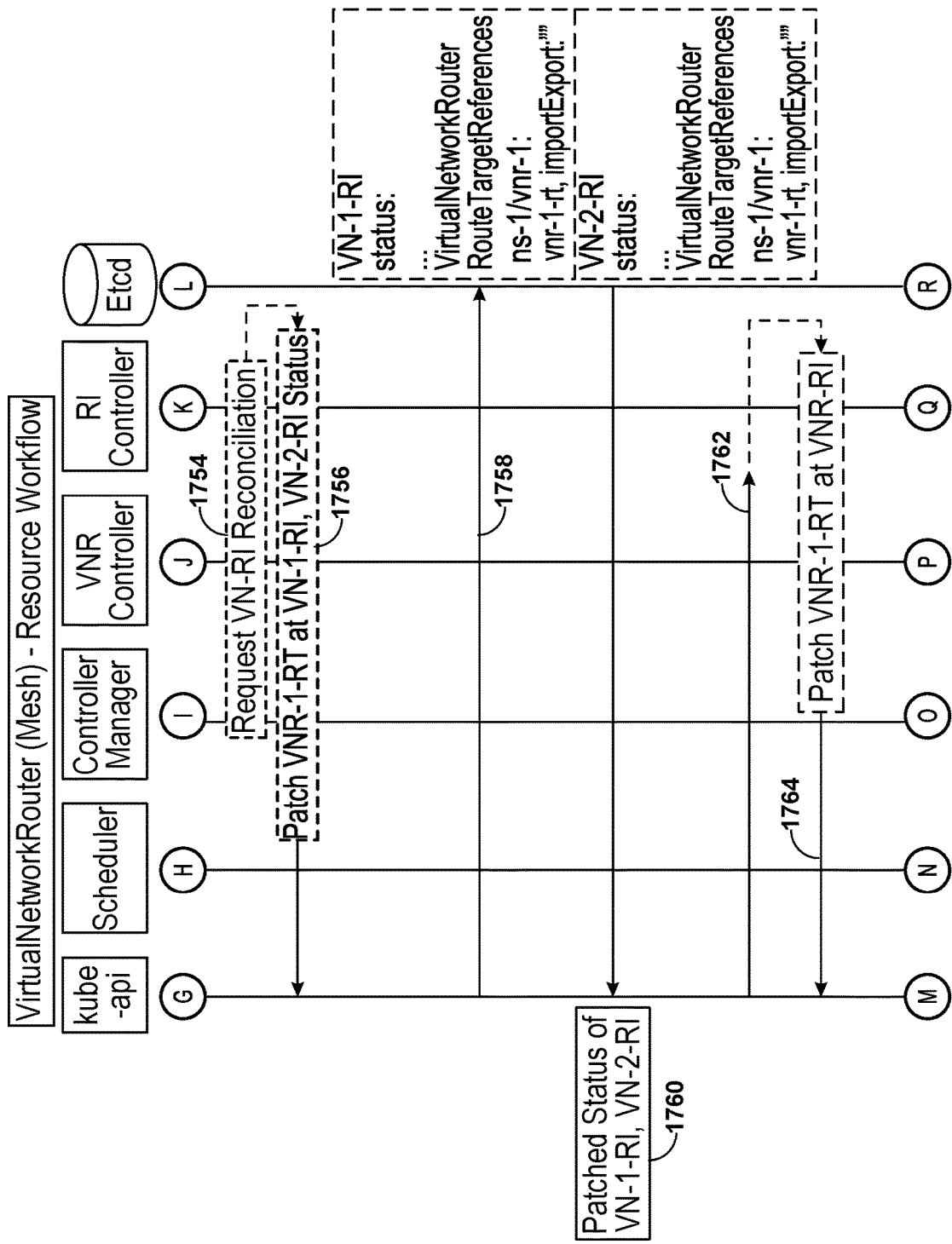

Referring to the example of FIG. 17C, the controller manager, responsive to the patch event, requests that RI controller perform VN-RI reconciliation (1754), which performs the reconciliation on VN-RI before requesting that Kube-api patch VNR-1-RT at VN-1-RI, VN-2-RI status (1756). Responsive to the patch request, the Kube-api updates VN-1-RI in Ectd to include the policies for import and export to VNR-1-RT (the VNR common route target), and updates VN-2-RI to include the policies for import and export to VNR-1-RT (the VNR common route target) (1758). Edtd reports the status of the patch back to the Kube-api (1760). Responsive to the status of the patch of VN-1-RI and VN-2-RI, the Kube-api interface with the RI controller to patch VNR-1-RT at VNR-RI (1762), where the RI controller reports the patch status back to the Kube-api (1764).

Figure 17D:
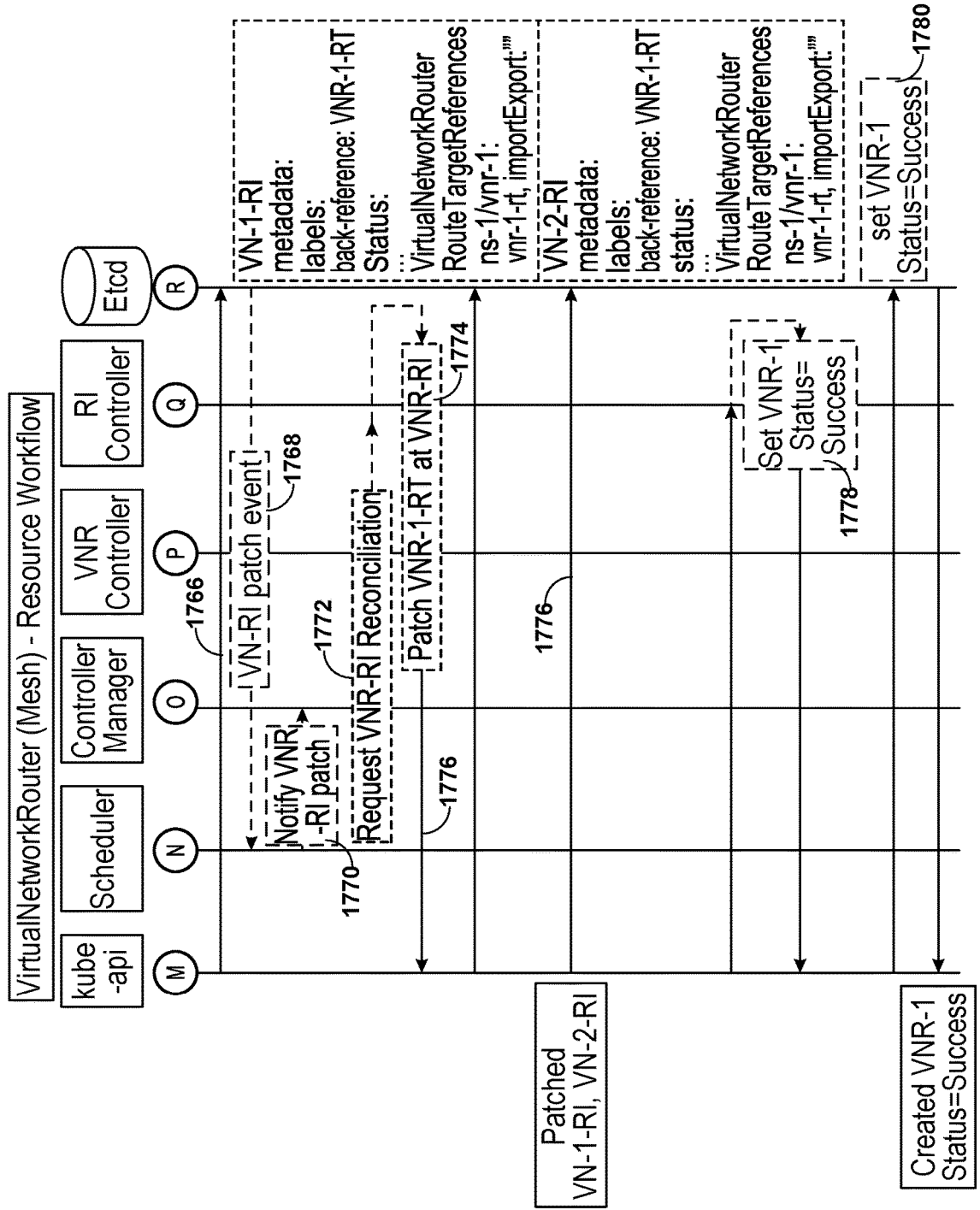

Referring next to the example of FIG. 17D, the Kube-api interface with Etcd to update Etcd on the patch event, which interface with the scheduler to notify the scheduler of the patch event (1766, 1768). The scheduler then interfaces with the controller manager to notify the controller manager of the VNR-RI patch, which in turn request VNR-RI reconciliation from the VNR controller (1770, 1772). The RI controller patches VNR-1-RT at VNR-RI, and informs the Kube-api of the patch (1774, 1776). The Kube-api updates Etcd on the patch (1778) and interfaces with RI controller to set VNR-1 status to indicate "Success"), whereupon the Kube-api updates Ectd on the success of VNR-1 status (1780).

The following provides the detailed design for the VNR API schema (as YAML files):

| API Type (Schema) |
| --- |
| type VirtualNetworkRouterSpec struct { |
|   // Common spec fields |
|   CommonSpec 'json:",inline" protobuf:"bytes,1,opt,name=commonSpec"' |
|   // Type of VirtualNetworkRouter. valid types - mesh, spoke, hub |
|   Type VirtualNetworkRouterType 'json:"type,omitempty" protobuf:"bytes,2,opt,name=type"' |
|   // Select VirtualNetworks to which this VNR's RT be shared |
|   VirtualNetworkSelector *metav1.LabelSelector 'json:"virtualNetworkSelector,omitempty" protobuf:"bytes,3,opt,name=virtualNetworkSelector"' |
|   // Import Router targets from other virtualnetworkrouters |
|   Import ImportVirtualNetworkRouter 'json:"import,omitempty" protobuf:"bytes,4,opt,name=import"' |
| } |
| type ImportVirtualNetworkRouter struct { |
|   VirtualNetworkRouters [ ]VirtualNetworkRouterEntry 'json:"virtualNetworkRouters,omitempty" protobuf:"bytes,1,opt,name=virtualNetworkRouters"' |
| } |

-continued

API Type (Schema)

```
type VirtualNetworkRouterEntry struct {
    VirtualNetworkRouterSelector *metav1.LabelSelector
'json:"virtualNetworkRouterSelector,omitempty"
protobuf:"bytes,1,opt,name=virtualNetworkRouterSelector"'
    NamespaceSelector *metav1.LabelSelector
'json:"namespaceSelector,omitempty"
protobuf:"bytes,2,opt,name=namespaceSelector"'
}
```

VirtualNetworkRouter Yamls—Mesh VNR

```
apiVersion: core.contrail.juniper.net/v1alpha1
kind: VirtualNetworkRouter
metadata:
  namespace: frontend
  name: vnr-1
  annotations:
    core.juniper.net/display-name: vnr-1
  labels:
    vnr: web
    ns: frontend
spec:
  type: mesh
  virtualNetworkSelector:
    matchLabels:
      vn: web
  import:
    virtualNetworkRouters:
      - virtualNetworkRouterSelector
        matchLabels:
          vnr: db
        namespaceSelector:
          matchLabels:
            ns: backend
```

VirtualNetworkRouter Yamls—Spoke VNR

```
apiVersion: core.contrail.juniper.net/v1alpha1
kind: VirtualNetworkRouter
metadata:
  namespace: frontend
  name: vnr-1
  annotations:
    core.juniper.net/display-name: vnr-1
  labels:
    vnrgroup: spokes
    ns: frontend
spec:
  type: spoke
  virtualNetworkSelector:
    matchLabels:
      vngroup: spokes
  import:
    virtualNetworkRouters:
      - virtualNetworkRouterSelector
        matchLabels:
          vnrgroup: hubs
        namespaceSelector:
          matchLabels:
            ns: backend
```

VirtualNetworkRouter Yaml—Hub VNR

```
apiVersion: core.contrail.juniper.net/v1alpha1
kind: VirtualNetworkRouter
metadata:
  namespace: backend
  name: vnr-2
  annotations:
    core.juniper.net/display-name: vnr-2
  labels:
    vnrgroup: hubs
    ns: backend
spec:
  type: hub
  virtualNetworkSelector:
    matchLabels:
      vngroup: hubs
  import:
    virtualNetworkRouters:
      - virtualNetworkRouterSelector:
        matchLabels:
          vnrgroup: spokes
        namespaceSelector:
          matchLabels:
            ns: frontend
```

Figure 18:
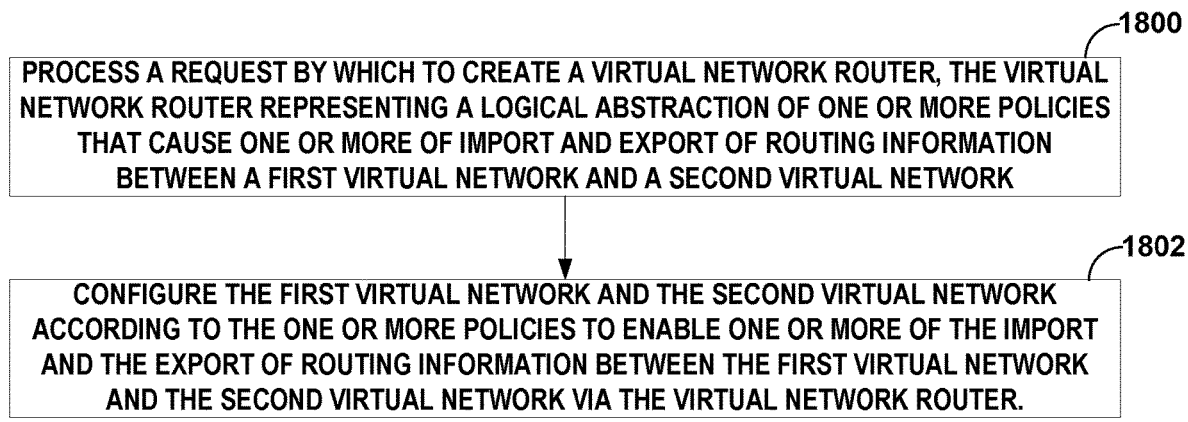
FIG. 18 is another flowchart illustrating operation of the computer architecture shown in the example of FIG. 1 in performing various aspects of the techniques described herein.

FIG. 18 is another flowchart illustrating operation of the computer architecture shown in the example of FIG. 1 in performing various aspects of the techniques described herein. Network controller 24 may be configured to interconnect a first virtual network (e.g., VN 50A) and a second virtual network (e.g., VN 50N) operating within the SDN architecture system represented by data center 10. Network controller 24 may be configured to define a logical abstraction of one or more policies to perform such interconnection via one or more of VNRs 52, e.g., VNR 52A.

The policies may include import and export policies with respect to routing information maintained by the virtual networks (which, in this example, may refer to VNs 50A and 50N). That is, Kubernetes may be expanded, via a custom resource representative of VNR 52A, to translate VNR 52A into one or more import and export policies that are deployed with respect to VN 50A and VN 50N so as configure intercommunication via routing information distribution between VN 50A and VN 50N. Once configured, VN 50A may export routing information (e.g., representative of routes for VN 50A) to VN 50N and import routing information (e.g., representative of routes for VN 50N) to VN 50A. Likewise, VN 50N may export routing information (e.g., representative of routes for VN 50N) to VN 50A and import routing information (e.g., representative of routes for VN 50A) to VN 50N.

The abstraction may hide underlying routing configuration to enable such routing leaking, such as route targets that define routing information import and export to routing instances used to implement VN 50A and VN 50N. Instead, network controller 24 may translate VNR 52A to a common route target and configure communication of routing information via the common route target for the routing instances used to implement VN 50A and VN 50N (in this example).

To implement mesh connectivity, network controller 24 may configure the import and the export of the routing instance for VN 50A, VN 50N, and VNR 52A with the route target associated with VN 50A, VN 50N, and VNR 52A. To implement hub-and-spoke connectivity, network controller 24 may configure the export for the routing instances associated with VN 50A and VN 50N to export routing information to the routing instances associated with VNR 52A (acting as the hub) and the routing instances for VNR 52A to import routing information to the routing instances associated with VN 50A and VN 50N. In this hub- and spoke connectivity, VN 50A and VN 50N may not communicate directly with one another.

In this respect, network controller 24 may process a request by which to create, e.g., VNR 52A, where VNR 52A represents a logical abstraction of one or more policies that cause one or more of import and export of routing information between a first virtual network, e.g., VN 50A, and a second virtual network, e.g., VN 50N (1800). Network controller 24 may next configure VN 50A and VN 50N according to the one or more policies to enable the one or more of the import and the export of routing information between VN 50A and VN 50N via VNR 52A (1802).

In this way, various aspects of the techniques may enable the following examples.

Example 1. A network controller for a software-defined networking (SDN) architecture system, the network controller comprising: processing circuitry; a configuration node configured for execution by the processing circuitry; and a control node configured for execution by the processing circuitry, wherein the configuration node is executable to process a request by which to create a virtual network router, wherein the virtual network router is configured to cause the network controller to interconnect a first virtual network and a second virtual network operating within the SDN architecture system, the virtual network router representing a logical abstraction of one or more policies that cause one or more of import and export of routing information between the first virtual network and the second virtual network, and wherein the control node configures the first virtual network and the second virtual network according to the one or more policies to enable one or more of the import and the export of routing information between the first virtual network and the second virtual network via the virtual network router.

Example 2. The network controller of example 1, wherein the request includes a label associated with the first virtual network and the second virtual network, and wherein the configuration node identifies, based on the label, the first virtual network and the second virtual network in order to configure a routing instance corresponding to the virtual network router, in accordance with the one or more policies, to cause the import and the export of the routing information between the first virtual network and the second virtual network.

Example 3. The network controller of any combination of examples 1 and 2, wherein the request indicates that the virtual network router is a mesh virtual network router, and wherein the one or more policies represented by the mesh virtual network router include symmetrical import and export policies that cause both the import and the export of the routing information between the first virtual network and the second virtual network.

Example 4. The network controller of any combination of examples 1-3, wherein the request indicates that the virtual network router is a hub virtual network router, the first virtual network is a first spoke virtual network, and the second virtual network is a second spoke virtual network, and wherein the one or more policies represented by the hub virtual network router include asymmetrical import and export policies that cause export of the routing information from both of the first spoke virtual network and the second spoke virtual network to the virtual network router but no import of the routing information between the first spoke virtual network and the second spoke virtual network.

Example 5. The network controller of any combination of examples 1-4, wherein the first virtual network is associated with a first namespace, wherein the second virtual network is associated with a second namespace, wherein the virtual network router is a first virtual network router, wherein the one or more policies include first policies and second policies, wherein the first virtual network router is representative of the first policies for the import and the export of the routing information between the first virtual network and a second virtual network router, and wherein the second virtual network router is representative of the second policies for the import and the export of the routing information between the second virtual network and the first virtual network router.

Example 6. The network controller of example 5, wherein the first virtual network router must obtain authorization to interconnect the first virtual network router to the second virtual network router prior to deploying the first policies.

Example 7. The network controller of any combination of examples 1-6, wherein the network controller supports a container orchestration system.

Example 8. The network controller of any combination of examples 1-7, wherein the virtual network router is an instance of a custom resource for SDN architecture configuration for an SDN architecture, and wherein the configuration node includes a custom resource controller to reconcile a state of the SDN architecture to an intended state for the virtual network router, and wherein the control node is configured to deploy the virtual network router to achieve the intended state for the virtual network router.

Example 9. The network controller of any combination of examples 1-8, wherein the virtual network router is implemented using a common routing instance and common route target, wherein the first virtual network is implemented using a first routing instance and a first route target, wherein the second virtual network is implemented using a second routing instance and a second route target, and wherein the control node is configured to configure the import and the export for the first routing instance, the second routing instance, and the common routing instance with the first route target, the second route target, and the common route target in order to implement mesh connectivity.

Example 10. The network controller of any combination of examples 1-9, wherein the virtual network router is implemented using a common routing instance and common route target, wherein the first virtual network is implemented using a first routing instance and a first route target, wherein the second virtual network is implemented using a second routing instance and a second route target, wherein a third virtual network is implemented using a third routing instance and a third route target, and wherein the control node is configured to configure the import and the export for the first routing instance, the second routing instance, the third routing instance, and the common routing instance with the first route target, the second route target, the third route target, and the common route to target in order to implement hub-and-spoke connectivity.

Example 11. The network controller of any combination of examples 1-10, wherein the first virtual network is implemented using one or more first virtual routers of a first plurality of compute nodes, and wherein the second virtual network is implemented using one or more second virtual routers of a second plurality of compute nodes.

Example 12. The network controller of example 11, wherein the first plurality of computing nodes are a first Kubernetes cluster, and wherein the second plurality of computing nodes are a second Kubernetes cluster.

Example 13. The network controller of any combination of examples 1-12, wherein the control node resolves the routing information into forwarding information for one or more of the first virtual network and the second virtual network and installs the forwarding information in a virtual router supporting interconnectivity between the first virtual network and the second virtual network.

Example 14. A method comprising: processing, by a network controller, a request by which to create a virtual network router, wherein the virtual network router is configured to cause the network controller to interconnect a first virtual network and a second virtual network operating within the SDN architecture system, the virtual network router representing a logical abstraction of one or more policies that cause one or more of import and export of routing information between the first virtual network and the second virtual network; and configuring, by the network controller, the first virtual network and the second virtual network according to the one or more policies to enable one or more of the import and the export of routing information between the first virtual network and the second virtual network via the virtual network router.

Example 15. The method of example 14, wherein the request includes a label associated with the first virtual network and the second virtual network, and wherein processing the request includes identifying, based on the label, the first virtual network and the second virtual network in order to configure a routing instance corresponding to the virtual network router, in accordance with the one or more policies, to cause the import and the export of the routing information between the first virtual network and the second virtual network.

Example 16. The method of any combination of examples 14 and 15, wherein the request indicates that the virtual network router is a mesh virtual network router, and wherein the one or more policies represented by the mesh virtual network router include symmetrical import and export policies that cause both the import and the export of the routing information between the first virtual network and the second virtual network.

Example 17. The method of any combination of examples 14-16, wherein the request indicates that the virtual network router is a hub virtual network router, the first virtual network is a first spoke virtual network, and the second virtual network is a second spoke virtual network, and wherein the one or more policies represented by the hub virtual network router include asymmetrical import and export policies that cause export of the routing information from both of the first spoke virtual network and the second spoke virtual network to the virtual network router but no import of the routing information between the first spoke virtual network and the second spoke virtual network.

Example 18. The method of any combination of examples 14-17, wherein the first virtual network is associated with a first namespace, wherein the second virtual network is associated with a second namespace, wherein the virtual network router is a first virtual network router, wherein the one or more policies include first policies and second policies, wherein the first virtual network router is representative of the first policies for the import and the export of the routing information between the first virtual network and a second virtual network router, and wherein the second virtual network router is representative of the second policies for the import and the export of the routing information between the second virtual network and the first virtual network router.

Example 19. The method of example 18, wherein the first virtual network router must obtain authorization to interconnect the first virtual network router to the second virtual network router prior to deploying the first policies.

Example 20. The method of any combination of examples 14-19, wherein the network controller supports a container orchestration system.

Example 21. The method of any combination of examples 14-20, wherein the virtual network router is an instance of a custom resource for SDN architecture configuration for an SDN architecture, and wherein processing the request comprises: reconciling a state of the SDN architecture to an intended state for the virtual network router; and deploying the virtual network router to achieve the intended state for the virtual network router.

Example 22. The method of any combination of examples 14-21, wherein the virtual network router is implemented using a common routing instance and common route target, wherein the first virtual network is implemented using a first routing instance and a first route target, wherein the second virtual network is implemented using a second routing instance and a second route target, and wherein processing the request comprises configuring the import and the export for the first routing instance, the second routing instance, and the common routing instance with the first route target, the second route target, and the common route target in order to implement mesh connectivity.

Example 23. The method of any combination of examples 14-22, wherein the virtual network router is implemented using a common routing instance and common route target, wherein the first virtual network is implemented using a first routing instance and a first route target, wherein the second virtual network is implemented using a second routing instance and a second route target, wherein a third virtual network is implemented using a third routing instance and a third route target, and wherein processing the request comprises configuring the import and the export for the first routing instance, the second routing instance, the third routing instance, and the common routing instance with the first route target, the second route target, the third route target, and the common route to target in order to implement hub-and-spoke connectivity.

Example 24. The method of any combination of examples 14-23, wherein the first virtual network is implemented using one or more first virtual routers of a first plurality of compute nodes, and wherein the second virtual network is implemented using one or more second virtual routers of a second plurality of compute nodes.

Example 25. The method of example 24, wherein the first plurality of computing nodes are a first Kubernetes cluster, and wherein the second plurality of computing nodes are a second Kubernetes cluster.

Example 26. The method of any combination of examples 14-25, further comprising resolving the exchanged routing information into forwarding information for one or more of the first virtual network and the second virtual network and installs the forwarding information in a virtual router supporting interconnectivity between the first virtual network and the second virtual network.

Example 27. A non-transitory computer-readable medium comprising instructions for causing processing circuitry of a network controller to: process a request by which to create a virtual network router, wherein the virtual network router is configured to cause the network controller to interconnect a first virtual network and a second virtual network operating within the SDN architecture system, the virtual network router representing a logical abstraction of one or more policies that cause one or more of import and export of routing information between the first virtual network and the second virtual network; and configuring the first virtual network and the second virtual network according to the one or more policies to enable one or more of the import and the export of routing information between the first virtual network and the second virtual network via the virtual network router. The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

What is claimed is:

1. A network controller for a software-defined networking (SDN) architecture system, the network controller comprising:
   processing circuitry;
   a configuration node configured for execution by the processing circuitry; and
   a control node configured for execution by the processing circuitry,
     wherein the configuration node is executable to process a request by which to create a virtual network router, wherein the virtual network router is configured to cause the network controller to interconnect a first virtual network and a second virtual network operating within the SDN architecture system, the virtual network router representing a logical abstraction of one or more policies that cause one or more of import and export of routing information between the first virtual network and the second virtual network, wherein the request indicates that the virtual network router is a mesh virtual network router, and wherein the one or more policies represented by the mesh virtual network router include symmetrical import and export policies that cause both the import and the export of the routing information between the first virtual network and the second virtual network, and
   wherein the control node configures the first virtual network and the second virtual network according to the one or more policies to enable one or more of the import and the export of routing information between the first virtual network and the second virtual network via the virtual network router.

2. The network controller of claim 1,
   wherein the request includes a label associated with the first virtual network and the second virtual network, and
   wherein the configuration node identifies, based on the label, the first virtual network and the second virtual network in order to configure a routing instance corresponding to the virtual network router, in accordance with the one or more policies, to cause the import and the export of the routing information between the first virtual network and the second virtual network.

3. The network controller of claim 1,
   wherein the first virtual network is associated with a first namespace,
   wherein the second virtual network is associated with a second namespace,
   wherein the virtual network router is a first virtual network router,
   wherein the one or more policies include first policies and second policies,
   wherein the first virtual network router is representative of the first policies for the import and the export of the routing information between the first virtual network and a second virtual network router, and
   wherein the second virtual network router is representative of the second policies for the import and the export of the routing information between the second virtual network and the first virtual network router.

4. The network controller of claim 3, wherein the first virtual network router must obtain authorization to interconnect the first virtual network router to the second virtual network router prior to deploying the first policies.

5. The network controller of claim 1, wherein the network controller supports a container orchestration system.

6. The network controller of claim 1,
   wherein the virtual network router is an instance of a custom resource for SDN architecture configuration for an SDN architecture, and
   wherein the configuration node includes a custom resource controller to reconcile a state of the SDN architecture to an intended state for the virtual network router, and
   wherein the control node is configured to deploy the virtual network router to achieve the intended state for the virtual network router.

7. The network controller of claim 1,
   wherein the virtual network router is implemented using a common routing instance and common route target,
   wherein the first virtual network is implemented using a first routing instance and a first route target, wherein the second virtual network is implemented using a second routing instance and a second route target, and wherein the control node is configured to configure the import and the export for the first routing instance, the second routing instance, and the common routing instance with the first route target, the second route target, and the common route target in order to implement mesh connectivity.

8. The network controller of claim 1, wherein the virtual network router is implemented using a common routing instance and common route target, wherein the first virtual network is implemented using a first routing instance and a first route target, wherein the second virtual network is implemented using a second routing instance and a second route target, wherein a third virtual network is implemented using a third routing instance and a third route target, and wherein the control node is configured to configure the import and the export for the first routing instance, the second routing instance, the third routing instance, and the common routing instance with the first route target, the second route target, the third route target, and the common route target in order to implement hub-and-spoke connectivity.

9. The network controller of claim 1, wherein the first virtual network is implemented using one or more first virtual routers of a first plurality of compute nodes, and wherein the second virtual network is implemented using one or more second virtual routers of a second plurality of compute nodes.

10. The network controller of claim 9, wherein the first plurality of computing nodes are a first Kubernetes cluster, and wherein the second plurality of computing nodes are a second Kubernetes cluster.

11. The network controller of claim 1, wherein the control node resolves the routing information into forwarding information for one or more of the first virtual network and the second virtual network and installs the forwarding information in a virtual router supporting interconnectivity between the first virtual network and the second virtual network.

12. A method comprising:

processing, by a network controller, a request by which to create a virtual network router, wherein the virtual network router is configured to cause the network controller to interconnect a first virtual network and a second virtual network operating within a software-defined networking (SDN) architecture system, the virtual network router representing a logical abstraction of one or more policies that cause one or more of import and export of routing information between the first virtual network and the second virtual network, wherein the request indicates that the virtual network router is a mesh virtual network router, and wherein the one or more policies represented by the mesh virtual network router include symmetrical import and export policies that cause both the import and the export; and configuring, by the network controller, the first virtual network and the second virtual network according to the one or more policies to enable one or more of the import and the export of routing information between the first virtual network and the second virtual network via the virtual network router.

13. The method of claim 12, wherein the request includes a label associated with the first virtual network and the second virtual network, and wherein processing the request includes identifying, based on the label, the first virtual network and the second virtual network in order to configure a routing instance corresponding to the virtual network router, in accordance with the one or more policies, to cause the import and the export of the routing information between the first virtual network and the second virtual network.

14. The method of claim 12, wherein the first virtual network is associated with a first namespace, wherein the second virtual network is associated with a second namespace, wherein the virtual network router is a first virtual network router, wherein the one or more policies include first policies and second policies, wherein the first virtual network router is representative of the first policies for the import and the export of the routing information between the first virtual network and a second virtual network router, and wherein the second virtual network router is representative of the second policies for the import and the export of the routing information between the second virtual network and the first virtual network router.

15. The method of claim 14, wherein the first virtual network router must obtain authorization to interconnect the first virtual network router to the second virtual network router prior to deploying the first policies.

16. A non-transitory computer-readable medium comprising instructions for causing processing circuitry of a network controller to:

process a request by which to create a virtual network router, wherein the virtual network router is configured to cause the network controller to interconnect a first virtual network and a second virtual network operating within a software-defined networking (SDN) architecture system, the virtual network router representing a logical abstraction of one or more policies that cause one or more of import and export of routing information between the first virtual network and the second virtual network, wherein the request indicates that the virtual network router is a mesh virtual network router, and wherein the one or more policies represented by the mesh virtual network router include symmetrical import and export policies that cause both the import and the export; and configuring the first virtual network and the second virtual network according to the one or more policies to enable one or more of the import and the export of routing information between the first virtual network and the second virtual network via the virtual network router.

* * * * *